(12) United States Patent
Cohen et al.

(10) Patent No.: US 12,460,780 B2
(45) Date of Patent: Nov. 4, 2025

(54) TOOLLESS CLICK-IN OR CLICK-OUT DOWNLIGHT

(71) Applicant: AMP Plus, Inc, Vernon, CA (US)

(72) Inventors: Brandon Cohen, Vernon, CA (US); Ivan Madrigal, Paramount, CA (US)

(73) Assignee: AMP Plus, Inc., Vernon, CA (US)

( * ) Notice: Subject to any disclaimer, the term of this patent is extended or adjusted under 35 U.S.C. 154(b) by 0 days.

(21) Appl. No.: 17/959,579

(22) Filed: Oct. 4, 2022

(65) Prior Publication Data

US 2023/0111632 A1     Apr. 13, 2023

Related U.S. Application Data

(63) Continuation-in-part of application No. 17/486,845, filed on Sep. 27, 2021, now Pat. No. 11,662,084.

(51) Int. Cl.
*F21S 8/02*       (2006.01)
*F21V 17/12*      (2006.01)
(Continued)

(52) U.S. Cl.
CPC ............ *F21S 8/026* (2013.01); *F21V 21/047* (2013.01); *F21V 17/12* (2013.01); *F21V 17/16* (2013.01);
(Continued)

(58) Field of Classification Search
CPC .. F21V 21/02–08; F21V 17/16; F21V 17/164; F21V 17/12; F21V 17/18; F21V 17/20; F21S 8/02–028
See application file for complete search history.

(56) References Cited

U.S. PATENT DOCUMENTS 1,133,535  A    3/1915  Cain
1,471,340  A   10/1923  Knight
(Continued)

FOREIGN PATENT DOCUMENTS

CN    202991730 U   *   6/2013
CN    206496272 U   *   9/2017
(Continued)

OTHER PUBLICATIONS

US 10,816,169 B1, 10/2020, Danesh (withdrawn)
(Continued)

*Primary Examiner* — Colin J Cattanach
(74) *Attorney, Agent, or Firm* — Eric Kelly

(57) ABSTRACT

An overall-assembly of a downlight, with a flangeless trim, and a spackle-frame have complementary structures for repeatably attaching or detaching the downlight to the spackle-frame merely by pushing the downlight into a central hole of the spackle-frame and without use of any external/separate tools. The flangeless trim has some upward protruding members that are configured to removably attached/detached to clips and housings-for-clips. The clips are housed within the housings-for-clips. And the clips and the housings-for-clips are retained in structures of the spackle-frame. The spackle-frame would typically be permanently installed within an appropriately sized hole in drywall (or the like), such as, but not limited to, ceiling drywall. In this way, such downlights may be readily installed or removed and all without use of external/separate tools.

20 Claims, 36 Drawing Sheets

(51) Int. Cl.
*F21V 17/16* (2006.01)
*F21V 17/18* (2006.01)
*F21V 17/20* (2006.01)
*F21V 21/04* (2006.01)

(52) U.S. Cl.
CPC .......... *F21V 17/164* (2013.01); *F21V 17/18* (2013.01); *F21V 17/20* (2013.01); *F21V 21/04* (2013.01); *F21V 21/041* (2013.01); *F21V 21/042* (2013.01); *F21V 21/043* (2013.01); *F21V 21/044* (2013.01); *F21V 21/045* (2013.01); *F21V 21/046* (2013.01); *F21V 21/048* (2013.01); *F21V 21/049* (2013.01)

(56) References Cited

U.S. PATENT DOCUMENTS

| | | | |
|---|---|---|---|
| 1,856,356 | A | 5/1932 | Owen |
| 2,352,913 | A | 7/1944 | Parker |
| 2,758,810 | A | 8/1956 | Good |
| 2,802,933 | A | 8/1957 | Broadwin |
| 3,104,087 | A | 9/1963 | Budnick |
| 3,773,968 | A | 11/1973 | Copp |
| 3,913,773 | A | 10/1975 | Copp |
| 4,880,128 | A | 11/1989 | Jorgensen |
| 4,919,292 | A | 4/1990 | Hsu |
| 5,303,894 | A | 4/1994 | Deschamps |
| 5,420,376 | A | 5/1995 | Rajecki |
| 5,957,573 | A | 9/1999 | Wedekind |
| 6,521,833 | B1 | 2/2003 | DeFreitas |
| 6,967,284 | B1 | 11/2005 | Gretz |
| 7,784,754 | B2 | 8/2010 | Nevers |
| 7,857,275 | B2 | 12/2010 | de la Borbolla |
| 7,950,832 | B2 | 5/2011 | Tanaka |
| 8,235,549 | B2 | 8/2012 | Gingrich, III |
| 8,322,897 | B2 | 12/2012 | Blincoe |
| 8,545,064 | B2 | 10/2013 | Blincoe |
| 8,680,755 | B2 | 3/2014 | Lim |
| 8,845,144 | B1 | 9/2014 | Davis |
| 8,926,133 | B2 | 1/2015 | Booth |
| 9,039,254 | B2 | 5/2015 | Danesh |
| 9,151,457 | B2 | 10/2015 | Pickard |
| 9,404,639 | B2 | 8/2016 | Bailey |
| 9,523,493 | B2 | 12/2016 | Chen |
| 9,605,842 | B1 | 3/2017 | Davis |
| 9,673,597 | B2 | 6/2017 | Lee |
| 9,696,021 | B2 | 7/2017 | Wronski |
| 9,797,562 | B2 | 10/2017 | Dabiet |
| 9,854,642 | B2 | 12/2017 | Kashani |
| 9,890,942 | B2 | 2/2018 | Lin |
| 9,945,548 | B2 | 4/2018 | Williams |
| 9,964,266 | B2 | 5/2018 | Danesh |
| 10,072,805 | B2 | 9/2018 | Bailey |
| D832,218 | S | 10/2018 | Wronski |
| D833,977 | S | 11/2018 | Danesh |
| 10,125,958 | B1* | 11/2018 | Wronski ............. F21V 21/047 |
| 10,139,059 | B2 | 11/2018 | Danesh |
| 10,244,607 | B1 | 3/2019 | Kashani |
| D847,414 | S | 4/2019 | Danesh |
| D847,415 | S | 4/2019 | Danesh |
| 10,247,390 | B1 | 4/2019 | Kopitzke |
| D848,375 | S | 5/2019 | Danesh |
| D851,046 | S | 6/2019 | Peng |
| 10,378,738 | B1 | 8/2019 | Davis |
| 10,408,395 | B2 | 9/2019 | Danesh |
| 10,408,396 | B2 | 9/2019 | Wronski |
| D864,877 | S | 10/2019 | Danesh |
| 10,429,039 | B1* | 10/2019 | Paulsel ................ F21V 17/02 |
| 10,488,000 | B2 | 11/2019 | Danesh |
| 10,551,044 | B2 | 2/2020 | Peng |
| 10,563,850 | B2 | 2/2020 | Danesh |
| D877,957 | S | 3/2020 | Kopitzke |
| 10,591,120 | B2 | 3/2020 | Bailey |
| 10,609,785 | B1 | 3/2020 | Fardadi |
| 10,616,968 | B2 | 4/2020 | Wang |
| 10,663,127 | B2 | 5/2020 | Danesh |
| 10,663,153 | B2 | 5/2020 | Nikooyan |
| 10,753,558 | B2 | 8/2020 | Danesh |
| 10,805,997 | B2 | 10/2020 | Wang |
| 10,816,148 | B2 | 10/2020 | Danesh |
| D901,398 | S | 11/2020 | Danesh |
| D902,871 | S | 11/2020 | Danesh |
| D903,605 | S | 12/2020 | Danesh |
| D905,327 | S | 12/2020 | Williams |
| D907,284 | S | 1/2021 | Danesh |
| 10,975,570 | B2 | 4/2021 | Shen |
| 10,982,829 | B2 | 4/2021 | Danesh |
| 10,989,390 | B2 | 4/2021 | Lotfi |
| 11,022,259 | B2 | 6/2021 | Bailey |
| 11,028,982 | B2 | 6/2021 | Danesh |
| 11,047,538 | B2 | 6/2021 | Danesh |
| D924,467 | S | 7/2021 | Danesh |
| D925,109 | S | 7/2021 | Danesh |
| 11,060,705 | B1 | 7/2021 | Danesh |
| 11,067,231 | B2 | 7/2021 | Lotfi |
| 11,085,597 | B2 | 8/2021 | Danesh |
| 11,118,768 | B2 | 9/2021 | Danesh |
| 2013/0308310 | A1* | 11/2013 | Wilk ...................... F21S 41/19 362/249.02 |
| 2014/0254177 | A1 | 9/2014 | Danesh |
| 2015/0009676 | A1 | 1/2015 | Danesh |
| 2015/0233556 | A1 | 8/2015 | Danesh |
| 2015/0276185 | A1 | 10/2015 | Bailey |
| 2016/0312987 | A1 | 10/2016 | Danesh |
| 2016/0348860 | A1 | 12/2016 | Bailey |
| 2016/0348861 | A1 | 12/2016 | Bailey |
| 2017/0005460 | A1 | 1/2017 | Lee |
| 2017/0045213 | A1 | 2/2017 | Williams |
| 2017/0051880 | A1 | 2/2017 | Joye |
| 2017/0138576 | A1 | 5/2017 | Peng |
| 2017/0167672 | A1 | 6/2017 | Stauner |
| 2017/0167699 | A1 | 6/2017 | Schubert |
| 2017/0290129 | A1 | 10/2017 | Kashani |
| 2017/0314750 | A1* | 11/2017 | Feldman ............... F21V 17/162 |
| 2018/0231197 | A1 | 8/2018 | Danesh |
| 2018/0372284 | A1 | 12/2018 | Danesh |
| 2019/0049080 | A1 | 2/2019 | Danesh |
| 2019/0063701 | A1 | 2/2019 | Lotfi |
| 2019/0093836 | A1 | 3/2019 | Danesh |
| 2019/0394849 | A1 | 12/2019 | Wang |
| 2020/0056752 | A1 | 2/2020 | Danesh |
| 2020/0116340 | A1 | 4/2020 | Nikooyan |
| 2020/0158302 | A1 | 5/2020 | Danesh |
| 2020/0232624 | A1 | 7/2020 | Lotfi |
| 2020/0236755 | A1 | 7/2020 | Wang |
| 2020/0291652 | A1 | 9/2020 | Shen |
| 2020/0348000 | A1 | 11/2020 | Bailey |
| 2020/0386375 | A1 | 12/2020 | Danesh |
| 2020/0393118 | A1 | 12/2020 | Danesh |
| 2021/0010647 | A1 | 1/2021 | Danesh |
| 2021/0010663 | A1 | 1/2021 | Nikooyan |
| 2021/0033268 | A1 | 2/2021 | Danesh |
| 2021/0041070 | A1 | 2/2021 | Danesh |
| 2021/0071836 | A1 | 3/2021 | Danesh |
| 2021/0080084 | A1 | 3/2021 | Danesh |
| 2021/0262650 | A1 | 8/2021 | Danesh |

FOREIGN PATENT DOCUMENTS

| | | | |
|---|---|---|---|
| EP | 3521688 A1 | 7/2019 | |
| KR | 100970504 B1 * | 7/2010 | |
| KR | 102043086 B1 * | 11/2019 | ............. F21S 8/026 |
| WO | WO2010051985 A1 | 5/2010 | |
| WO | WO-2010079205 A1 * | 7/2010 | ............... F21S 8/02 |
| WO | WO-2012055368 A1 * | 5/2012 | ............... F21S 8/02 |
| WO | WO2018237294 A2 | 12/2018 | |
| WO | WO2018237294 A3 | 12/2018 | |
| WO | WO2019046310 A1 | 3/2019 | |
| WO | WO2019133669 A1 | 7/2019 | |
| WO | WO2019222259 A1 | 11/2019 | |

(56) References Cited

FOREIGN PATENT DOCUMENTS

| WO | WO2019241198 A1 | 12/2019 |
| WO | WO2021051101 A1 | 3/2021 |

OTHER PUBLICATIONS

US 10,969,069 B2, 04/2021, Danesh (withdrawn)
Machine translation of WO 2010079205 A1 retrieved from the FIT database of PE2E search. (Year: 2023).*
Machine translation of CN 202991730 U retrieved from the FIT database of PE2E search. (Year: 2023).*
Machine translation of KR 100970504 B1 retrieved from the FIT database of PE2E search. (Year: 2023).*
Machine translation of CN 206496272 U retrieved from the FIT database of PE2E search. (Year: 2023).*
Machine translation of KR 102043086 B1 retrieved from the FIT database of PE2E search. (Year: 2024).*
Machine translation of WO 2012/055368 A1 retrieved from the FIT database of PE2E search. (Year: 2024).*
NORA Lighting NIO-TLSUCTION suction cup to assist with removing trimless reflector from finished ceiling. https://noralighting.com/product/nio-tlsuction/ (last visited on Sep. 21, 2021).
DMF Lighting OneFrame Flangeless Trim DRD2TRJDSWHFL Installation. https://vimeo.com/169758683 (last visited on Sep. 21, 2021).
WAC Lighting, Aether 3.5: Trimless Downlight Round https://www.waclighting.com/product/aether-3-5-5/ (last visited on Sep. 21, 2021).
Tech Lighting, flangeless trims, and flangeless installation http://www.element-lighting.com/Products/Details/ENTRA-3-LED-Adjustable-Downlight (last visited on Sep. 21, 2021).
Creative Systems Lighting, round trimless (p. 2) and square trimless (p. 4) https://cdn.hvlgroup.com/csl/pdf/line-drawing/A3-4_linedwg.pdf (last visited on Sep. 21, 2021)).
Creative Systems Lighting, Acrobat 3in Adjustable Reflector Round Trimless Trim https://csllighting.com/Product/A3-4RWH (last visited Sep. 21, 2021).
Fusion Lighting by Elite Lighting, round trimless and square trimless https://media.iuseelite.com/specsheet2/er3-led-ic.pdf (last visited Sep. 21, 2021).
DMF DRD2 Product Publicly available at least as early as Sep. 6, 2018 Website: https://www.dmflighting.com/product/drd2/.
DMF DRD4 Product Publicly available at least as early as Sep. 6, 2018 Website: https://www.dmflighting.com/product/drd4/.
ELCO E247 Product Publicly available at least as early as Sep. 6, 2018 See attached concurrently filed NPL document with two product images of this ELCO E247 Product.
SORAA LED Optical Light Engine See: https://res.cloudinary.com/soraa/image/upload/v1516986148/resources/misc/ole-more-info-pdf.pdf.
IMTRA Tide PowerLED Light Fixture See: https://www.imtra.com/1806fa8d-4593-40f4-bbf0-f9a833e92148/lighting-light-fixtures-detail.htm Publicly available at least as early as 2012.
ELCO 4" Round LED Reflector Insert Publicly available at least as early as Mar. 23, 2021 Website: https://elcolighting.com/products/4-round-led-reflector-insert.
ELCO 4" Five-Color Temperature Switch LED Reflector Inserts Publicly available at least as early as Mar. 23, 2021 Website: https://elcolighting.com/node/1432026.
MaxLite Publicly available at least as early as Mar. 23, 2021 Website: https://www.maxlite.com/news-and-events/2021/02/05/maxlite-introduces-canless-commercial-downlights-with-field-selectable-wattages-and-ccts/ And.
Soraa Vivid MR16—GU10; https://www.soraa.com/products/19-MR16-GU10.php (last visited Nov. 9, 2021).
NORA Lighting, NIOB-2RNDC https://noralighting.com/product/niob-2rndc/.
NORA Lighting, NIO-4RPH https://noralighting.com/product/nio-4rph/.
NORA Lighting, NIOB-1RNG https://noralighting.com/product/niob-1rng/.
NORA Lighting https://noralighting.com/product-category/products/pendants/cylinder/.
NORA Lighting https://noralighting.com/product-category/products/pendants/ilene-mini-cylinder/.
BRUCK Lighting https://brucklighting.com/download/b/GX15/Spec%20Sheets/GX15%20Cylinder%20Multi-Mount%20Spec%20Sheet.pdf.
Elite LED Lighting https://iuseelite.com/product-category/architectural-cylinders/?characteristics=c%2Bq.
DMF Lighting https://www.dmflighting.com/wp-content/uploads/2021/12/DMFLighting_DCC_Spec_Sheet.pdf.
Integrated Lighting Module A.
Integrated Lighting Module B.

* cited by examiner

TOOLLESS CLICK-IN OR CLICK-OUT DOWNLIGHT

PRIORITY NOTICE

The present patent application is a continuation-in-part (CIP) of U.S. non-provisional patent application Ser. No. 17/486,845 filed on Sep. 27, 2021, and claims priority to said U.S. non-provisional patent application under 35 U.S.C. § 120. The above-identified patent application is incorporated herein by reference in its entirety as if fully set forth below.

TECHNICAL FIELD OF THE INVENTION

The present invention relates in general to overall-assemblies for lighting that include a spackle-frame and a downlight and more specifically to overall-assemblies for lighting that include a spackle-frame and a downlight, wherein the downlight is removably attachable to the spackle-frame without use of external tools.

Copyright and Trademark Notice

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Prior art spackle-frames may be attached to ceiling drywall over a hole to receive a prior art downlight into that hole to provide ceiling can lighting. Often the prior art downlight is attached to that prior art spackle-frame with mechanical-fasteners (e.g., screws) and tools (e.g., screwdrivers). Often once the prior art downlight is attached to the prior art spackle-frame, it is relatively difficult, cumbersome, and/or requires use of external tools to detach that prior art downlight from that prior art spackle-frame.

There is a need in the art for a new downlight that is removably attachable to a new spackle-frame, without using or needing any external tools, and by employing a simple push-in motion for both removably attaching the new downlight to the new spackle-frame and for removably detaching the new downlight from the new spackle-frame; similar to the click-down motion of a ballpoint pen that both extends the pen tip and retracts the pen tip within the pen's housing. A click-in motion by pushing the new downlight up may removably attach the new downlight to the new spackle-frame; and a click-out motion also by pushing the new downlight up may removably detach the new downlight from the new spackle-frame. This may permit the new downlight to be readily and easily removed from the new spackle-frame; and then that same new downlight readily and easily reinstalled into that new spackle-frame or a different new downlight installed into that new spackle-frame. This allows quick and easy maintenance of the new downlight, making adjustments of the new downlight, changing light parameters of the new downlight (e.g., luminosity, color, temperature, and/or the like), replacing the new downlight, and/or the like.

It is to these ends that the present invention has been developed.

BRIEF SUMMARY OF THE INVENTION

To minimize the limitations in the prior art, and to minimize other limitations that will be apparent upon reading and understanding the present specification, some embodiments of the present invention may describe an overall-assembly of a downlight, with a flangeless trim, and a spackle-frame that have complementary structures for repeatably attaching or detaching the downlight to the spackle-frame merely by pushing the downlight into a main and largest central hole of the spackle-frame and without use of any external/separate tools. In some embodiments, the flangeless trim may have some upward protruding members (anchors-for-clips) that may be configured to removably attach/detach to clips and housings-for-clips. In some embodiments, the clips may be at least mostly housed (retained) within the housings-for-clips. In some embodiments, the clips and the housings-for-clips may be retained in structures (brackets-for-housings) of the spackle-frame. In some embodiments, the spackle-frame would typically be permanently installed within an appropriately sized hole in drywall (or the like), such as, but not limited to, ceiling drywall. The appropriately sized hole in the drywall would be large enough to fit the downlight into that hole, but small enough for a disk portion of the spackle-frame to be attached to that drywall. In this way, such downlights may be readily installed or removed and all without use of external/separate tools. Thus, such downlights may be clicked-in to be removably mounted to its spackle-frame and also then clicked-out to be removably detached/uncoupled from its spackle-frame, in a similar manner that a point of a ballpoint pen may be extended or retracted with a click down motion.

It is an objective of the present invention to provide an overall-assembly configured for lighting that has a spackle-frame and a removable downlight (downlight-assembly).

It is another objective of the present invention to provide the overall-assembly configured for lighting that has a spackle-frame and a removable downlight (downlight-assembly), wherein this spackle-frame is attachable to drywall (or the like), and wherein this downlight is removably attachable to the spackle-frame.

It is another objective of the present invention to provide the overall-assembly configured for lighting that has a spackle-frame and a removable downlight (downlight-assembly), wherein this spackle-frame is attachable to drywall (or the like), wherein this downlight is removably attachable to the spackle-frame, wherein the removable attachment between the spackle-frame and the downlight is done by a click-in or click-out motion, respectively.

It is another objective of the present invention to provide the overall-assembly configured for lighting that has a spackle-frame and a removable downlight (downlight-assembly), wherein this spackle-frame is attachable to drywall (or the like), wherein this downlight is removably attachable to the spackle-frame, wherein the removable attachment between the spackle-frame and the downlight is done without using any external tools (i.e., external to this overall-assembly).

It is another objective of the present invention a flangeless trim member of the downlight.

It is another objective of the present invention a flangeless trim member of the downlight, wherein it is the flangeless trim member that is removably attachable to the spackle-frame.

It is yet another objective of the present invention a flangeless trim member of the downlight, wherein it is the flangeless trim member that is removably attachable to the spackle-frame, wherein the removable attachment between the flangeless trim member and the spackle-frame is accomplished by upward extending member of the flangeless trim member and by clips and housings that are retained by the spackle-frame.

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

Figure 1A:
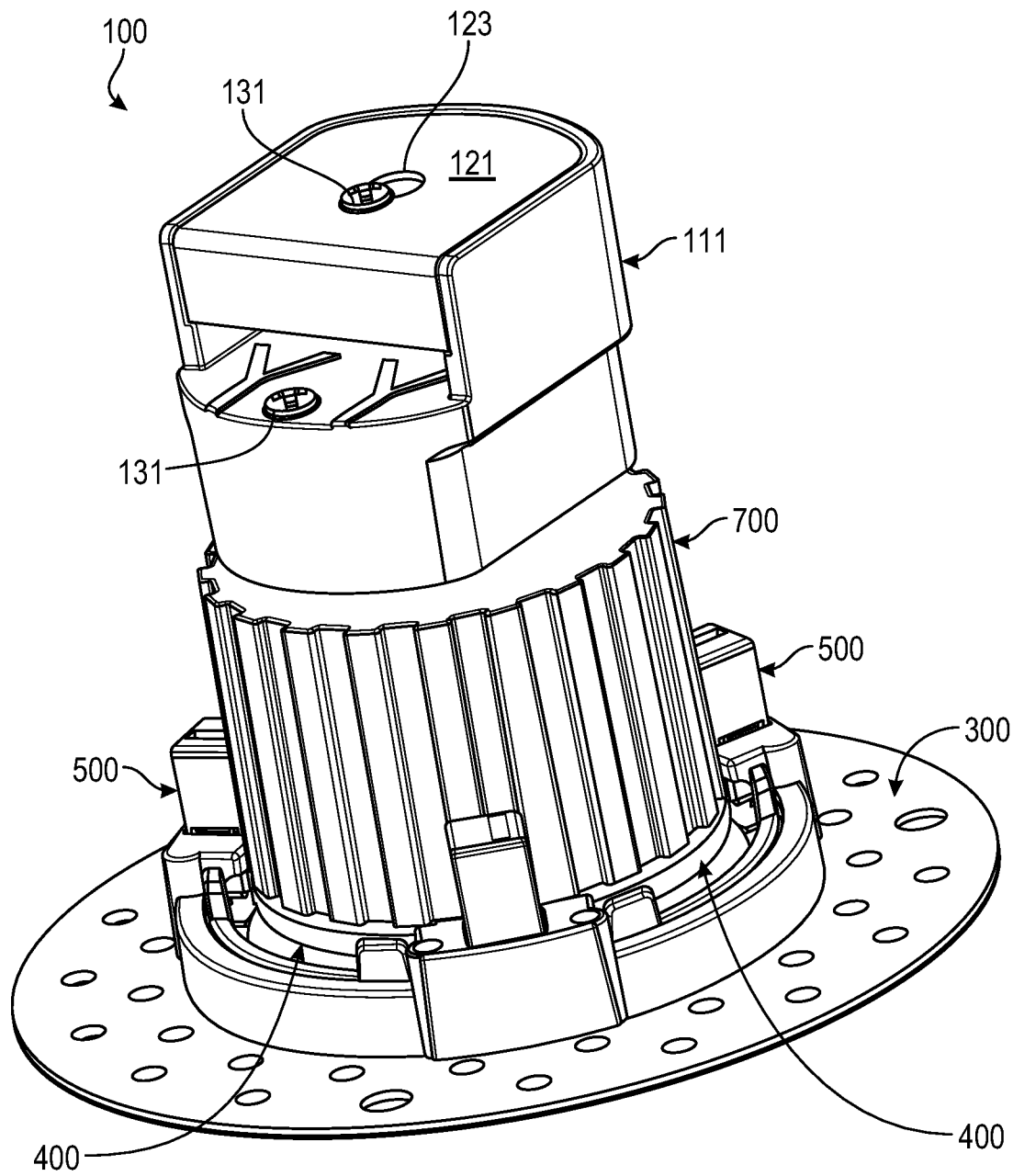
FIG. 1A shows a top perspective view of an overall-assembly configured for lighting that has a spackle-frame and a removable downlight (downlight-assembly).

REFERENCE NUMERAL SCHEDULE 100 overall-assembly 100
111 housing-for-transformer/driver 111
121 cover 121
123 hole 123
131 fastener 131
300 spackle-frame 300
400 trim 400
500 housing-for-clip 500
700 heat sink 700
201 downlight-assembly 201
211 reflector 211
221 LED (light emitting diode) 221
300 spackle-frame 300
301 disk 301
303 outer-edge 303
305 hole (larger) 305
307 hole (smaller) 307
309 raised-annular-ring 309
311 bracket-for-housing 311
313 prong 313
315 gap (between prongs) 315
317 shelf 317
321 inside-diameter 321
323 inside-diameter 323
325 outside-diameter 325
331 bottom 331
333 channel 333
400 trim 400
401 top 401
403 bottom 403
405 attachment-means (threading) 405
407 outside-edge 407
411 anchor-for-clip 411
413 elongate-portion 413
415 head 415
421 raised (curved) sidewall 421
431 raised-protrusion 431
441 gap 441
451 interior-of-conical-frustum 451
500 housing-for-clip 500
501 top 501
503 bottom 503
505 bottom-opening 505
507 narrower-side-wall 507
509 wider-side-wall 509
511 ledge 511
513 side-opening 513
515 tab 515
517 side-slot 517
519 top-slot 519
600 clip 600
601 base 601
603 push-surface (support) 603
605 prong 605
607 pivot/flex region 607
609 barb/catch 609
611 gap 611
700 heat sink 700
701 top 701
703 bottom 703
705 standoff 705
707 secondary-top 707
709 hole 709
711 hole 711
715 fin 715
717 gap 717
721 bottom-of-secondary-top 721
723 internal-fin 723
725 attachment-means (threading) 725
800 overall-assembly 800
801 spackle-frame 801
803 trim 803
900 mounted-click-in-configuration 900
901 downlight-assembly 901
950 removed-clicked-out-configuration 950
1000 mounted-click-in-configuration 1000
1001 distance 1001
1050 prong-disengagement-configuration 1050
1075 removed-clicked-out-configuration 1075
1077 distance 1077

DETAILED DESCRIPTION OF THE INVENTION

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized and changes may be made without departing from the scope of the invention.

Figure 1B:
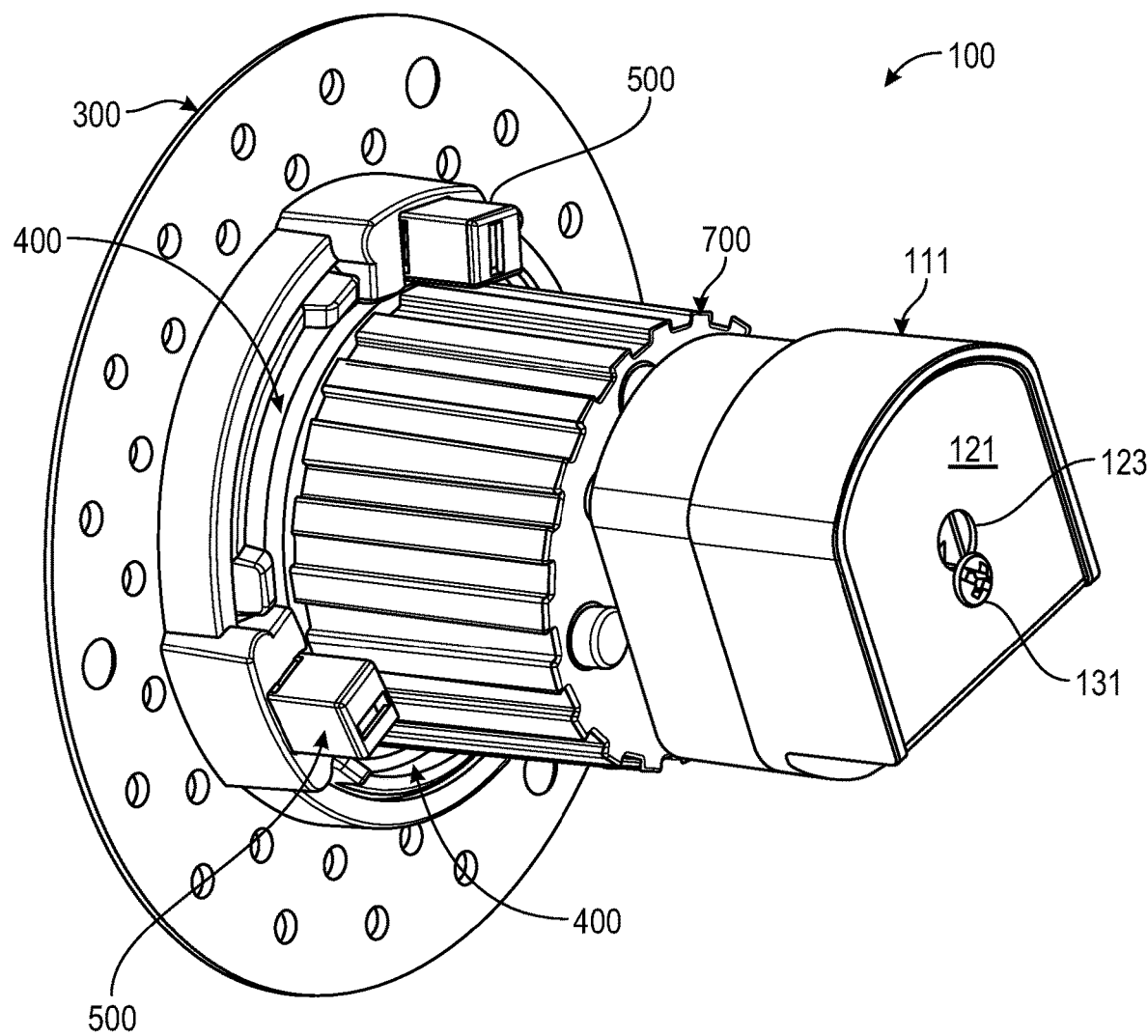
FIG. 1B shows another/different (as compared to the view from FIG. 1A) top perspective view of the overall-assembly from FIG. 1A.
Figure 1C:
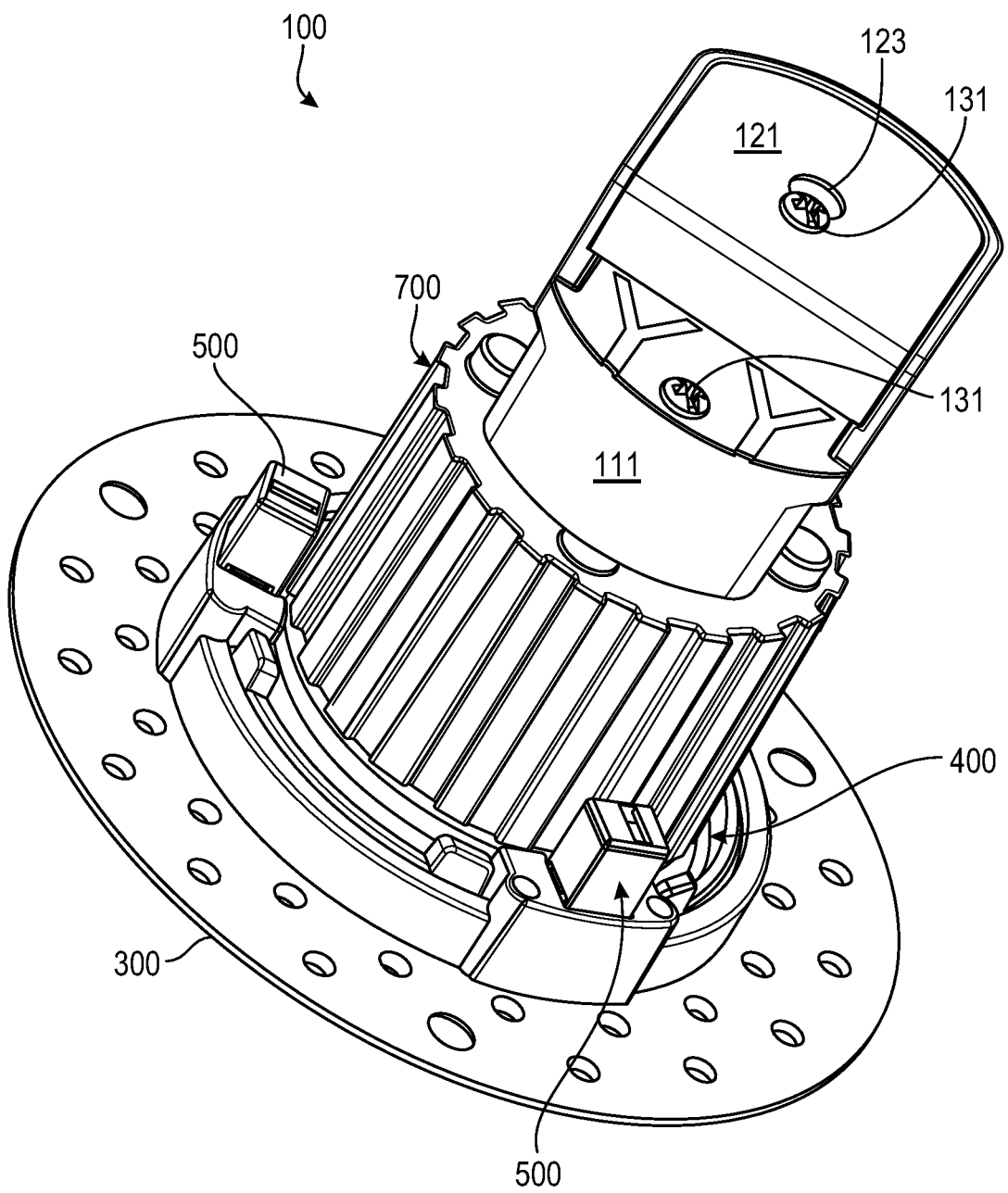
FIG. 1C shows yet another/different (as compared to the views from FIG. 1A and/or from FIG. 1B) top perspective view of the overall-assembly from FIG. 1A.
Figure 1D:
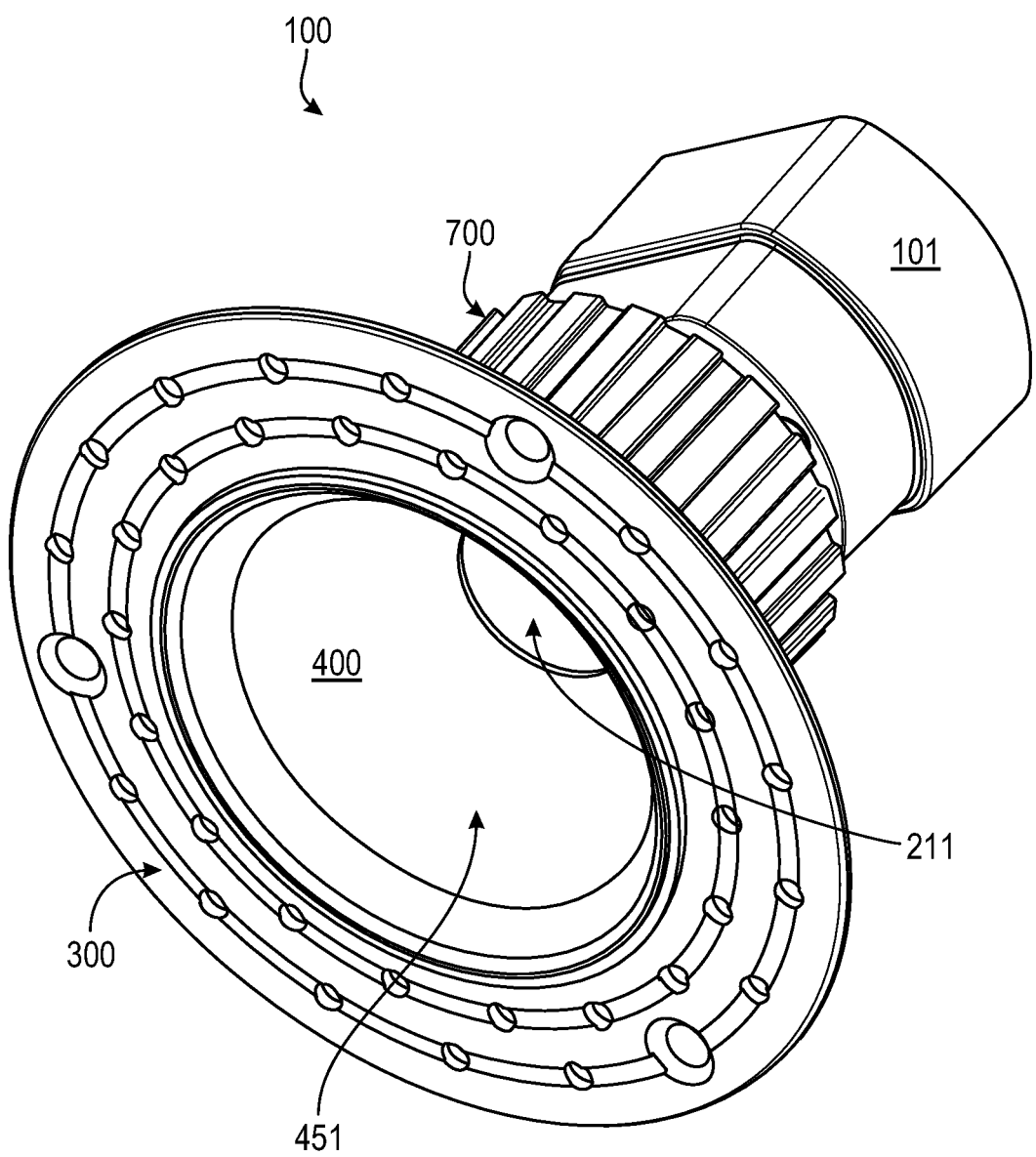
FIG. 1D shows a bottom perspective view of the overall-assembly from FIG. 1A.
Figure 2A:
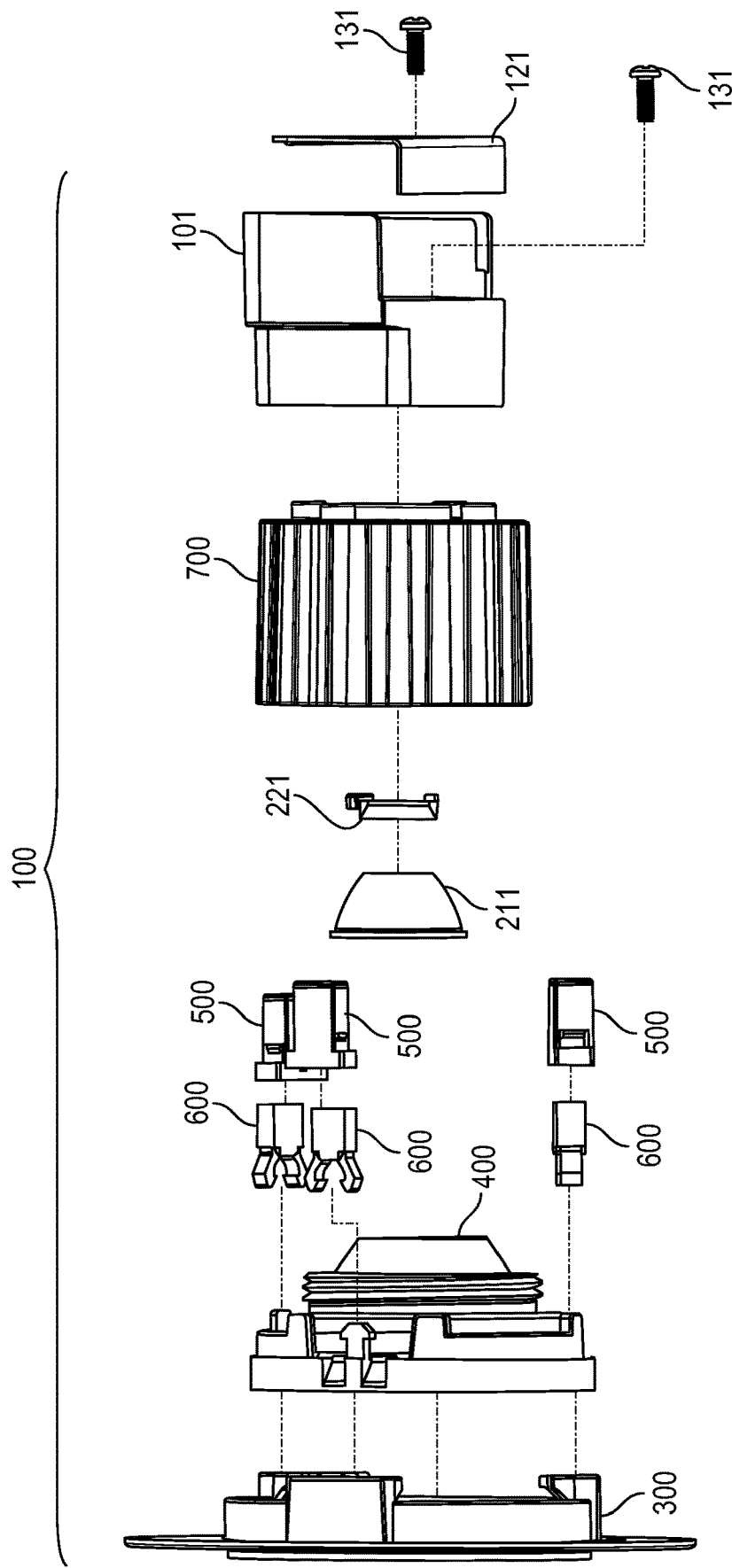
FIG. 2A shows an exploded perspective view of the overall-assembly from FIG. 1A.
Figure 2B:
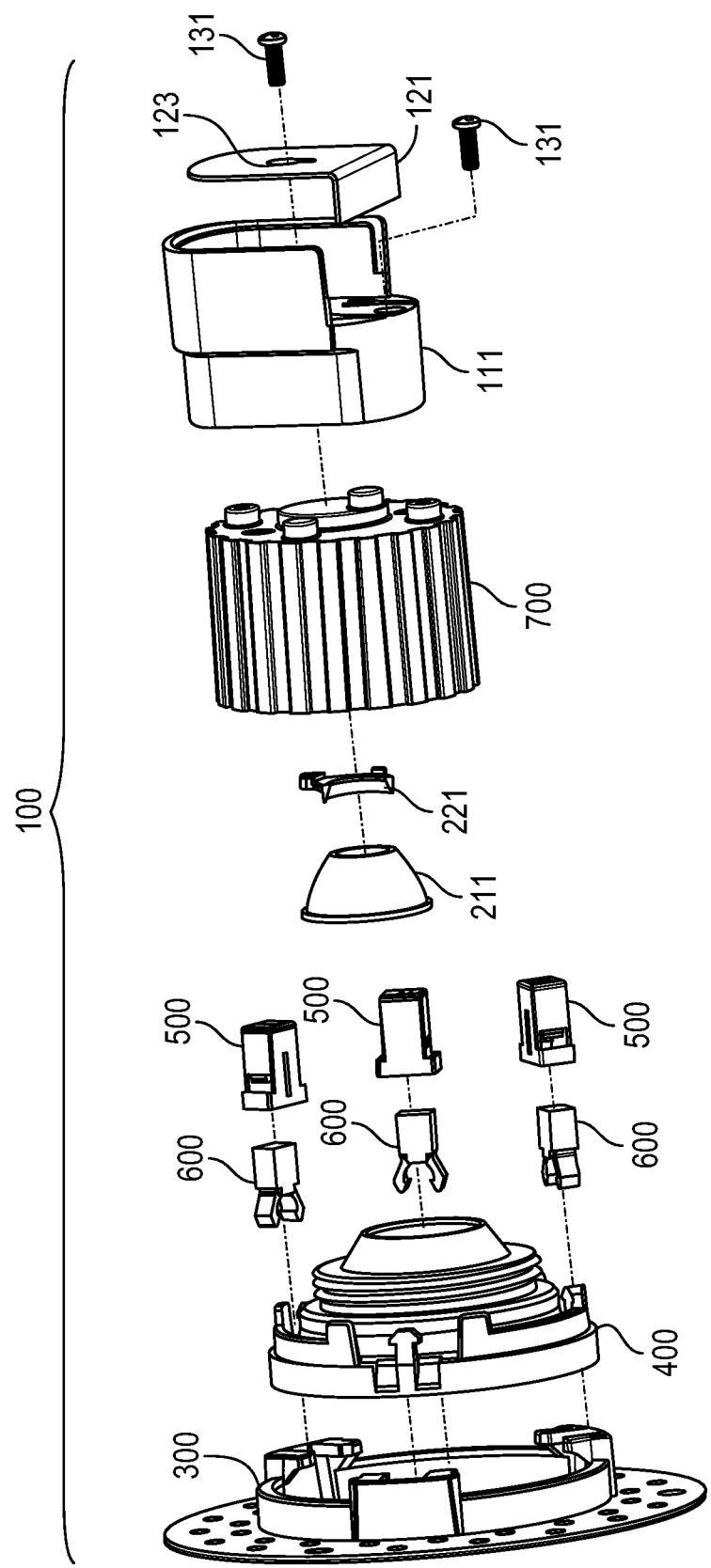
FIG. 2B shows a top perspective exploded view of the overall-assembly from FIG. 1A.
Figure 2C:
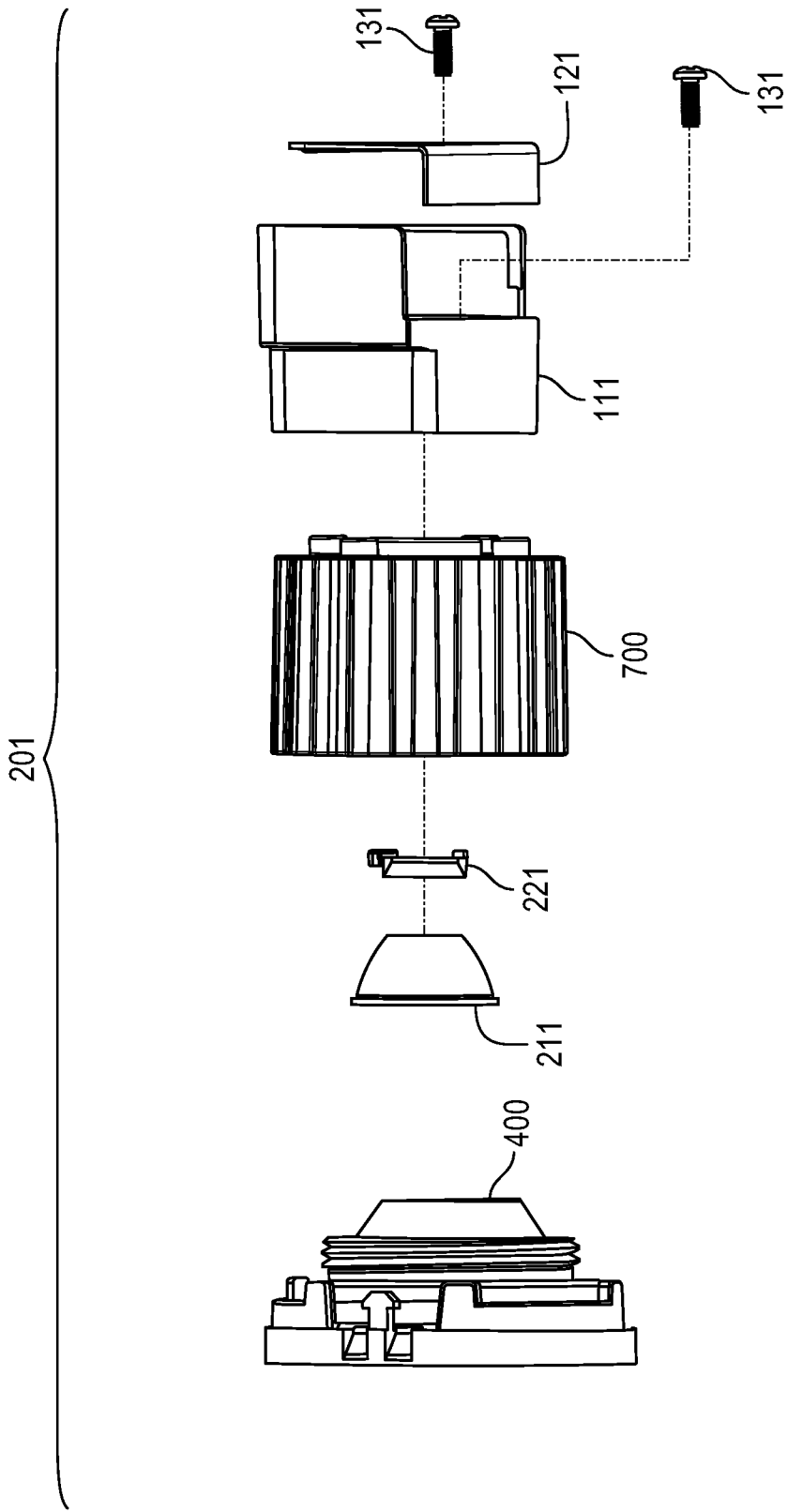
FIG. 2C shows an exploded perspective view of just a downlight-assembly that was first shown in FIG. 1A (without showing the spackle-frame and without showing the structures for attaching the downlight-assembly to the spackle-frame).

FIG. 1A shows a top perspective view of an overall-assembly 100. FIG. 1B shows another/different (as compared to the view from FIG. 1A) top perspective view of overall-assembly 100. FIG. 1C shows yet another/different (as compared to the views from FIG. 1A and/or from FIG. 1B) top perspective view of overall-assembly 100. FIG. 1D shows a bottom perspective view of overall-assembly 100. In some embodiments, overall-assembly 100 may comprise at least one downlight-assembly 201 and at least one spackle-frame 300. In some embodiments, overall-assembly 100 may comprise at least one downlight-assembly 201, at least one spackle-frame 300, at least one housing-for-clip 500, and at least one clip 600. Note, downlight-assembly 201 may be shown in FIG. 2C. Continuing discussing FIG. 1A through FIG. 1D, in some embodiments, downlight-assembly 201 may be a downlight that may be installed within a ceiling (or in a wall or floor, but most commonly within a ceiling configured to emit light downwards from that ceiling). In some embodiments, downlight-assembly 201 may comprise: housing-for-transformer/driver 111, heat sink 700, LED (light emitting diode) 221, reflector 211, and trim 400. Note, LED 221 is shown in FIG. 2A through FIG. 2C. Note, reflector 211 is shown in FIG. 2A through FIG. 2C and is partially shown in FIG. 1D. Continuing discussing FIG. 1A through FIG. 1D, in some embodiments, downlight-assembly 201 may further comprise one or more of: a transformer (an electronic hardware component) and/or a driver (an electronic hardware component) that may be at least mostly located within housing-for-transformer/driver 111; fastener(s) (e.g., fastener(s) 131); electrical wires/cables; cover 121; portions thereof; combinations thereof; and/or the like. In some embodiments, downlight-assembly 201 and/or housing-for-transformer/driver 111 may further comprise cover 121. In some embodiments, cover 121 may be a (removable) component of housing-fortransformer/driver 111.

Continuing discussing FIG. 1A through FIG. 1D, in some embodiments, housing-fortransformer/driver 111 may be a housing configured for (removably) hosing at least one electronic hardware component/part. In some embodiments, housing-for-transformer/driver 111 may be configured to house at least some of a transformer and/or at least some of a driver; wherein the transformer and/or the driver may be configured to power and/or control electrical operation of LED 221. In some embodiments, housing-for-transformer/driver 111 may have an open top. In some embodiments, cover 121 may be a cover. In some embodiments, cover 121 may be configured to close and/or seal up at least some of the open top of housing-fortransformer/driver 111. In some embodiments, cover 121 may comprise at least one hole 123. In some embodiments, hole 123 may be a hole in/through cover 121. In some embodiments, hole 123 may be a through hole pass entirely through a wall thickness of cover 121. In some embodiments, hole 123 may be configured to passage of electrical wiring/cabling. In some embodiments, fastener 131 may be a mechanical fastener that is configured to (removably) attach to housing-for-transformer/driver 111; and/or to (removably) attach cover 121 to housingfor-transformer/driver 111. In some embodiments, fastener 131 may be one or more of: a screw, a bolt, a rivet, a pin, a nail, a tack, a staple, tape, a portion thereof, combinations thereof, and/or the like.

Continuing discussing FIG. 1A through FIG. 1D, in some embodiments, heat sink 700 may be a heat sink. In some embodiments, heat sink 700 may be a at least substantially (mostly) cylindrical shaped member, with fins 715 around the cylindrical exterior sidewall of heat sink 700. In some embodiments, heat sink 700 may be configured to dissipate heat from at least some electronics of downlight-assembly 201. In some embodiments, the electronics of downlight-assembly 201 may comprise one or more of: a transformer, a driver, LED 221, wires, cables, switch, printed circuit board(s) (PCBs), circuit(s), portions thereof, combinations thereof, and/or the like. In some embodiments, in downlight-assembly 201, heat sink 700 may be disposed between housing-for-transformer/driver 111 and trim 400; however, a top portion of trim 400 may extend into a bottom interior of heat sink 700. In some embodiments, a top of heat sink 700 may be (removably) attached to a bottom portion/region of housing-fortransformer/driver 111; and/or a bottom of heat sink 700 may be (removably) attached to a top portion/region of trim 400. In some embodiments, an interior of heat sink 700 may be configured to at least mostly house LED 221 and/or reflector 211 (see e.g., FIG. 2A and/or FIG. 2B). Heat sink 700 may be shown by itself in FIG. 7A and/or in FIG. 7B.

Continuing discussing FIG. 1A through FIG. 1D, in some embodiments, trim 400 may be a trim (trim member); i.e., a portion of downlight-assembly 201 that may be at least partially visible (from below) once downlight-assembly 201 may be installed within a given ceiling (or wall or floor). Note, most of trim 400 is covered over by heat sink 700 in FIG. 1A to FIG. 1C. In some embodiments, trim 400 may be configured to function as a trim member as that term is typically understood in the downlight lighting industry. For example, and without limiting the scope of the present invention, trim 400 may comprise typical conical frustum structure (see e.g., interior-of-conical-frustum 451 in FIG. 1D and/or in FIG. 4D), similar in shape (but larger) to a lighting reflector (e.g., reflector 211); however, trim 400 may also comprise unique and novel structures that are configured to permit downlight-assembly 201 to be removably mounted to spackle-frame 300 and removably detached from spackle-frame 300, all without use of separate tools (such as, but not limited to, screwdrivers and the like). In some embodiments, at least some of these unique and novel structures of trim 400 are anchors-for-clips 411, which are not (readily) visible in FIG. 1A through FIG. 1D, because these anchors-for-clips 411 are covered over by housings-for-clip 500 in FIG. 1A through FIG. 1D. In some embodiments, in overall-assembly 100, a bottom of trim 400 may rest on a top center of spackle-frame 300; however, points of removable attachment between trim 400 and spackle-frame 300 may be accomplished via anchors-for-clips 411, housings-for-clips 500, and clips 600. In some embodiments, clips 600 are not (readily) visible in FIG. 1A through FIG. 1D (although clips 600 are present), because these clips 600 are covered over by housings-for-clip 500, just like the anchors-for-clips 411 are. In some embodiments, housing-sfor-clip 500 and clips 600 are not part of trim 400, but anchors-for-clips 411 are part of trim 400. In some embodiments, in downlight-assembly 201, the top region/portion of trim 400 may be attached to the bottom region/portion of heat sink 700. In some embodiments, trim 400 may be without (free of) a bottom exterior annular flange; i.e., trim 400 may be flangeless (whereas, most prior art trims in the lighting industry are with a bottom exterior annular flange that would overlap drywall in a typical ceiling installation covering over the hole in the drywall). The bottom exterior annular flange of flanged trim (prior art) is visible from below the ceiling once that flanged trim is installed in the ceiling. Whereas, once trim 400 may be removably mounted to spackle-frame 300 and that spackle-frame 300 has been previously mounted to the given ceiling, then no bottom exterior annular flange may be visible as trim 400 has no bottom exterior annular flange. Trim 400 is flangeless in this capacity. Trim 400 may be shown by itself in FIG. 4A through FIG. 4D.

Continuing discussing FIG. 1A through FIG. 1D, in some embodiments, spackle-frame 300 may be attached to the bottom of a given ceiling. In some embodiments, spackle-frame 300 may be attached to an exterior surface of drywall (sheetrock) over a hole in the drywall, wherein that hole may be sized to fit downlight-assembly 201. In some embodiments, spackle-frame 300 may be attached to an exterior bottom surface of drywall (sheetrock) via mechanical fasteners, such as, but not limited to, drywall screws, screws, nails, bolts, pins, glue, adhesive, portions thereof, combinations thereof, and/or the like. In some embodiments, when mudding over an exterior surface of the drywall (sheetrock) (e.g., to provide texture and/or to cover over drywall taped seams), exposed surfaces (e.g., bottom surfaces) of spackle-frame 300 (that is attached to this drywall via mechanical fasteners) may also be mudded over, hence the name of "spackle" in spackle-frame 300. The "mud" in this context may be one or more of: plaster, drywall plaster, drywall joint compound, spackle, drywall filler, drywall putty, portions thereof, combinations thereof, and/or the like. Once spackle-frame 300 may be installed in a given ceiling its bottom 331 may not be visible because of the dried/cured mud covering over bottom 331 of spackle-frame 300. Thus, once spackle-frame 300 may be installed in a given ceiling, that installation may be intended to be permanent and/or nonremovable (at least until a remodel of the given home/business/building may be done).

Continuing discussing FIG. 1A through FIG. 1D, in some embodiments, spackle-frame 300 may have two (2) main structural regions/portions, a first-portion (e.g., disk 301) that is configured for attachment to the ceiling/drywall (sheet rock) and a second-portion (e.g., not disk 301) for removably engaging with/attaching to trim 400, via the interactions of anchors-for-clips 411 (of trim 400), housings-for-clips 500, and clips 600. In some embodiments, this first-portion (e.g., disk 301) of spackle-frame 300 may be at least substantially shaped as a thin and flat annular disk/disc/ring member. In some embodiments, a bottom 331 of the first-portion (e.g., disk 301) of spackle-frame 300 may be configured to receive the drywall screws and/or the mud. In some embodiments, overall-assembly 100 and/or spackle-frame 300 may comprise housings-for-clips 500 and clips 600. In some embodiments, two (2) or more housings-for-clips 500 may be (removably) attached to spackle-frame 300 (e.g., at region(s) [e.g., brackets-for-housings 311] of the second-portion of spackle-frame 300). In some embodiments, inside of each housing-for-clip 500 may be retained one (1) clip 600. In some embodiments, each clip 600 may be removably attached to an anchor-for-clip 411 of trim 400. Recall, the clips 600 and the anchors-for-clips 411 are not (readily) visible in FIG. 1A to FIG. 1D, as both are internal of the externally visible housings-for-clips 500. Spackle-frame 300 may be shown by itself in FIG. 3A through FIG. 3C. In some embodiments, spackle-frame 300 may be a component of overall-assembly 100; but spackle-frame 300 is not a component of downlight-assembly 201.

Components/parts and/or structures included in overall-assembly 100 of FIG. 1A to FIG. 1D, but not shown explicitly in FIG. 1A to FIG. 1D, may include reflector 211, LED 221, anchors-for-clips 411, other portions of trim 400, and clips 600.

FIG. 2A shows an exploded perspective view of overall-assembly 100. FIG. 2B shows a top perspective exploded view of overall-assembly 100. FIG. 2A and FIG. 2B may show at least the main parts/components of overall-assembly 100 separated from each and in a relational manner indicative of their assembled configuration as shown in FIG. 1A to FIG. 1D.

FIG. 2C shows an exploded perspective view of just downlight-assembly 201. FIG. 2C may show at least the main parts/components of downlight-assembly 201 separated from each. In some embodiments, downlight-assembly 201 may comprise: housing-fortransformer/driver 111, optionally cover 121, heat sink 700, LED (light emitting diode) 221, reflector 211, and trim 400. Spackle-frame 300, housings-for-clip(s) 500, and clip(s) 600 are not included in downlight-assembly 201. FIG. 2C is the same as FIG. 2A, except in FIG. 2C spackle-frame 300, housings-for-clip(s) 500, and clip(s) 600 are not shown/included.

Continuing discussing FIG. 2A through FIG. 2C, in some embodiments, overall-assembly 100 and/or downlight-assembly 201 may comprise at least one LED 221. In some embodiments, LED 221 may be an electronically powered light source. In some embodiments, LED 221 may comprise one or more: a light emitting diode (LED); a fluorescent light source; a halogen light source; an incandescent light source; a neon light source; another type of electrically powered light source, a portion thereof; combinations thereof; and/or the like. In some embodiments, LED 221 may be configured to emit light of one or more of: a particular/predetermined color; a particular/predetermined light temperature (e.g., as called out in Kelvins); a particular/predetermined light brightness/luminosity; a particular/predetermined light wavelength; portion thereof; combinations thereof; and/or the like. In some embodiments, LED 221 may further comprise a circuit, a PCB (printed circuit board), a chip, wires/cables, portion thereof, combination thereof, and/or the like. In some embodiments, in downlight-assembly 201, LED 221 may be housed and/or mounted within heat sink 700. In some embodiments, LED 221 may be operationally connected to a driver/transformer that may be at least partially located within housing-for-transformer/driver 111.

Continuing discussing FIG. 2A through FIG. 2C, in some embodiments, overall-assembly 100 and/or downlight-assembly 201 may comprise at least one reflector 211. In some embodiments, reflector 211 may be conical frustum shaped member with interior surfaces that are configured to reflect light out of a bottom (larger diameter opening) of reflector 211 of at least some light received from LED 221. In some embodiments, reflector 211 may be housed and/or mounted within heat sink 700, with LED 221 located on top of reflector 211 (at the smaller diameter opening).

Figure 3A:
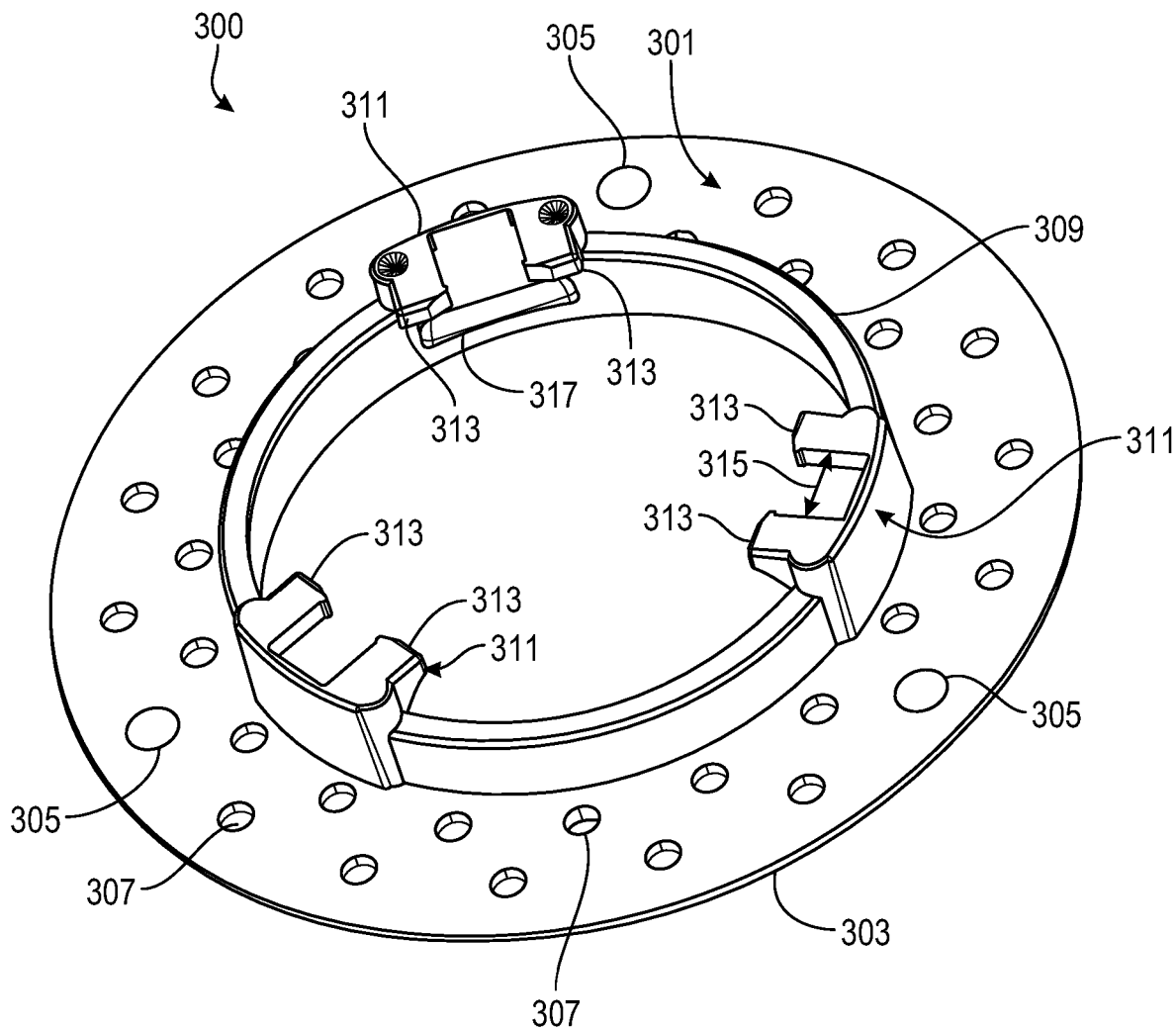
FIG. 3A shows a top perspective view of the spackle-frame that was first partially shown in FIG. 1A as part of the overall-assembly.

FIG. 3A shows a top perspective view of spackle-frame 300. In some embodiments, spackle-frame 300 may have two (2) main structural regions/portions, a first-portion (e.g., disk 301) that is configured for attachment to the ceiling/drywall (sheet rock) and a second-portion for removably engaging with/attaching to trim 400, via the interactions of anchors-for-clips 411 (of trim 400), housings-for-clips 500, and clips 600. In some embodiments, this first-portion of spackle-frame 300 may be of and/or may comprise disk 301 with an outer-edge 303 of a predetermined, fixed, and non-variable outside-diameter 325 (see FIG. 3B for outside-diameter 325). In some embodiments, disk 301 may be a flat, thin, annular disk member with a single centrally located largest through hole (e.g., of inside-diameter 321 shown in FIG. 3B), sized to fit at least a portion of trim 400 therein. In some embodiments, disk 301 may comprise at least one smaller through hole. In some embodiments, disk 301 may comprise one or more smaller through holes. In some embodiments, disk 301 may comprise a plurality of smaller through holes. In some embodiments, these smaller through hole(s) of disk 301 may be hole(s) 305 and/or hole(s) 307. In some embodiments, hole 305 may be larger than hole 307. In some embodiments, the single centrally located largest through hole (e.g., of inside-diameter 321) of disk 301 may be significantly larger than hole(s) 305 and/or significantly larger than hole(s) 307. In some embodiments, hole 305 may be configured to receive and retain a drywall fastener, such as, but not limited to, a drywall screw, a wood screw, a screw configured for attaching to a metal stud, and/or the like. In some embodiments, holes 305 may be arranged at least substantially (mostly) equidistant from each other on disk 301. In some embodiments, three (3) holes 305 may be arranged at least substantially (mostly) triangularly equidistant from each other on disk 301. In some embodiments, holes 307 may be more numerous than holes 305.

Continuing discussing FIG. 3A, in some embodiments, the second-portion of spackle-frame 300 may comprise a raised-annular-ring 309. In some embodiments, raised-annular-ring 309 may be region of raised annular ring material that extends/projects upwards from atop of disk 301 at or near the single centrally located largest through hole (e.g., of inside-diameter 321) of disk 301. In some embodiments, a height of raised-annular-ring 309 raised up from the top of disk 301 at or near the single centrally located largest through hole (e.g., of inside-diameter 321) of disk 301 does so in a predetermined, finite, fixed, and non-variable manner.

Figure 3B:
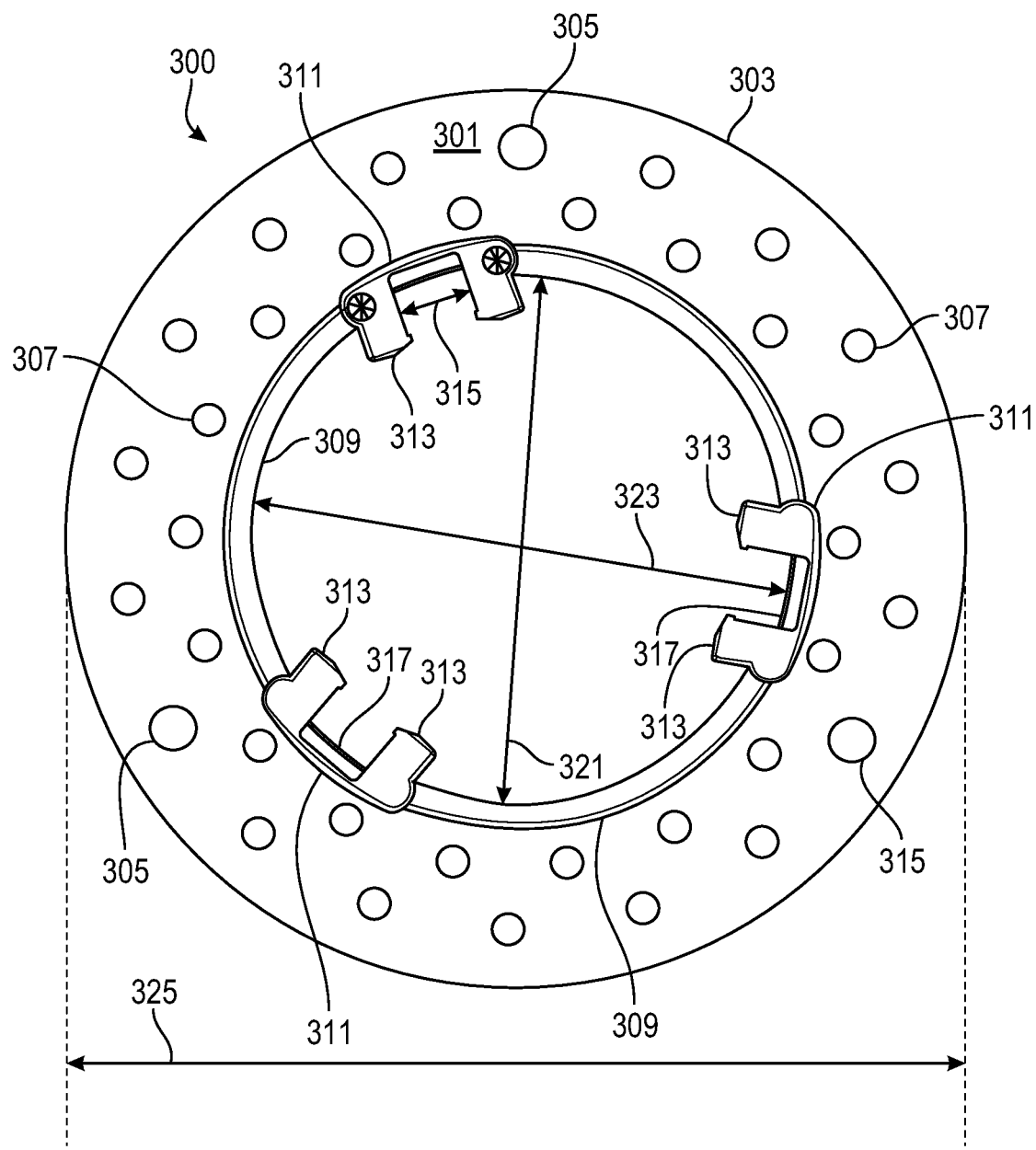
FIG. 3B shows a top view of the spackle-frame that was first partially shown in FIG. 1A as part of the overall-assembly.

In some embodiments, the height of raised-annular-ring 309 is predetermined, finite, fixed, and non-variable. In some embodiments, attached to and extending at least partially above the upper most height of raised-annular-ring 309 may be two (2) or more brackets-for-housings 311. In some embodiments, a given bracket-for-housing 311 may be configured to (removably) retain one (1) housing-for-clip 500 therein. In some embodiments, each bracketfor-housing 311 may comprise two (2) inward extending/protruding prongs 313. In some embodiments, prongs 313 may extend away from disk 301, away from outer-edge 303, and/or away from hole(s) 305/307 and towards a shared/common longitudinal and/or axial center of spackle-frame 300. In some embodiments, a given housing-for-clip 500 may be (removably) retained between two such prongs 313 of a given bracket-for-housing 311 (see e.g., FIG. 1A through FIG. 1C). Continuing discussing FIG. 3A, in some embodiments, between a pair of adjacent prongs 313 of a given bracket-for-housing 311 may be a gap 315. In some embodiments, gap 315 may be sized (and/or shaped) to fit a given housing-for-clip 500 within gap 315. In some embodiments, gap 315 may be at least substantially (mostly) fixed, finite, predetermined, and/or non-variable. In some embodiments, located below each pair of adjacent prongs 313 of a given bracket-for-housing 311 may be a shelf 317 (ledge 317). In some embodiments, a given shelf 317 extends/protrudes inwards from inside-diameter 321 of raisedannular-ring 309 towards the shared/common longitudinal and/or axial center of spackle-frame 300. (Note, inside-diameter 321 is shown in FIG. 3B.) In some embodiments, below each bracket-for-housing 311 may be one such shelf 317; and/or each bracket-for-housing 311 may comprise one such shelf 317. In some embodiments, shelf 317 may be configured to support a bottom 503 of housing-for-clip 500. Note, bottom 503 of housing-for-clip 500 may be shown in FIG. 5A. Continuing discussing FIG. 3A, in some embodiments, shelves 317 does not exist everywhere around inside-diameter 321, only at and below each bracket-for-housing 311.

FIG. 3B shows a top view of spackle-frame 300. FIG. 3B shows top portions of disk 301, holes 305, holes 307, raised-annular-ring 309, brackets-for-housings 311, prongs 313, and shelves 317. FIG. 3B also shows inside-diameter 321, inside-diameter 323, and outside-diameter 325. In some embodiments, inside-diameter 321 may be an inside diameter of raisedannular-ring 309. In some embodiments, most portions of trim 400 may be sized and shaped to fit (upwards from a bottom of spackle-frame 300) within inside-diameter 321. In some embodiments, inside-diameter 323 may be an inside diameter from an inside edge of a given shelf 317 to a linearly directly opposite inside surface of raised-annular-ring 309 that is a shortest distance away from the inside edge of that given shelf 317. See e.g., FIG. 3B. In some embodiments, inside-diameter 323 may be (slightly) larger than inside-diameter 321. (In some embodiments, inside-diameter 321 may be shorter/smaller than inside-diameter 323.) In some embodiments, outside-diameter 325 may be an outside diameter of the entire spackle-frame 300. In some embodiments, outside-diameter 325 may be larger than inside-diameter 321 and/or larger than inside-diameter 323. In some embodiments, inside-diameter 321, inside-diameter 323, and outside-diameter 325 may be of three different dimensions that are fixed, finite, non-variable, and/or predetermined.

Figure 3C:
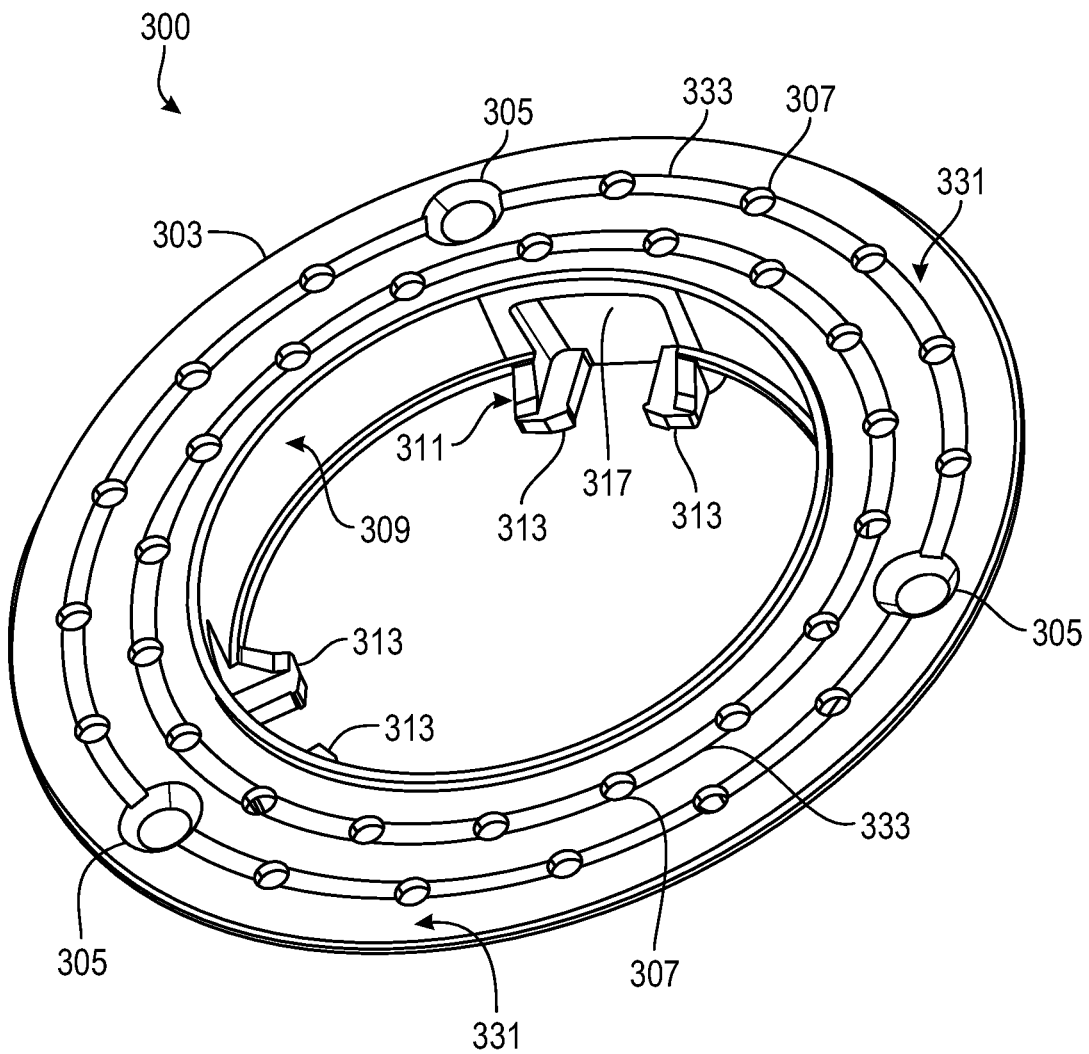
FIG. 3C shows a bottom perspective view of the spackle-frame that was first partially shown in FIG. 1A as part of the overall-assembly.

FIG. 3C shows a bottom perspective view of spackle-frame 300. FIG. 3C shows bottom 331 of spackle-frame 300. FIG. 3C shows that (larger) hole(s) 305 may have a counter sunk bevel to accommodate a screw head on bottom 331, such that the screw heads may be flush with bottom 331. FIG. 3C shows that bottom 331 may also comprise one or more channel(s) 333 cut into bottom 331. In some embodiments, channel(s) 333 may be configured to help bottom 331 retain applied mud (e.g., plaster, joint compound, spackle, and/or the like) once spackle-frame 300 may be attached to a given ceiling (via mechanical fastener(s) and hole(s) 305 and/or 307). In some embodiments, a given channel 333 may run at least substantially (mostly) in a 2D (two-dimensional) circular direction along (around) bottom 331. In some embodiments, two or more different channels 333 may be in concentric circle shapes with respect to each other around an interior of bottom 331. In some embodiments, hole(s) 305/307 may be positioned on disk 301 to bisect channel(s) 333 from bottom 331 towards atop of disk 301.

In some embodiments, spackle-frame 300/801 configured for removable attachment to a downlight 201/901. See FIG. 3A through FIG. 3C for spackle-frame 300; see FIG. 8A, FIG. 8B, FIG. 9A, and FIG. 9B for spackle-frame 801; see FIG. 2C for downlight 201; and see FIG. 9B for downlight 901. In some embodiments, spackle-frame 300/801 may be configured to be mounted to a flat planar surface, such as, but not limited to ceiling drywall/sheetrock or the like. In some embodiments, the flat planar surface may be at least a section of drywall, at least a section of sheetrock, and/or the like. In some embodiments, spackle-frame 300/801 may comprise a flat annular disk member 301 and at least two brackets 311. In some embodiments, the at least two brackets 311 may extend upwards from the flat annular disk member 301. In some embodiments, wherein each of the at least two brackets 311 may be configured to attach to one of at least two housings 500. See FIG. 5A to FIG. 5F for housing 500. In some embodiments, each of the at least two housings 500 may be configured to retain at least part of one clip 600 selected from at least two clips 600. See FIG. 6A to FIG. 6E for clip 600. In some embodiments, the at least two clips 600 may be configured to removably attach to the downlight 201/801.

In some embodiments, spackle-frame 300/801 may comprise a single largest hole in a center of the flat annular disk member 301. In some embodiments, the single largest hole (of spackle-frame 300/801) may be configured to permit passage of at least some portions of downlight 201/901. See e.g., FIG. 1C, FIG. 2B, FIG. 9A, and FIG. 9B.

In some embodiments, spackle-frame 300/801 may comprise at least one smaller hole 305/307 that is smaller than the single largest hole in the center of the flat annular disk member 301. In some embodiments, at least one smaller hole 305/307 is located in the flat annular disk member 301. See e.g., FIG. 3A. In some embodiments, the at least one smaller hole 305/307 may be configured to receive at least a portion of a mechanical-fastener for attaching spackle-frame 300/801 to the flat planar surface (e.g., sheetrock/drywall).

In some embodiments, bottom 331 of the flat annular disk member 301 may comprise at least one channel 333. See e.g., FIG. 3C. In some embodiments, at least one channel 333 may be configured to receive plaster for a purpose of attaching spackle-frame 300/801 to the flat planar surface (e.g., sheetrock/drywall) and/or for at least substantially (mostly) concealing the flat annular disk member 301 with respect to the flat planar surface, by use of the plaster.

In some embodiments, at least two brackets 311 may be disposed around the single largest hole in the center of the flat annular disk member 301. See e.g., FIG. 3A and FIG. 8B. In some embodiments, when the at least two brackets 311 are exactly two such brackets 311, these two brackets 311 are oppositely disposed from each other. See e.g., FIG. 8B. In some embodiments, when the at least two brackets 311 are three or more such brackets 311, these three or more such brackets 311 are equidistant from each other. See e.g., FIG. 3A. In some embodiments, each of the at least two brackets 311 may comprise a pair of spaced apart inward projecting prongs 313 that extend towards the center of the spackle-frame 300/801. See e.g., FIG. 3A and FIG. 8B.

Figure 4A:
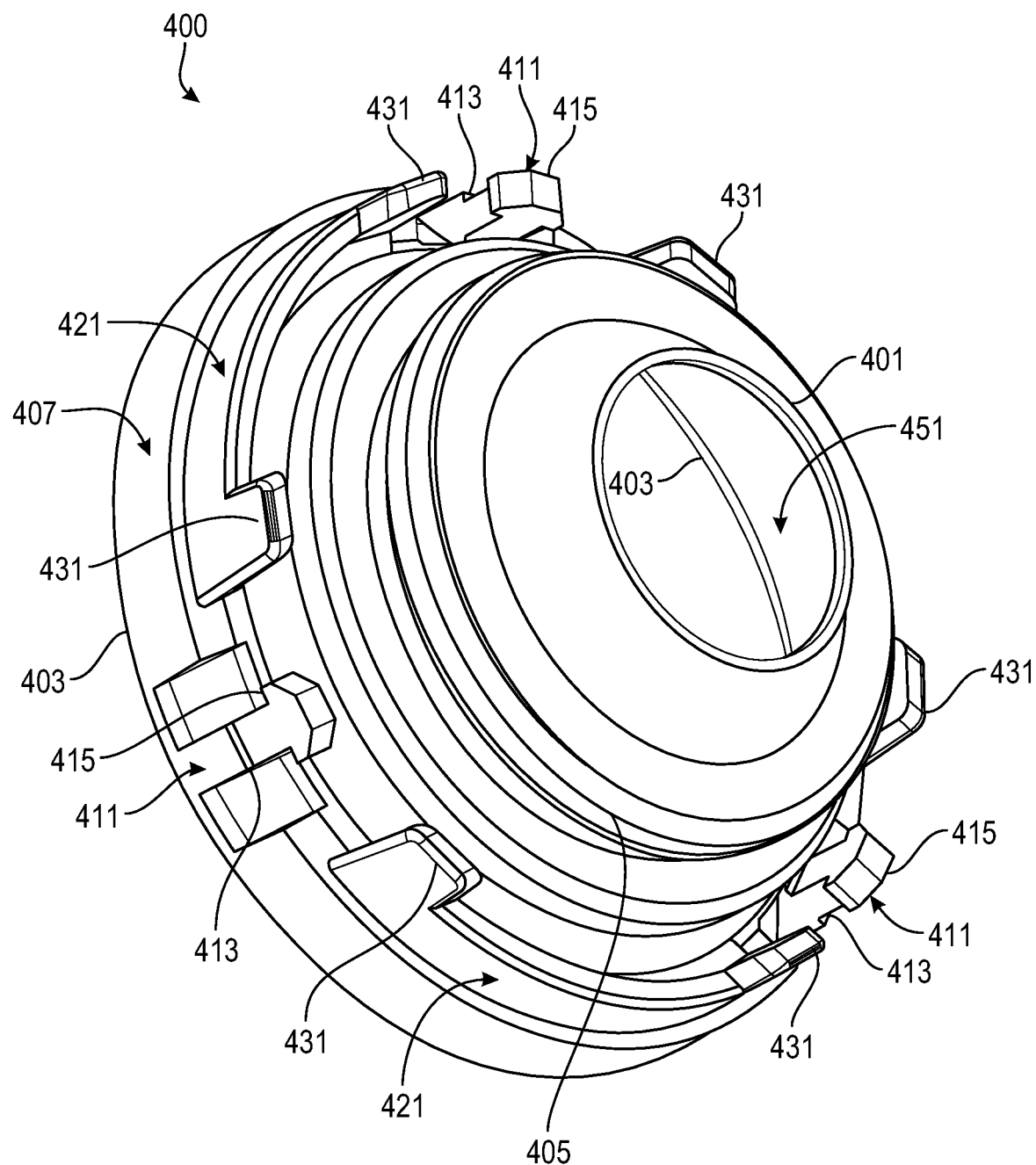
FIG. 4A shows a top perspective view of a trim (trim member) that was first partially shown in FIG. 1A as part of the overall-assembly and/or as part of the downlight (downlight-assembly).

FIG. 4A shows a top perspective view of trim 400. In some embodiments, trim 400 may be referred to as a trim member/component, because once overall-assembly 100 is installed in a given ceiling, the bottom facing surfaces (i.e., termed interior-of-conical-frustum 451 herein) of trim 400 may be largely visible to one standing beneath that overall-assembly 100. (Note, interior-of-conical-frustum 451 is visible in FIG. 4D and in FIG. 1D.) These bottom facing surfaces (e.g., interior-of-conical-frustum 451) of trim 400 that are largely visible when one is standing beneath overall-assembly 100 are in a conical frustum shape. Continuing discussing FIG. 4A, in some embodiments, the surfaces of trim 400 opposing interior-of-conical-frustum 451, i.e., the top facing surfaces of trim 400 are generally not visible when one is standing beneath overall-assembly 100. In some embodiments, these top facing surfaces of trim 400 may generally have a much more complicated geometry than the conical frustum geometry of interior-of-conical-frustum 451. For example, and without limiting the scope of the present invention, located closer to top 401 of trim 400 and further away from bottom 403 of trim 400 may be attachment-means 405 (of/with non-conical-frustum geometry); and below attachment-means 405 on trim 400 may be complicated geometry (of/with non-conical-frustum geometry) for removable engagement with clips 600 and with housings-for-clips 500. In some embodiments, top 401 may be a top/upper most portion/region of trim 400. In some embodiments, top 401 may have a top (circular) opening that is configured to receive emitted light from LED 221 and/or to receive reflected light from reflector 211. In some embodiments, bottom 403 may be a bottom/lower most portion/region of trim 400. In some embodiments, bottom 403 may have a bottom (circular) opening that is configured to receive emitted light from LED 221 that had first entered the top opening at top 401. In some embodiments, top 401 and bottom 403 may be disposed opposite from each other. In some embodiments, attachment-means 405 may not have a conical frustum shape. However, above attachment-means 405 up to up top 401, may have a conical frustum shape. In some embodiments, attachment-means 405 may be configured for (removable) attachment to complementary attachment-means 725 of heat sink 700. In some embodiments, attachment-means 405 may be threading. In some embodiments, attachment-means 405 may be outside (male) threading. In some embodiments, attachment-means 405 may be inside (female) threading.

Continuing discussing FIG. 4A, in some embodiments, at bottom 403 may be circular outer-edge 407 that runs continuously around an outside-diameter perimeter of trim 400 at/along bottom 403. In some embodiments, extending upwards from bottom 403 and from outer-edge 407 towards top 401 may be at least two (2) extensions/projections of material designated as anchors-for-clips 411. In some embodiments, these upward projecting anchors-for-clips 411 may have a general arrow shape, with an elongate-portion 413 that upwardly terminates into a head 415. In some embodiments, a given anchor-for-clip 411 may be configured to be removably retained within a given clip 600. In some embodiments, elongate-portion 413 may be an elongate portion of a given anchor-for-clip 411 that runs linearly straight upwards from outer-edge 407 to head 415. In some embodiments, head 415 may have a blunted (nonpointy) arrowhead shape. In some embodiments, head 415 may be wider than elongate-portion 413. In some embodiments, head 415 may be sized and/or shaped to be removably retained within a complementary geometry space of a given clip 600, via barb/catch 609 of clip 600 (see FIG. 6A for barb/catch 609 of clip 600). In some embodiments, quantities of bracketsfor-housings 311, anchors-for-clips 411, housings-for-clips 500, and clips 600 may be in a one-to-one correspondence with each other. In some embodiments, there may be minimum of two (2) of: brackets-for-housings 311, anchors-for-clips 411, housings-for-clips 500, and clips 600. In some embodiments, there may be two (2) or more of: brackets-for-housings 311, anchors-for-clips 411, housings-for-clips 500, and clips 600. In some embodiments, there may be three (3) of: brackets-for-housings 311, anchors-for-clips 411, housings-for-clips 500, and clips 600. In some embodiments, the quantity of anchors-for-clips 411 along/around outer-edge 407 may be equidistant from each other. In some embodiments, when there may be two (2) anchors-for-clips 411, these two (2) anchors-for-clips 411 may be oppositely disposed from each other along/around outer-edge 407 (see e.g., FIG. 8C). In some embodiments, when there may be three (3) anchors-for-clips 411, these three (3) anchors-for-clips 411 may be arranged in an equilateral triangle shape from each other along/around outer-edge 407 (see e.g., FIG. 4C). In some embodiments, a height that a given anchor-for-clip 411 may extend upward from outer-edge 407 may be fixed, finite, predetermined, and/or may not reach a height on trim 400 where a bottom of attachment-means 405 is located (see e.g., FIG. 4B). In some embodiments, the height that a given anchor-for-clip 411 may be less than half of an overall (total) height of trim 400 (see e.g., FIG. 4B).

Continuing discussing FIG. 4A, in some embodiments, extending upwards from outer-edge 407, not at where anchors-for-clips 411 are located, may be regions/portions of upwards extending raised (curved) sidewall 421. In some embodiments, raised sidewall 421 may be curved, with a radius of curvature that is concentric with the radius of curvature of outer-edge 407 (see e.g., FIG. 4C). In some embodiments, raised sidewalls 421 may be interrupted by anchors-for-clips 411. In some embodiments, raised sidewall 421 may run continuously around trim 400, just inside of outer-edge 407, except where anchors-for-clips 411 are located (see e.g., FIG. 4C). In some embodiments, there may be a total of three (3) raised sidewalls 421, with each raised sidewall 421 being separated from the others by anchors-for-clips 411 (see e.g., FIG. 4C). In some embodiments, a height of raised sidewall 421 may extend upward from outer-edge 407 may be fixed, finite, predetermined, and/or may not reach a heigh on trim 400 where a bottom of attachment-means 405 is located (see e.g., FIG. 4B). In some embodiments, the height of raised sidewall 421 may be below the height of anchors-for-clips 411 (see e.g., FIG. 4B).

Continuing discussing FIG. 4A, in some embodiments, extending upwards from opposite ends of a given raised sidewall 421 are raised-protrusions 431. Thus, each raised-sidewall 421 may have two (2) oppositely disposed raised-protrusions 431 (see e.g., FIG. 4C). In some embodiments, a height of raised-protrusion 431 may extend upward from a top of raised sidewall 421 may be fixed, finite, predetermined, and/or may not reach a heigh on trim 400 where a bottom of attachment-means 405 is located (see e.g., FIG.

4B). In some embodiments, the height of raised-protrusion 431 may be above the height of anchors-for-clips 411 (see e.g., FIG. 4B).

Continuing discussing FIG. 4A, in some embodiments, between two (2) adjacent raised-protrusions 431 of two (2) different raised sidewalls 421 may be a gap 441. In some embodiments, gap 441 may be fixed, non-variable, finite, and/or predetermined. In some embodiments, gap 441 may be sized and/or shaped to (removably) fit within gap 441 a given pair of prongs 313 of a given bracket-for-housing 311. In some embodiments, gap 441 may be sized and/or shaped to (removably) fit within gap 441 a given pair of prongs 313 of a given bracket-for-housing 311; and within that pair of prongs 313 may be one (1) housing-for-clip 500. In some embodiments, gap 441 may be sized and/or shaped to (removably) fit within gap 441 a given housing-for-clip 500 and a given pair of prongs 313 of a given bracket-for-housing 311.

Figure 4B:
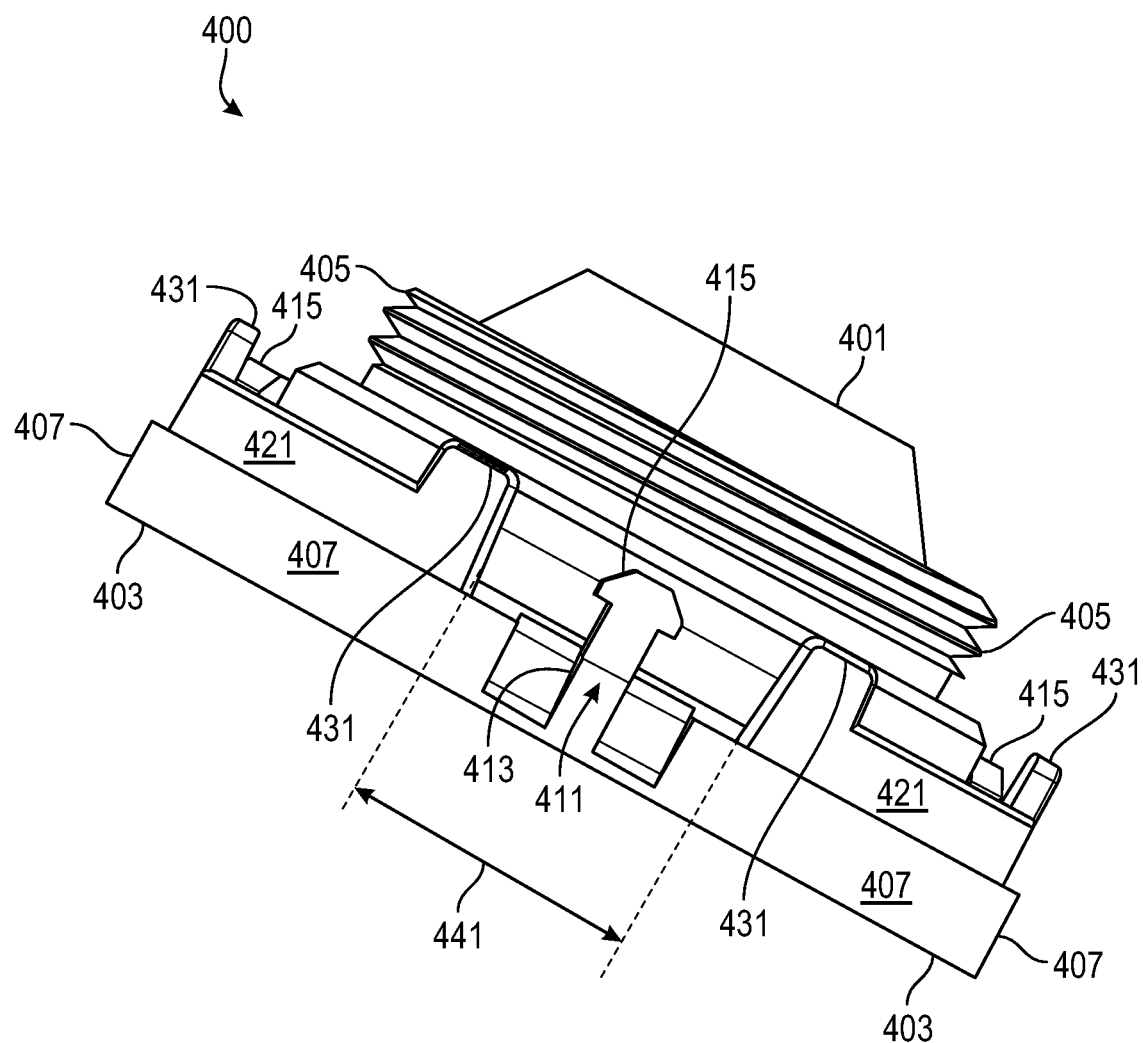
FIG. 4B shows a side view of the trim (trim member) that was first partially shown in FIG. 1A as part of the overall-assembly and/or as part of the downlight (downlight-assembly).

FIG. 4B shows a side view of trim 400. FIG. 4B shows that to both/either sides of anchor-for-clip 411, elongate-portion 413, and/or head 415 is devoid of material, i.e., is of some void space. Void space exists around the tops and sides of anchor-for-clip 411, elongate-portion 413, and/or head 415. In some embodiments, at least some of this void space may be for (removably) fitting of a given clip 600 and/or a given housing-for-clip 500 therein.

FIG. 4B also shows various geometry height relationships as noted above for trim 400 in the FIG. 4A discussion. Continuing discussing FIG. 4B, in some embodiments, the height that a given anchor-for-clip 411 may extend upward from outer-edge 407 may be fixed, finite, predetermined, and/or may not reach the height on trim 400 where the bottom of attachment-means 405 is located. In some embodiments, the height that a given anchor-for-clip 411 may be less than half of the overall (total) height of trim 400. In some embodiments, the height of raised sidewall 421 may extend upward from outer-edge 407 may be fixed, finite, predetermined, and/or may not reach the height on trim 400 where the bottom of attachment-means 405 is located. In some embodiments, the height of raised sidewall 421 may be below the height of anchors-for-clips 411. In some embodiments, the height of raised-protrusion 431 may extend upward from the top of raised sidewall 421 may be fixed, finite, predetermined, and/or may not reach the heigh on trim 400 where the bottom of attachment-means 405 is located. In some embodiments, the height of raised-protrusion 431 may be above the height of anchors-for-clips 411. See e.g., FIG. 4B.

Figure 4C:
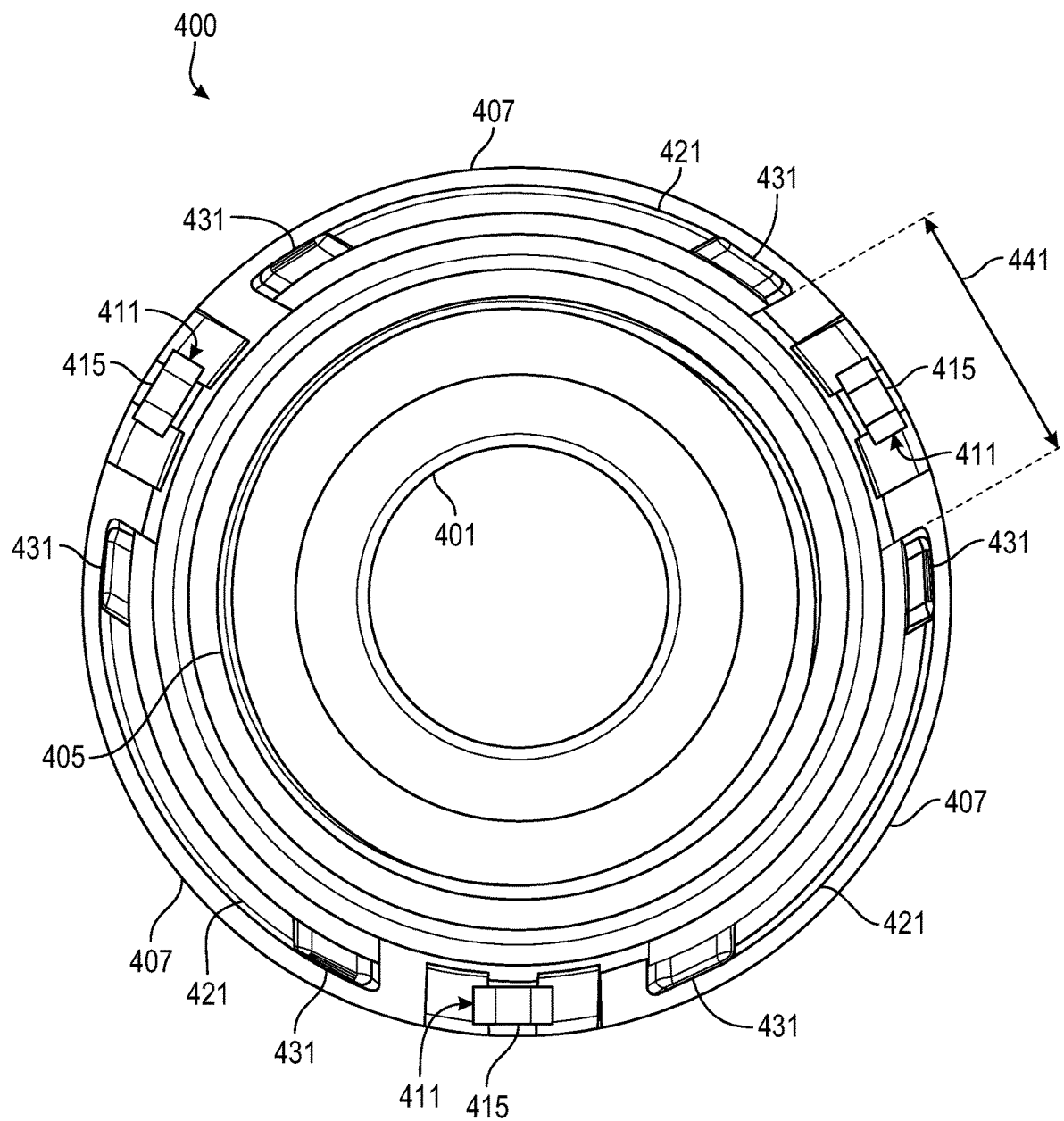
FIG. 4C shows a top view of the trim (trim member) that was first partially shown in FIG. 1A as part of the overall-assembly and/or as part of the downlight (downlight-assembly).

FIG. 4C shows a top view of trim 400. In some embodiments, when there may be three (3) anchors-for-clips 411, these three (3) anchors-for-clips 411 may be arranged in an equilateral triangle shape from each other along/around outer-edge 407. In some embodiments, raised sidewall 421 may be curved, with a radius of curvature that is concentric with the radius of curvature of outer-edge 407. In some embodiments, raised sidewalls 421 may be interrupted by anchors-for-clips 411. In some embodiments, raised sidewall 421 may run continuously around trim 400, just inside of outer-edge 407, except where anchors-for-clips 411 are located. In some embodiments, there may be a total of three (3) separate raised sidewalls 421, with each raised sidewall 421 being separated from the others by anchors-for-clips 411. In some embodiments, each raised-sidewall 421 may have two (2) oppositely disposed raised-protrusions 431.

Figure 4D:
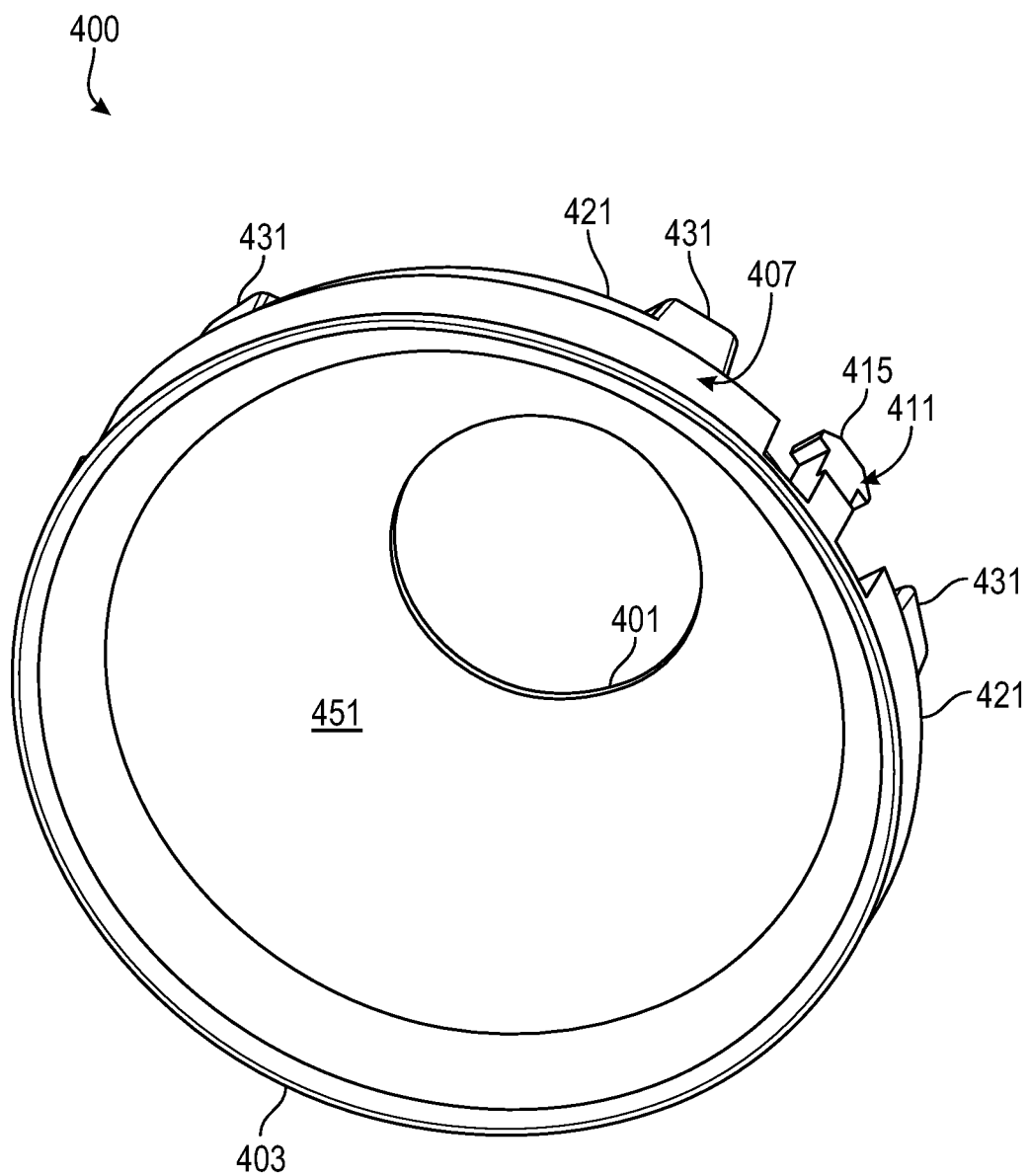
FIG. 4D shows a bottom perspective view of the trim (trim member) that was first partially shown in FIG. 1A as part of the overall-assembly and/or as part of the downlight (downlight-assembly).

FIG. 4D shows a bottom perspective view of trim 400. FIG. 4D shows interior-ofconical-frustum 451 of trim 400. In some embodiments, interior-of-conical-frustum 451 may be smooth and/or at least partially optically reflective. FIG. 4D shows the larger bottom (circular) opening at bottom 403 and the smaller top (circular) opening at top 401. In some embodiments, at least some light emitted by LED 221 may enter top 401 at the top opening and then pass out of the bottom opening at bottom 403.

In some embodiments, trim member 400/803 may be configured for use in a downlight 201/901. See FIG. 4A to FIG. 4D for trim member 400; see FIG. 8C for trim member 803; see FIG. 2C for downlight 201; and see FIG. 9B for downlight 901. In some embodiments, trim member 400/803 may comprise an interior surface with a conical frustum shape 451 that is configured to permit passage of light. In some embodiments, trim member 400/803 may further comprise at least two upward extending members 411 that extend upwards away from a circular base 407 of trim member 400/803. In some embodiments, each of the at least two upward extending members 411 is configured to be removably retained within clip 600. In some embodiments, clip 600 may be retained within spackle-frame 300/801 (e.g., via use of housings 500 and brackets 311). In some embodiments, spackle-frame 300/801 may be configured for attachment to a flat planar surface (such as, but not limited to, drywall, sheetrock, and/or the like).

In some embodiments, trim member 400/803 may be flangeless such that trim member 400/803 does not have an external flange running around an exterior of the circular base 407 of trim member 400/803. See e.g., FIG. 4A to FIG. 4D.

In some embodiments, each of the at least two upward extending members 411 may comprise an elongate-portion 413 and head 415. In some embodiments, elongate-portion 413 may extend out from the circular base 407. In some embodiments, head 415 may extend from where the elongate-portion 413 ends. In some embodiments, head 415 is a terminal end portion of the upward extending member 411. In some embodiments, head 415 is wider than elongate-portion 413. In some embodiments, each of the at least two upward extending members 411 has a blunted arrow shape. See e.g., FIG. 4A and FIG. 4B. In some embodiments, this geometry, shape, and/or size of upward extending member 411 may be configured to be removably captured within clip 600.

In some embodiments, trim member trim member 400/803 may be devoid of material around sides and tops of the at least two upward extending members 411. See e.g., FIG. 4A to FIG. 4C. In some embodiments, these void regions around the sides and the tops of the at least two upward extending members 411 may contribute to upward extending member 411 being removably captured within clip 600.

In some embodiments, when the at least two upward extending members 411 are exactly two such upward extending members 411, these two upward extending members 411 are oppositely disposed from each other. See e.g., FIG. 8C. In some embodiments, when the at least two upward extending members 411 are three or more such upward extending members 411, these three or more such upward extending members 411 are equidistant from each other. See e.g., FIG. 4A.

Figure 5A:
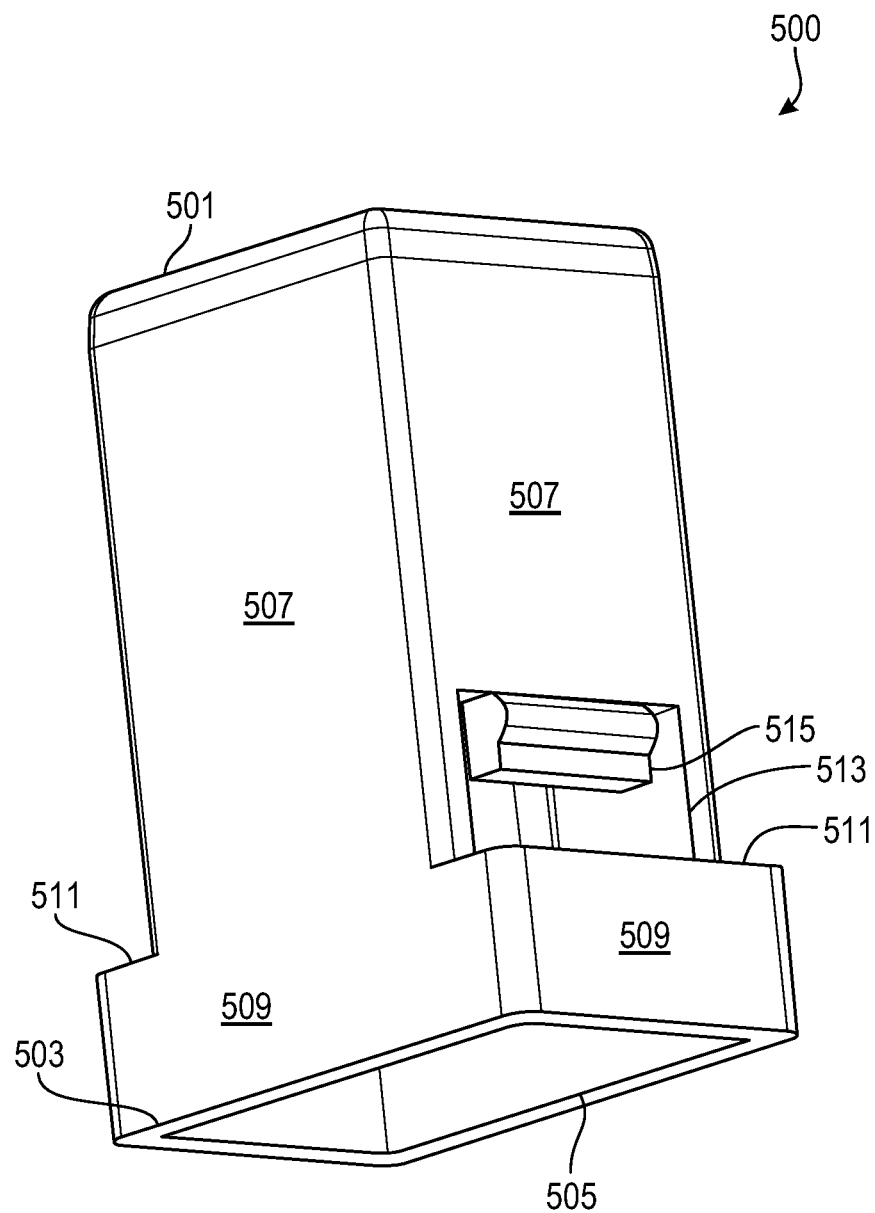
FIG. 5A shows a bottom perspective view of a housing-for-clip (housing) that was first partially shown in FIG. 1A as part of the overall-assembly.
Figure 5B:
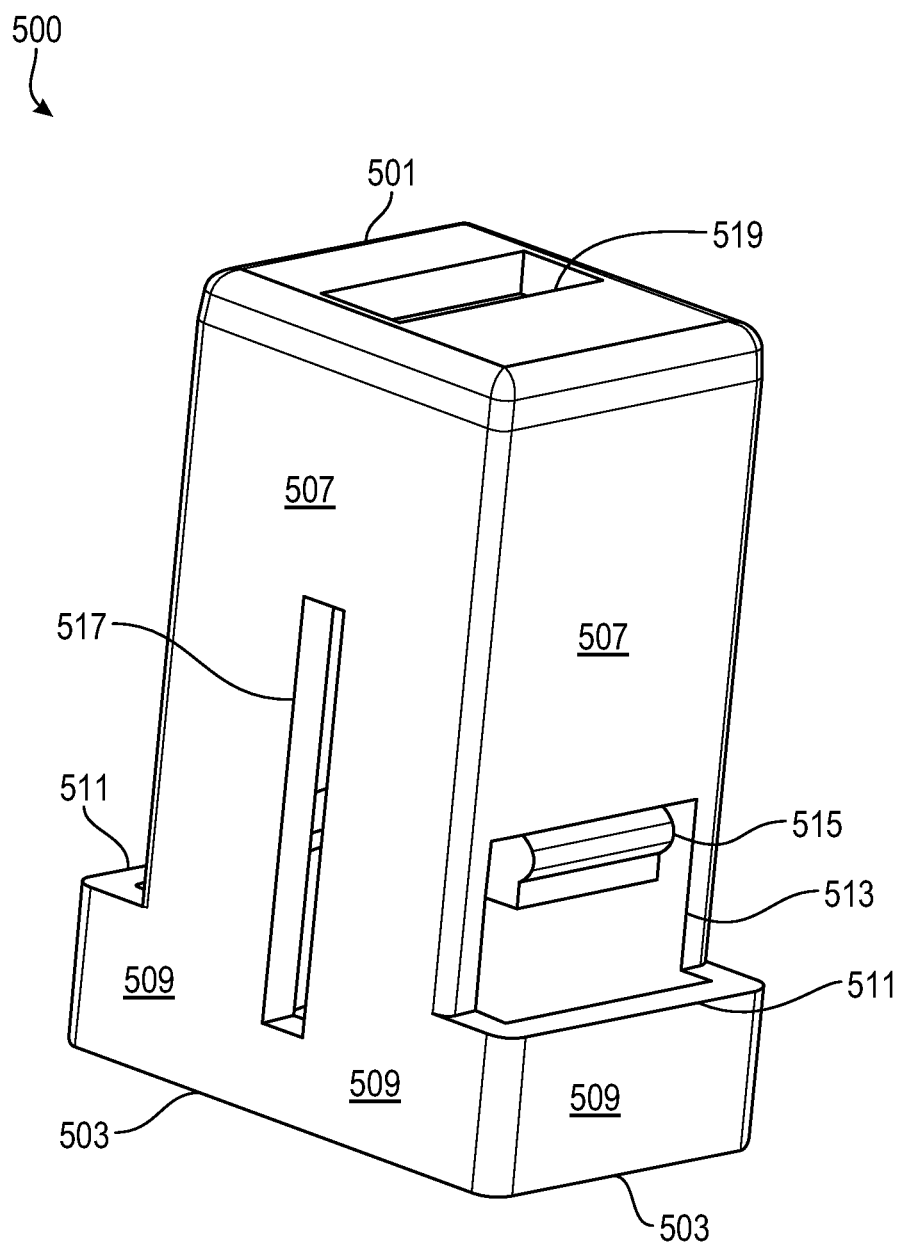
FIG. 5B shows a top perspective view of the housing-for-clip (housing) that was first partially shown in FIG. 1A as part of the overall-assembly.
Figure 5C:
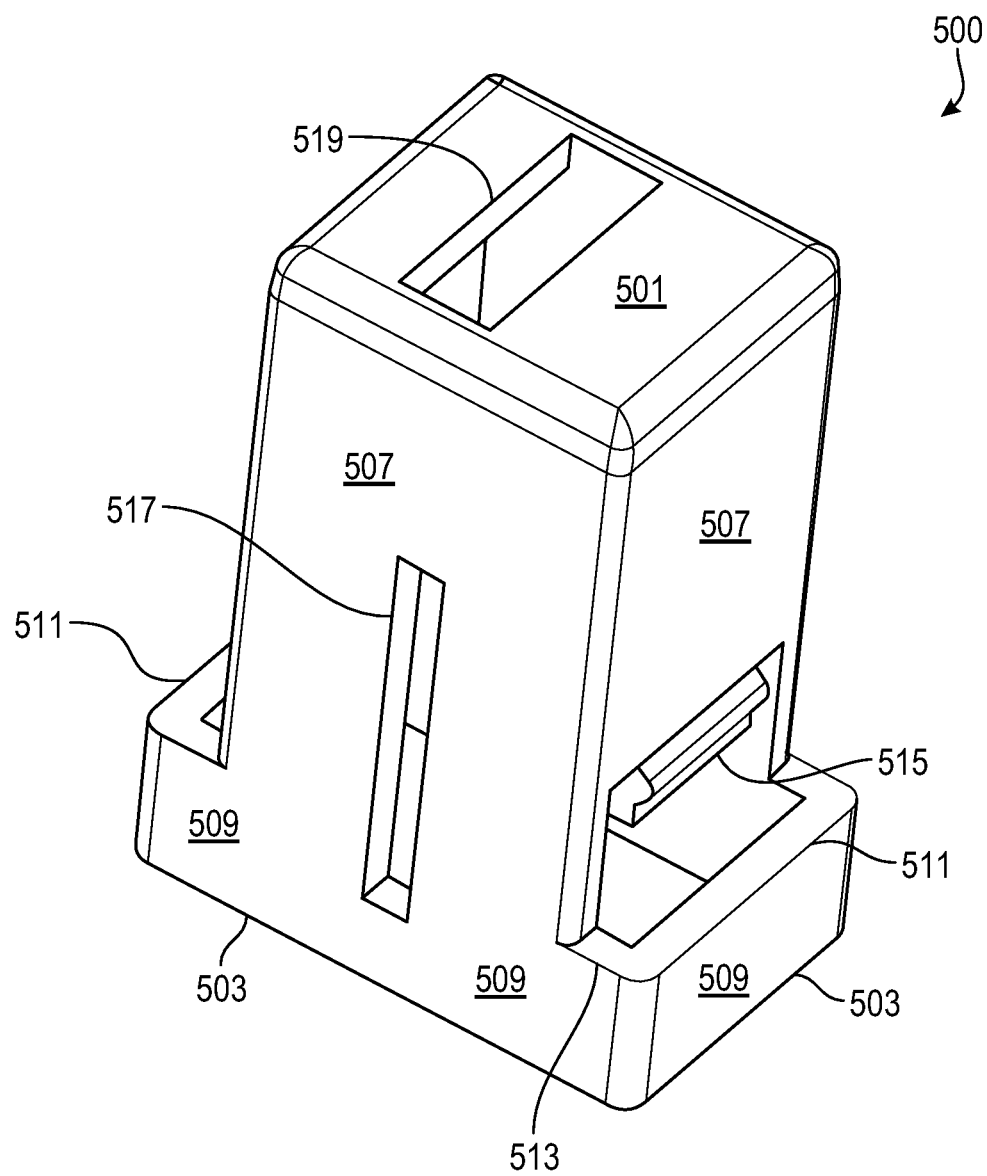
FIG. 5C show another/different top perspective view of the housing-for-clip (housing) that was first partially shown in FIG. 1A as part of the overall-assembly.
Figure 5D:
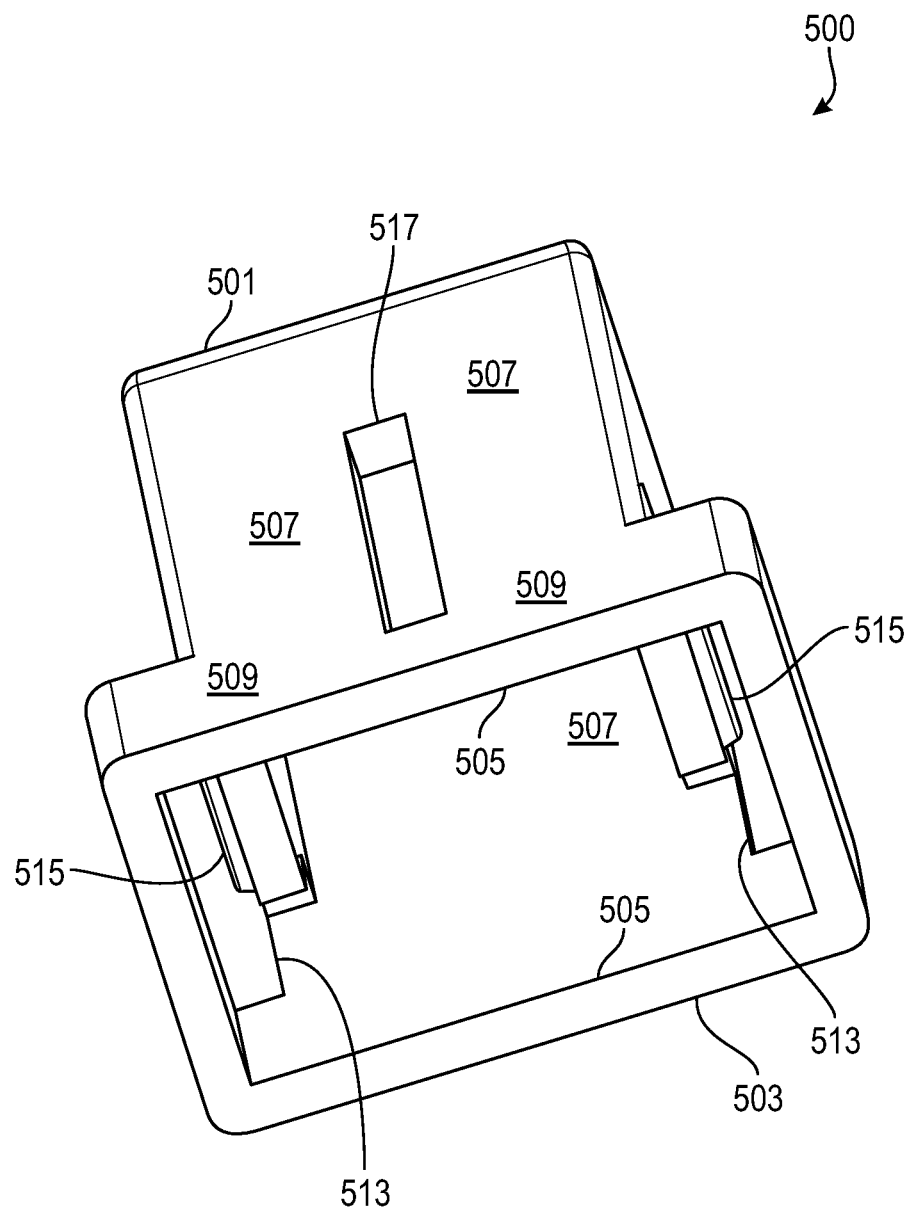
FIG. 5D shows another/different bottom perspective view of the housing-for-clip (housing) that was first partially shown in FIG. 1A as part of the overall-assembly.
Figure 5E:
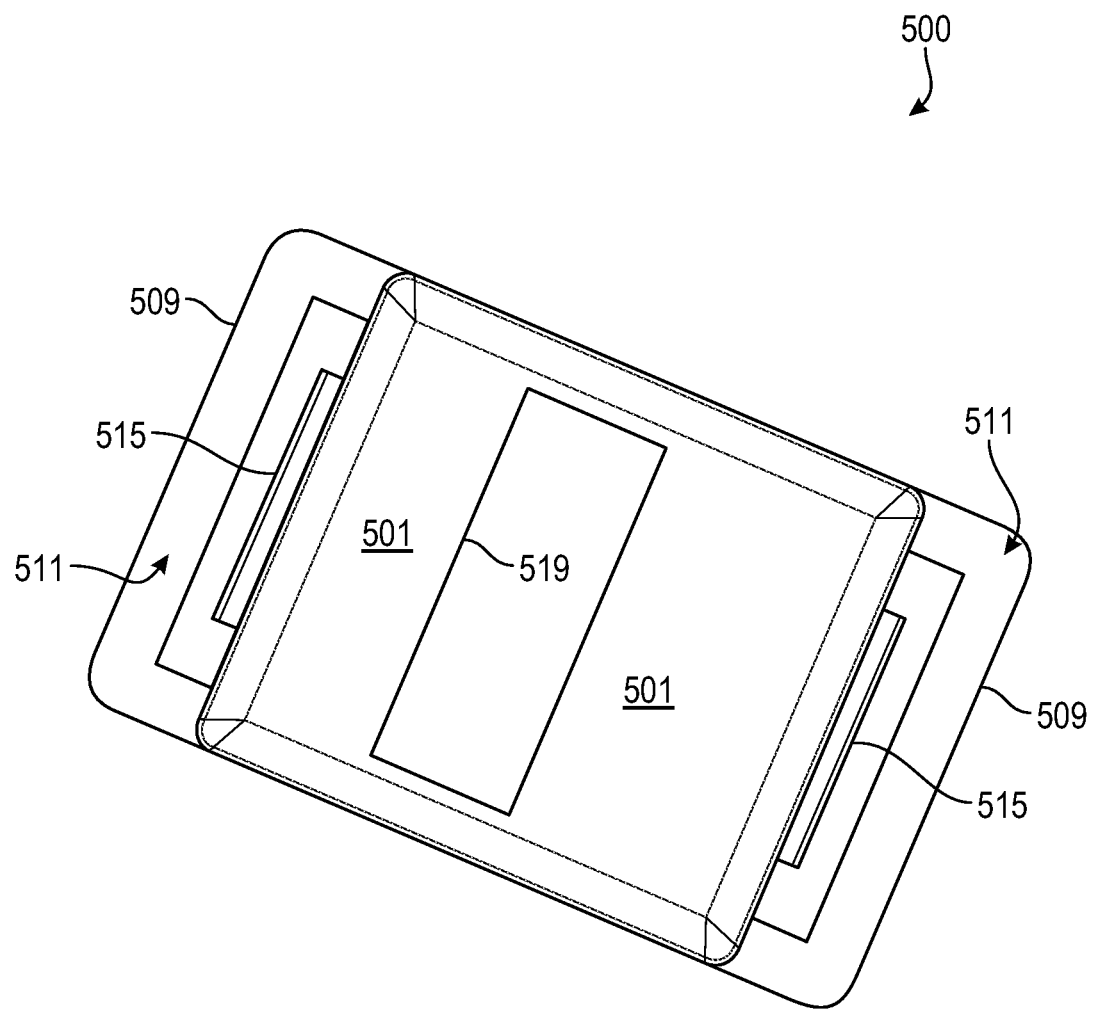
FIG. 5E shows a top view of the housing-for-clip (housing) that was first partially shown in FIG. 1A as part of the overall-assembly.
Figure 5F:
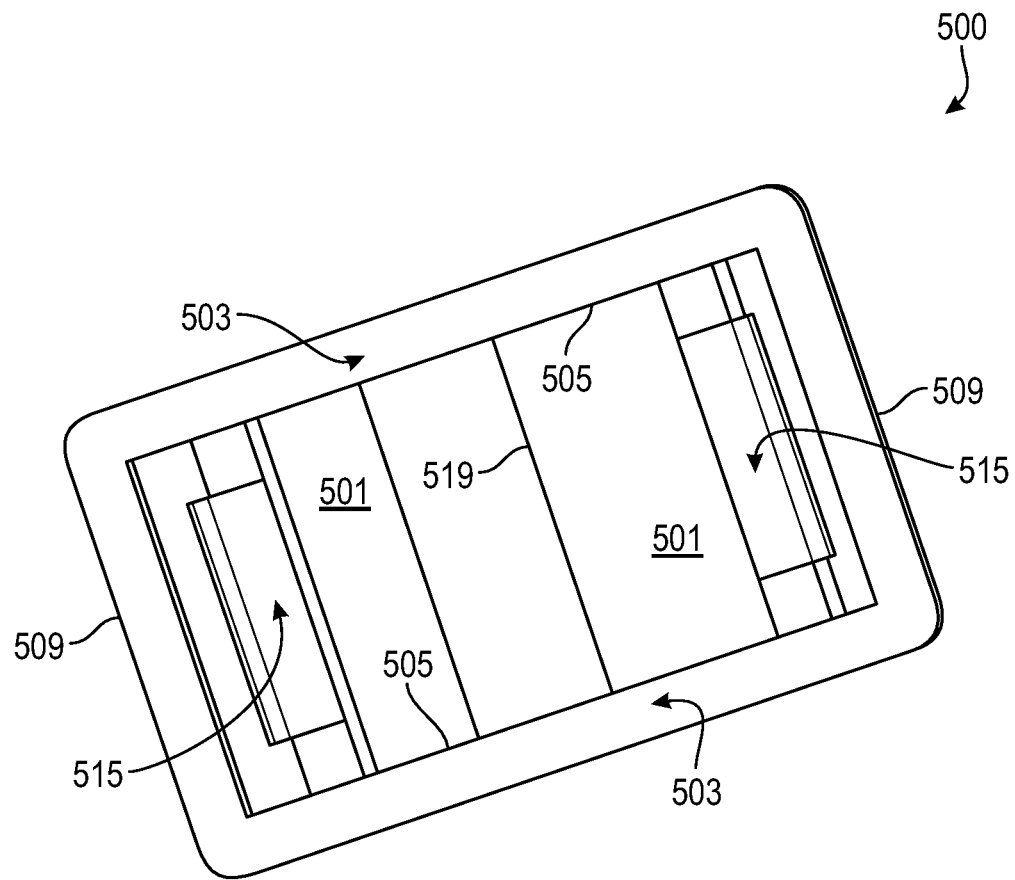
FIG. 5F shows a bottom view of the housing-for-clip (housing) that was first partially shown in FIG. 1A as part of the overall-assembly.

FIG. 5A and FIG. 5D show two different bottom perspective views of a given housing-for-clip 500. FIG. 5B and FIG. 5C show two different top perspective views of the given housing-for-clip 500. FIG. 5E shows a top view of housing-for-clip 500. FIG. 5F shows a bottom view of housing-for-clip 500. In some embodiments, a given housing-for-clip 500 may be configured to an exterior size and shape to be (removably) retained within a pair of adjacent prongs 313 of a given bracket-for-housing 311; while also have an interior size and shape to (removably) retain a given clip 600 (wherein that given clip 600 may removably clip onto a given anchor-for-clip 411/head 415). In some embodiments, a given housing-for-clip 500 may externally resemble an upside-down block letter capital letter "T." In some embodiments, a given housing-for-clip 500 may be considered a separate component of spackle-frame 300, since the prongs 313 of each bracket-for-housing 311 (of the spackle-frame 300) may each (removably) retain one housing-for-clip 500. And/or, in some embodiments, a given housingfor-clip 500 may be considered a separate component of overall-assembly 100. In some embodiments, a given housing-for-clip 500 may be substantially (mostly) hollow inside (e.g., to accommodate one clip 600 and one anchor-for-clip 411/head 415). In some embodiments, a given housing-for-clip 500 may comprise a top 501 and a bottom 503. In some embodiments, top 501 and bottom 503 may be oppositely disposed from each other. In some embodiments, top 501 may be a top of housing-for-clip 500. In some embodiments, bottom 503 may be a bottom of housing-for-clip 500. In some embodiments, bottom 503 may have an associated bottom-opening 505. In some embodiments, bottom-opening 505 may be an opening at bottom 503 of housing-for-clip 500. In some embodiments, bottom-opening 505 may be the largest opening of housing-for-clip 500. In some embodiments, bottom-opening 505 may provide access to the interior of housing-for-clip 500 for one clip 600 and one anchor-for-clip 411/head 415. In some embodiments, the inside sidewalls of wider-side-wall 509 at bottom-opening 505 may force/squeeze prongs 605 of a given clip 600 towards anchor-for-clip 411. See e.g., FIG. 10A. In some embodiments, disposed between top 501 and bottom 503 may be various sidewalls, denoted herein as narrower-side-wall 507 and wider-side-wall 509. Going back to the upside-down block letter capital letter "T" analogy, narrower-side-wall 507 may correspond to the vertical stem portion of such an upside-down block letter capital letter "T" and wider-side-wall 509 may correspond to the horizontal bar/arm portion of such an upside-down block letter capital letter "T." In some embodiments, narrower-side-wall 507 may be sidewall portions of housing-for-clip 500 located between top 501 and ledges 511. In some embodiments, wider-side-wall 509 may be sidewall portions of housing-for-clip 500 located from bottom 503 up to ledges 511. In some embodiments, narrower-side-wall 507 may transition into wider-side-wall 509 seamlessly, such that narrower-side-wall 507 and wider-side-wall 509 are of a single article of manufacture. In some embodiments, narrower-side-wall 507 may touch/extend from top 501; however, narrower-side-wall 507 may not touch nor extend from bottom 503. In some embodiments, wider-side-wall 509 may touch/extend from bottom 503; however, wider-side-wall 509 may not touch nor extend from top 501. In some embodiments, bottom-opening 505 may lead immediately into an inside of wider-side-wall 509. In some embodiments, narrower-side-wall 507 may be located on top of wider-side-wall 509. In some embodiments, narrower-side-wall 507 may be longer/taller than wider-side-wall 509. In some embodiments, wider-side-wall 509 may be shorter than the height of narrower-side-wall 507. In some embodiments, wider-side-wall 509 may be wider than narrower-side-wall 507. In some embodiments, located on top of opposite and outer sides of wider-side-wall 509 may be two oppositely disposed ledges 511. In some embodiments, extending out beyond a width of narrower-side-wall 507, at the top of wider-side-wall 509, may be two oppositely disposed ledges 511. In some embodiments, on top of each ledge 511 may a side-opening 513. In some embodiments, each side-opening 513 may lead directly into the hollow interior space of narrower-side-wall 507. Thus, for a given housing-for-clip 500, there may be two oppositely disposed side-openings 513. In some embodiments, these two oppositely disposed side-openings 513 may be configured to removably receive the widest portion of a single/give clip 600 (i.e., the widest portion of prongs 605 of a given clip 600). That is, in some embodiments, the widest portion of a given clip 600 (the widest portion of prongs 605 of a given clip 600) may (removably) extend into these two oppositely disposed side-openings 513. (See e.g., FIG. 6D and/or FIG. 6F for the widest portion of prongs 605 of a given clip 600.) In some embodiments, at the top of each of these side-openings 513 may be one tab 515. In some embodiments, tabs 515 of a given housing 500 may be spaced apart to facilitate (removable) attachment between that given housing 500 and a given bracket-for-housing 311 of spackle-frame 300/801. In some embodiments, tabs 515 of a given housing 500 may be spaced apart to minimize and/or prevent that given housing 500 from being disengaged/removed from a given bracket-for-housing 311 of spackle-frame 300/801.

FIG. 5B, FIG. 5C, and FIG. 5D show that a given housing-for-clip 500, vertically along at least one of sidewalls may comprise at least one side-slot 517. In some embodiments, side-slot 517 may be a vertical slot opening in at least one sidewall of housing-for-clip 500, extending into both the narrower-side-wall 507 and into the wider-side-wall 509. In some embodiments, side-slot 517 may be located on a sidewall of housing-for-clip 500 that does not have the two oppositely disposed side-openings 513. In some embodiments, side-slot 517 may be located on a sidewall of housing-for-clip 500 that does not have the two oppositely disposed tabs 515.

FIG. 5B, FIG. 5C, FIG. 5E, and FIG. 5F show that a given housing-for-clip 500, at its top 501 may comprise at least one top-slot 519. In some embodiments, top-slot 519 may be slot opening in top 501 of the given housing-for-clip 500.

Figure 6A:
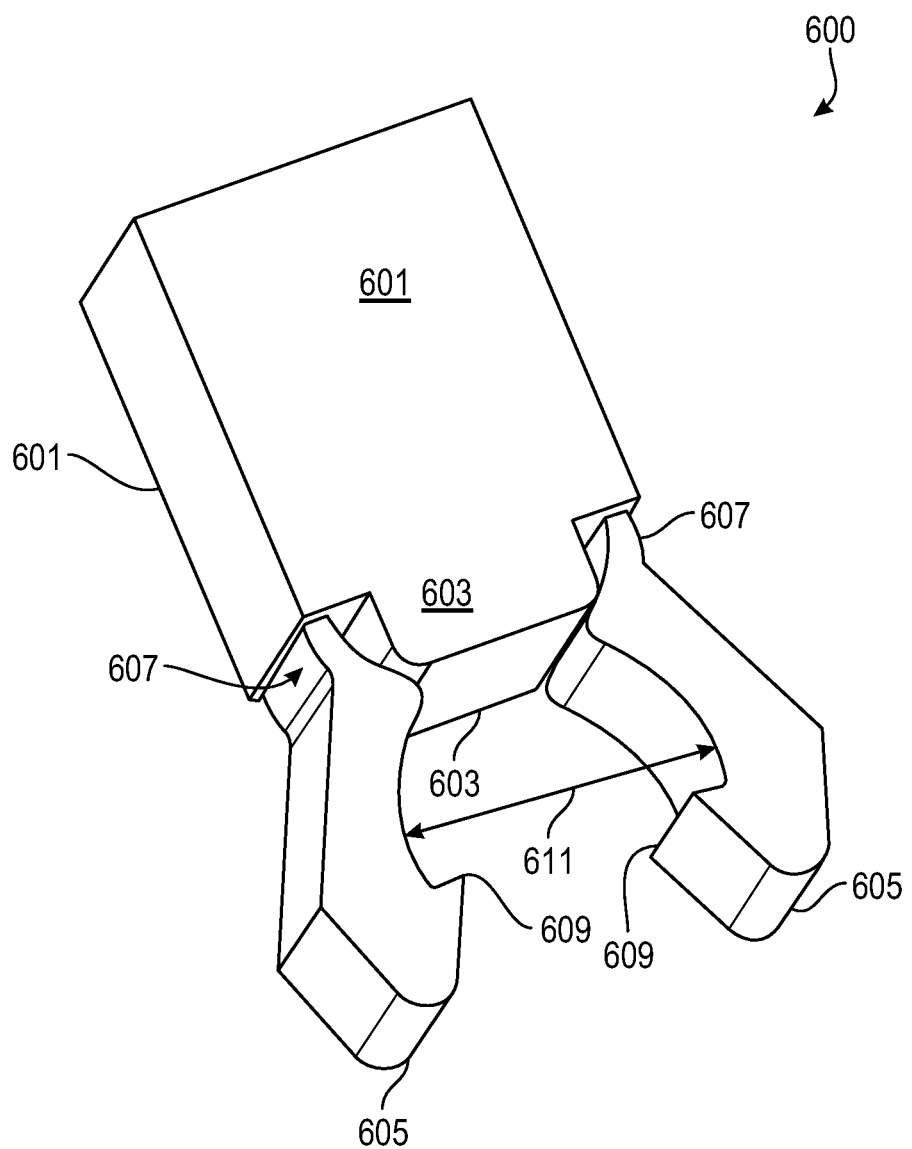
FIG. 6A shows a bottom perspective view of a clip, wherein the clip is part of the overall-assembly of FIG. 1A but is not readily visible in FIG. 1A because a housing covers over at least mot of the given clip.
Figure 6B:
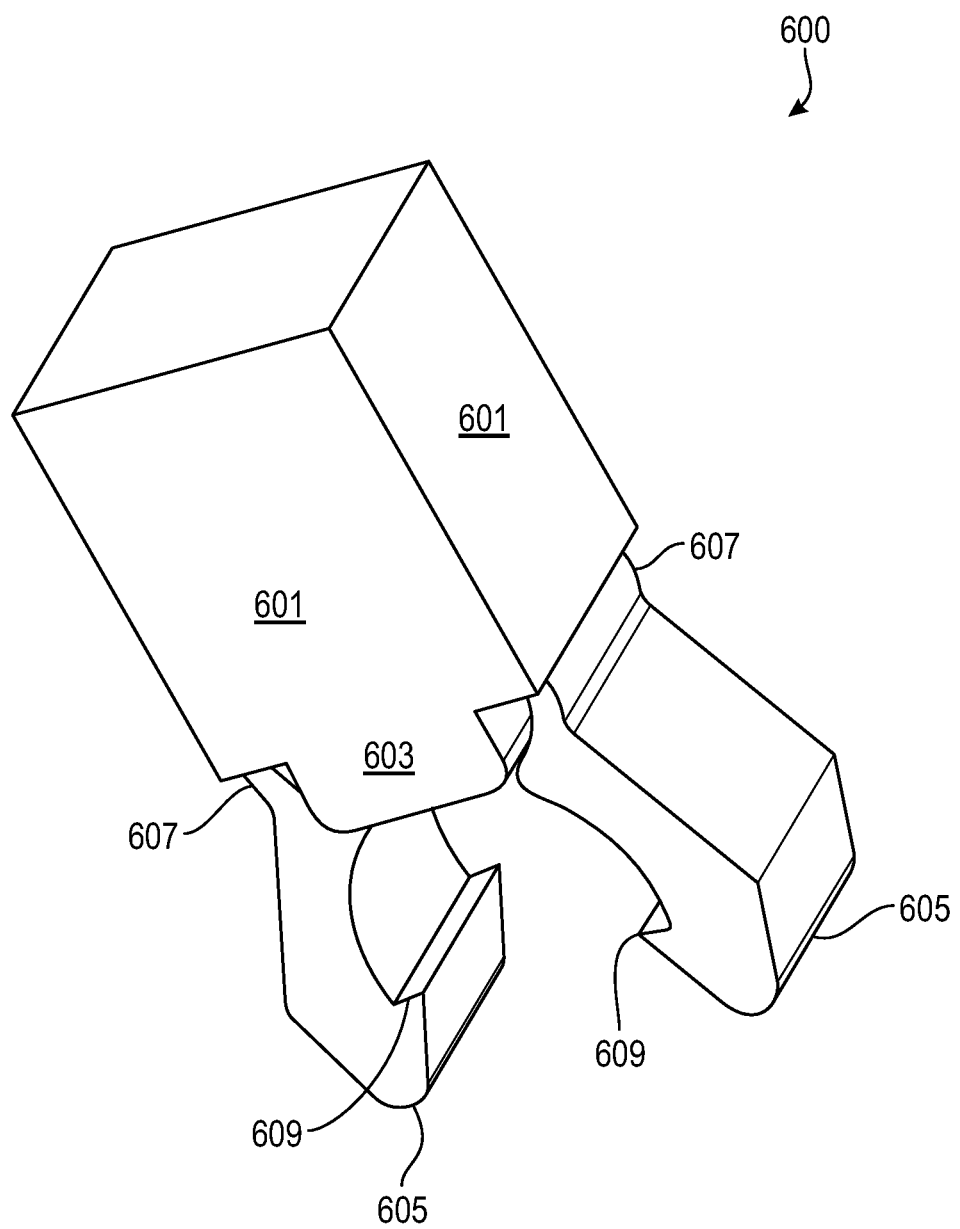
FIG. 6B shows a top perspective view of the clip of FIG. 6A.
Figure 6C:
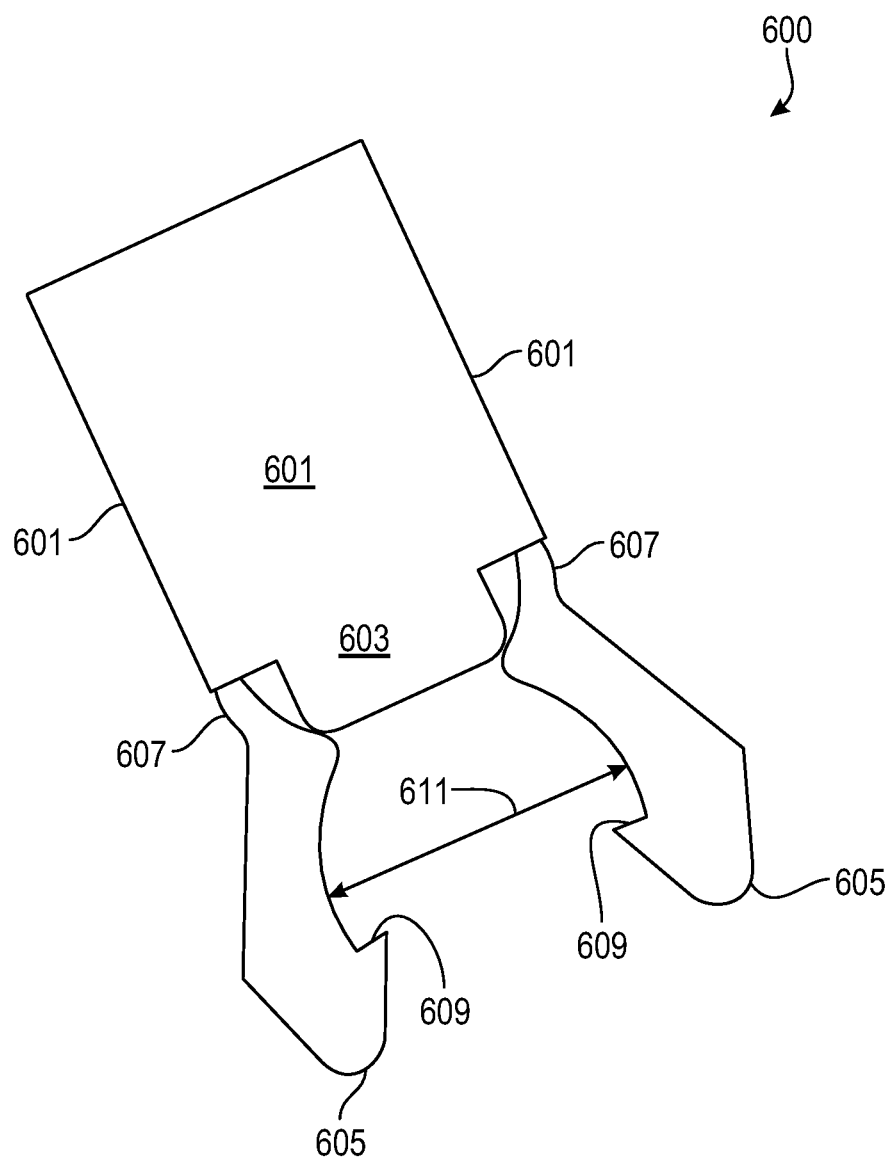
FIG. 6C shows a side view of the clip of FIG. 6A.
Figure 6D:
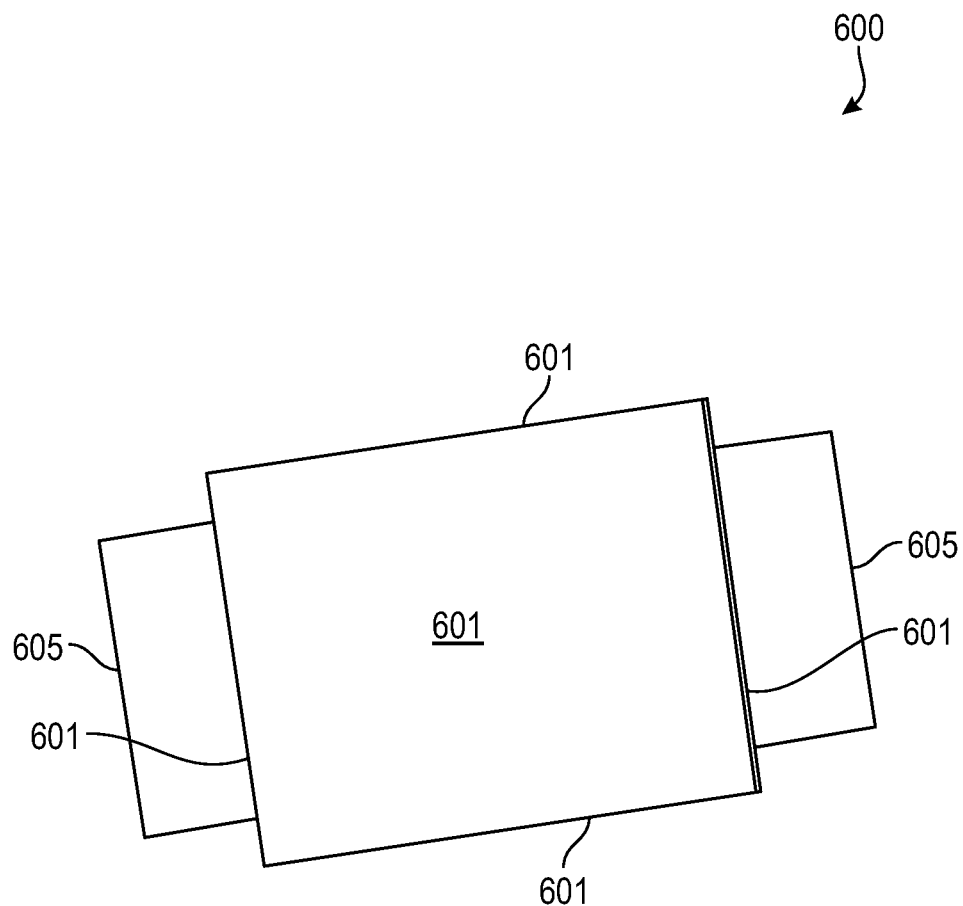
FIG. 6D shows a top view of the clip of FIG. 6A.
Figure 6E:
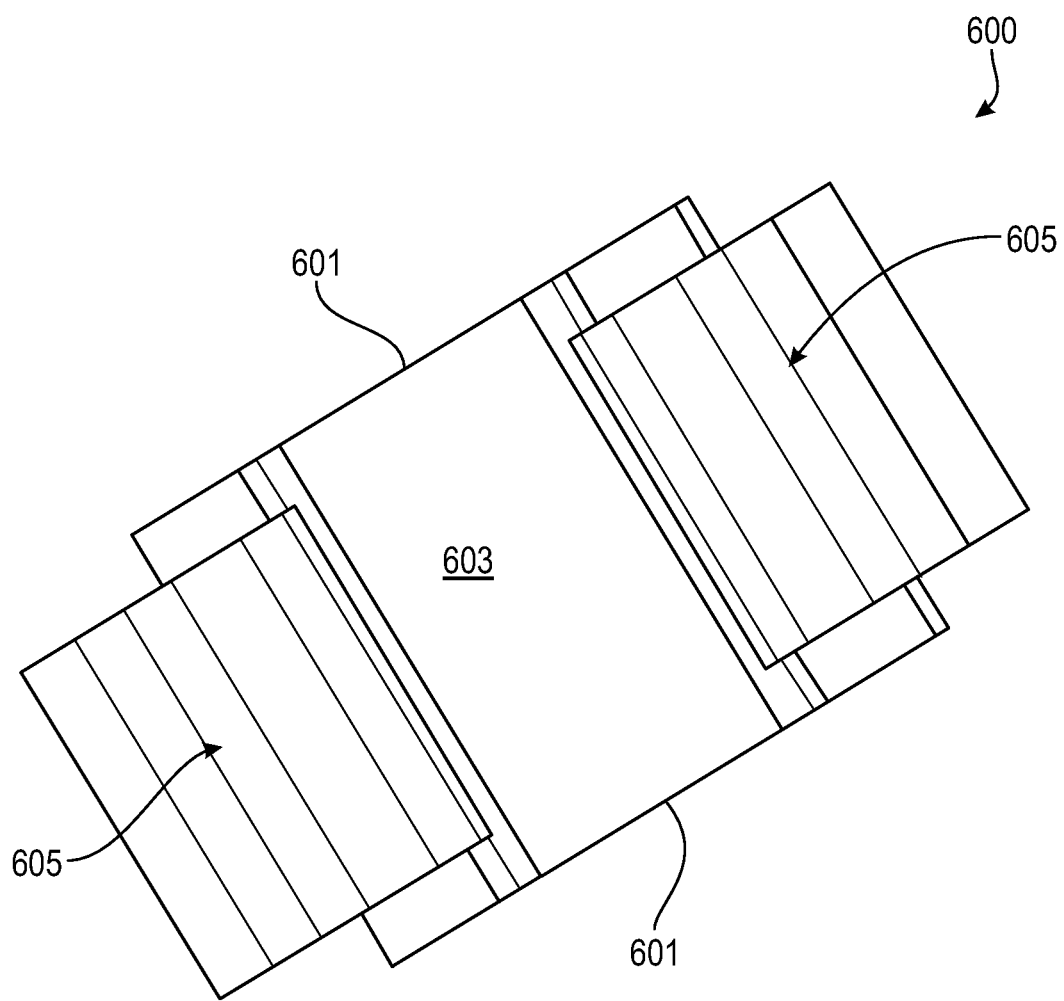
FIG. 6E shows a bottom view of the clip of FIG. 6A.

FIG. 6A shows a bottom perspective view of a given clip 600. FIG. 6B shows a top perspective view of clip 600. FIG. 6C shows a side view of clip 600. FIG. 6D shows a top view of clip 600. FIG. 6E shows a bottom view of clip 600. In some embodiments, a given clip 600 may be configured to be (removably) retained at least mostly (substantially) within a given housing-for-clip 500 and to removably attach onto a given anchor-for-clip 411 of trim 400. So, spackle-frame 300 has the pair of adjacent prongs 313 of a given bracket-for-housing 311, wherein these pair of adjacent prongs 313 may be configured to (removably) attach to a given housing-for-clip 500; wherein that given housing-for-clip 500 may (removably) house a given clip 600; and that clip 600 may removably attach/detach to a given anchor-for-clip 411 of trim 400. In this way, trim 400 of downlight-assembly 201, may removably attach/detach from spackle-frame 300. Housings-for-clips 500, clips 600, and spackle-frame 300 may function together as one single subassembly, that trim 400 (and its downlight-assembly 201) may removably attach/detach to and may do so without any external tools, such as, but not limited to screwdrivers. In some embodiments, a given clip 600 may comprise a blocky/rectangular prism like base 601. In some embodiments, base 601 may be a block, blocky portion, and/or rectangular prism portion of a given clip 600. In some embodiments, extending from a bottom of base 601 may be two adjacent, but spaced apart, prong 605 extensions. In some embodiments, disposed between these two adjacent and spaced part prongs 605 at the bottom of base 601 may be a support 603/push-surface 603. In some embodiments, push-surface 603 may be configured to be physically pushed against by a top (surface) of head 415 to arrive at mountedclick-in-configuration 1000/900 (see e.g., FIG. 10A and FIG. 9A); or to arrive at prongdisengagement-configuration 1050 (see e.g., FIG. 10B). In some embodiments, support 603 may be configured to support flexing/movement of prongs 605, during click-in and click-out mechanics of overall-assembly 100 (i.e., when downlight-assembly 201 may be being removably attached or detached from spackle-frame 300 with its associated housings-for-clips 500 and clips 600). In some embodiments, base 601 may be associated with a top portion of clip 600. In some embodiments, prongs 605 may be associated with a bottom portion of clip 600. In some embodiments, where a given prong 605 extends out from the bottom of base 601 may be designated as pivot/flex region 607. In some embodiments, pivot/flex region 607 may be a region/portion of a given prong 605. In some embodiments, pivot/flex region 607 may be region/portion of a given prong 605 that is intended to flex the most. In some embodiments, pivot/flex region 607 may be a portion of a given prong 605 that has the thinnest thickness. In some embodiments, each prong 605 may have an inward facing/projecting barb/catch 609. Thus, the pair of adjacent prongs 605 of a given clip 600 may have two barbs/catches 609 that face/point towards each other. In some embodiments, these two barbs/catches 609 that of a given clip 600 may be configured to removably engage with head 415 of anchor-for-clip 411 of trim 400. In some embodiments, disposed between these two adjacent prongs 605 of a given clip 600 may be a gap 611. In some embodiments, gap 611 of a given clip 600 may be configured to removably fit head 415 of anchor-for-clip 411 of trim 400 within that gap 611.

FIG. 6D and FIG. 6E show the widest portion of clip 600, which is an outside distance spanning across the two oppositely disposed prongs 605.

Note, a majority of a height of a given clip 600 may travel up and down within a given housing 500; and as this travel occurs, gap 611 may vary and the orientation of the ledges of prongs 603 may change/rotate. Gap 611 may be widest in removed-clicked-out-configuration 1075 (see e.g., FIG. 10C). Gap 611 may be largest enough in removed-clicked-out-configuration 1075 for head 415 to up or down between prongs 605 without being interfered with by the ledges of prongs 605. In mounted-click-in-configuration 1000, gap 611 may be narrower than in removed-clicked-out-configuration 1075, just a bit wider than a width of head 415. See e.g., FIG. 10A. In mounted-click-in-configuration 1000, the orientation of the ledges of prongs 605 may prevent the bottom edges of head 415 from slipping down and past prongs 605; thus, maintaining mounted-click-in-configuration 1000. See e.g., FIG. 10A. Whereas, in prong-disengagement-configuration 1050 (FIG. 10B) the orientation of the ledges of prongs 605 may be rotated such that the ledges of prongs 605 no longer prevent the bottom edges of head 415 from slipping down and past prongs 605. However, gap 611 in prongdisengagement-configuration 1050 may be narrower than gap 611 in removed-clicked-out-configuration 1075. See e.g., FIG. 10B.

Figure 7A:
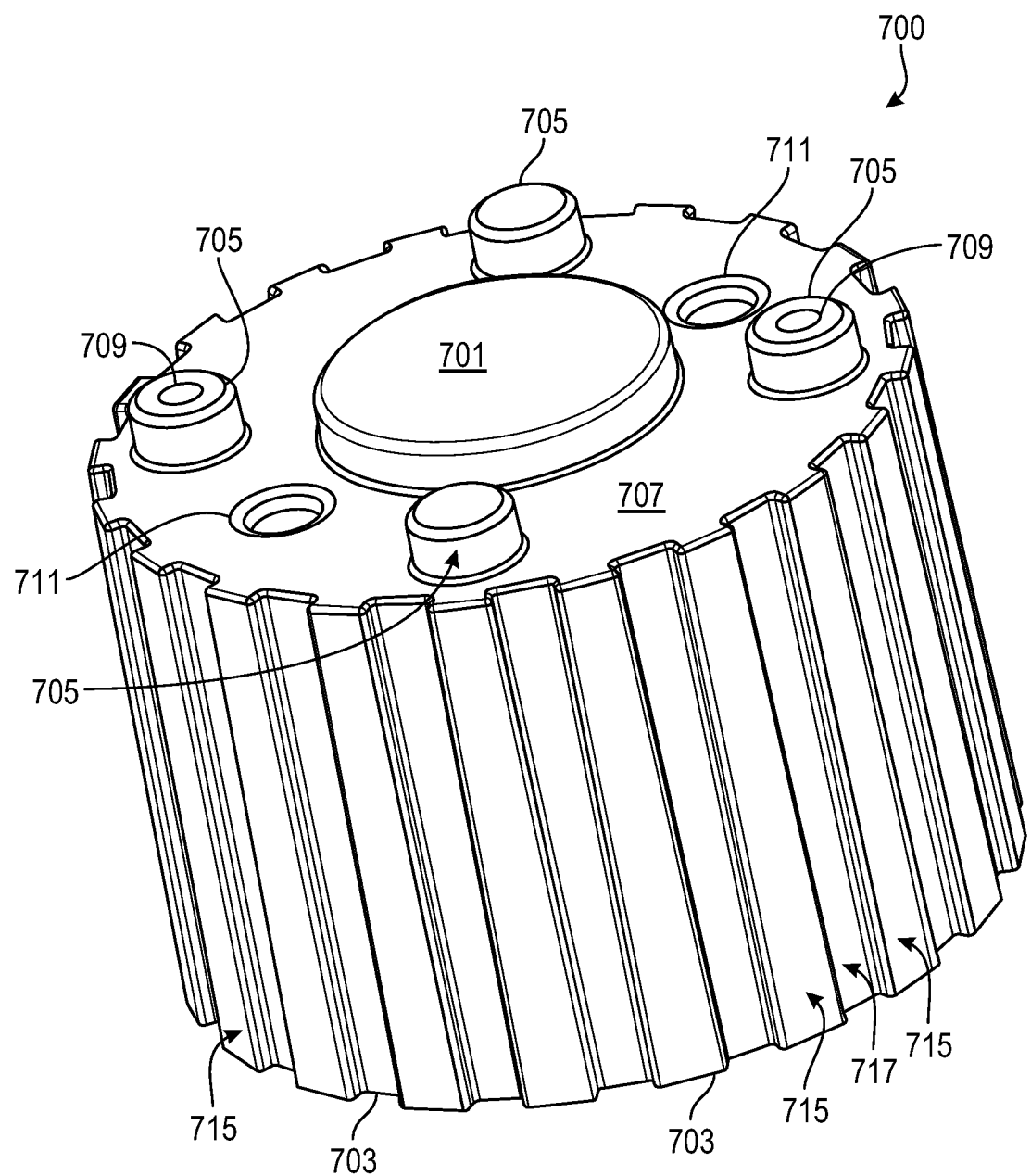
FIG. 7A shows a top perspective view of a heat sink, wherein at least a portion of this heat sink was first shown in FIG. 1A as a part of the overall-assembly.
Figure 7B:
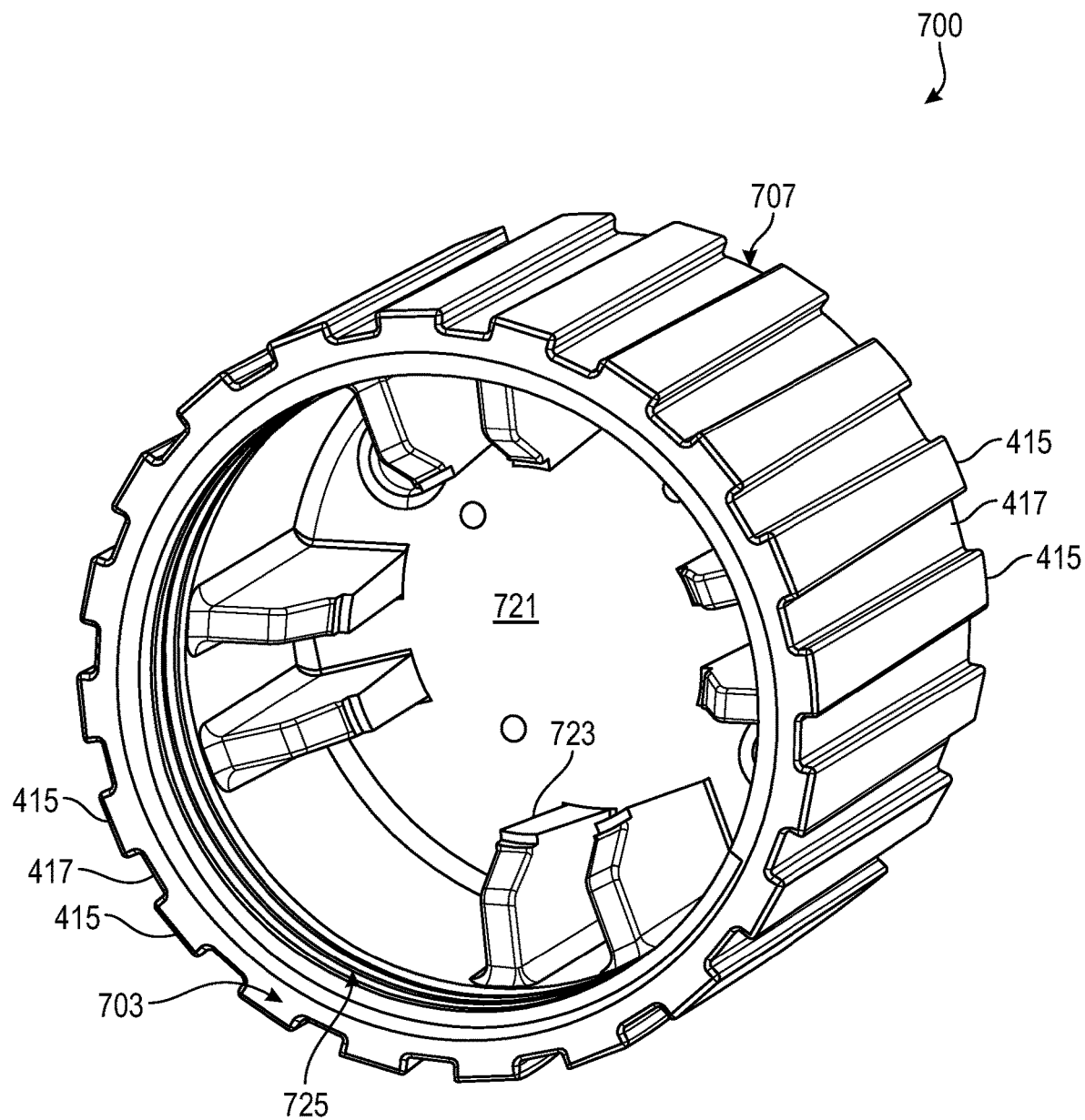
FIG. 7B shows a bottom perspective view of the heat sink, wherein at least a portion of this heat sink was first shown in FIG. 1A as a part of the overall-assembly.

FIG. 7A shows a top perspective view of heat sink 700. FIG. 7B shows a bottom perspective view of heat sink 700. In some embodiments, heat sink 700 may be configured to (removably) receive and/or house one or more electronics hardware components of downlight-assembly 201 or at least some portion thereof, such as, but not limited to, LED 221, and/or portions of cabling/wiring running from LED 221 to a driver/transformer that may be housed within housing-for-transformer/driver 111. In some embodiments, heat sink 700 may be a substantially (mostly) hollow cylindrical member, with a substantially (mostly) closed top 701/707 and an open bottom 703, wherein the hollow interior is of a void space that is configured to (removably) house one or more electronics hardware components of downlight-assembly 201. In some embodiments, top 701 may be top most surface of heat sink 700. In some embodiments, bottom 703 may be a bottom of heat sink 700. In some embodiments, top 701 and bottom 703 may be (vertically) disposed opposite from each other. In some embodiments, heat sink 700 may also have a secondary-top 707, wherein secondary-top 707 may not be as tall as top 701 and secondary-top 707 may begin where vertical running fin(s) 715 end/terminated away from bottom 703. In some embodiments, top 701 may extend/protruded upwards away from secondary-top 707 and away from bottom 703. In some embodiments, top 701 may be centered around the shared/common longitudinal/axial center line of heat sink 700/downlight-assembly 201. In some embodiments, also extending/protruding from secondary-top 707 and in direction away from secondary-top 707 and away from bottom 703, may be one or more standoff(s) 705. In some embodiments, standoff(s) 705 may help to provide and/or maintain an air gap between secondary-top 707 and a bottom of housing-for-transformer/driver 111, wherein housing-for-transformer/driver 111 may house an electronic driver/transformer. In some embodiments, one or more standoff(s) 705 may be arranged around top 701 on top of secondary-top 707. In some embodiments, top(s) of one or more standoff(s) 705 may be at least one hole 709. In some embodiments, hole 709 may be a through hole that is located on top of a given standoff 705. In some embodiments, hole 709 may be configured to receive a portion of electronic wiring/cabling and/or a mechanical fastener, such as, but not limited to, a screw, a bolt, or the like. In some embodiments, secondary-top 707 may comprise at least one hole 711. In some embodiments, secondary-top 707 may comprise one or more hole(s) 711. In some embodiments, a top of secondary-top 707 may comprise at least one hole 711. In some embodiments, hole 711 may be a through hole that is located on top of secondary-top 707. In some embodiments, hole 711 may be configured to receive a portion of electronic wiring/cabling and/or a mechanical fastener, such as, but not limited to, a screw, a bolt, or the like.

Continuing discussing FIG. 7A and FIG. 7B, in some embodiments, heat sink 700 may comprise one or more fins 715. In some embodiments, a given fin 715 may be located on an exterior sidewall portion of the cylindrical body of heat sink 700. In some embodiments, fins 715 may radiate/extend outwards away from the exterior sidewall portion of the cylindrical body of heat sink 700. In some embodiments, a given fin 715 may run from bottom 703 to secondary-top 707. In some embodiments, a given fin 715 may run from bottom 703 to secondary-top 707 in a linearly straight line. In some embodiments, between any two adjacent fins 715 may be a gap 717. In some embodiments, gap 717 may separate any two adjacent fins 715 from each other.

Discussing FIG. 7B, in some embodiments, heat sink 700 may comprise one or more internal-fin(s) 723. In some embodiments, internal-fin(s) 723 may radiate/extend inwards towards the common/shared longitudinal/axial centerline of heat sink 700; however, internalfin(s) 723 may not reach the common/shared longitudinal/axial centerline of heat sink 700. In some embodiments, opposing internal-fins 723 do not touch each other. In some embodiments, via conduction, internal-fin(s) 723 may help to move (transfer)

heat from electronics hardware components within heat sink 700 (e.g., LED 221) reach the external fins 715. In some embodiments, via conduction, internal-fin(s) 723 may help to position and/or retain LED 221 and/or reflector 211 within heat sink 700. FIG. 7B also shows portions of bottom-ofsecondary-top 721, which is merely the opposing surface to secondary-top 707. FIG. 7B also shows portions of attachment-means 725 (threading 725). In some embodiments, attachment-means 725 (threading 725) may be complementary to attachment-means 405 (threading 405) of trim 400. In some embodiments, attachment-means 725 may be an attachment means that is configured for removable attachment to attachment-means 405 of trim 400. In some embodiments, attachment-means 725 may be threading. In some embodiments, attachment-means 725 may be inside (female) threading. In some embodiments, attachment-means 725 may be located closer to bottom 703 than to bottom-of-secondary-top 721. In some embodiments, attachment-means 725 may be located closer to bottom 703 than to secondary-top 707. In some embodiments, attachment-means 725 may be located closer to bottom 703 than to top 701. In some embodiments, internal-fin(s) 723 may begin on top of attachment-means 725.

Figure 8A:
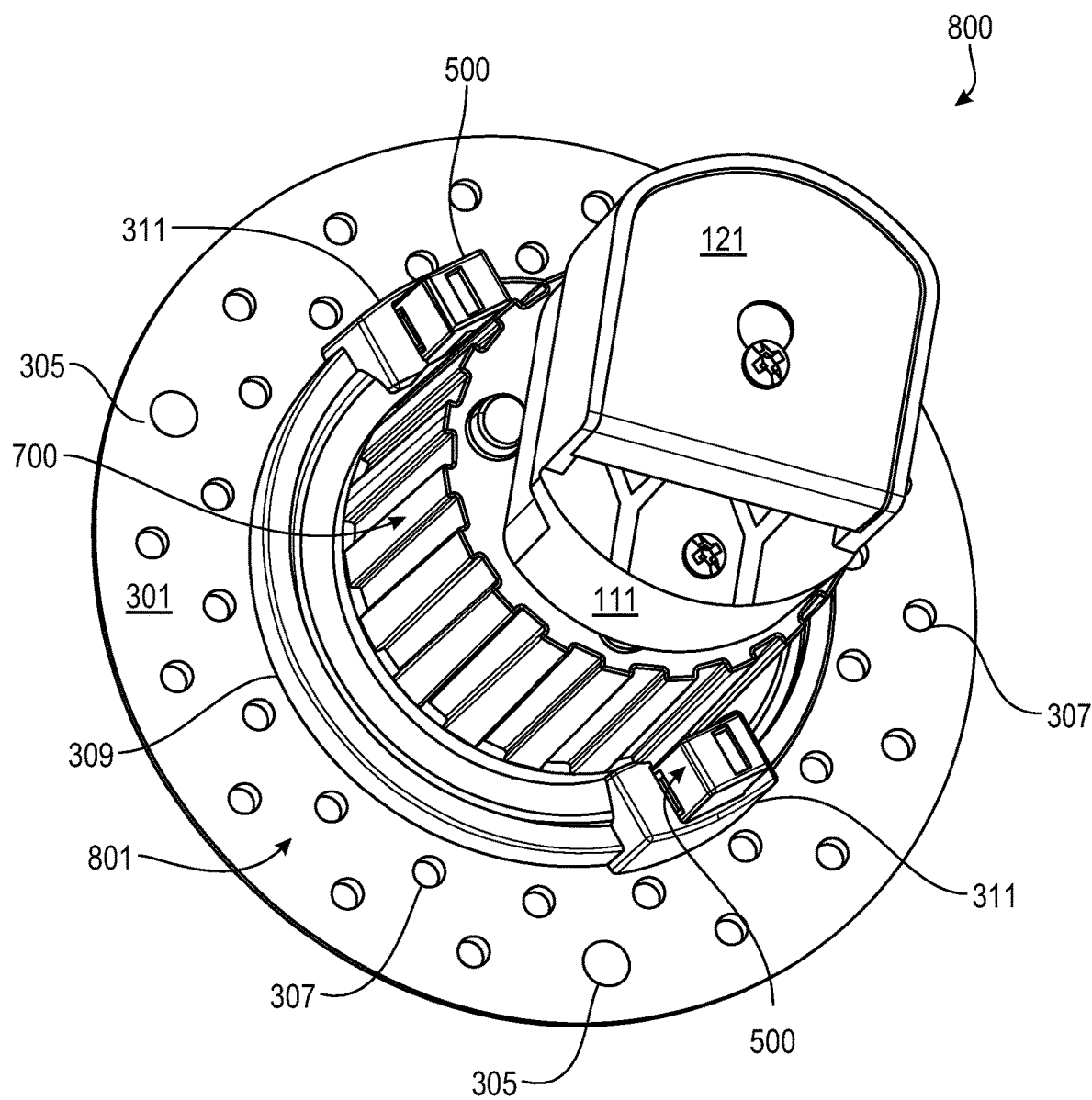
FIG. 8A shows a top perspective view of another/different overall-assembly configured for lighting that has another/different spackle-frame and that has another/different removable downlight (downlight-assembly) as compared to the overall-assembly of FIG. 1A.

FIG. 8A shows an overall-assembly 800 which is an alternative embodiment as compared to overall-assembly 100. In some embodiments, a difference between overall-assembly 800 and overall-assembly 100 may be with respect to the quantity structures used for removable attachment/detachment between the given downlight assembly and its associated spackle-frame. For example, and without limiting the scope of the present invention, with overall-assembly 100, there may be three (3) each of the bracket-for-housing 311, the anchors-for-clips 411, housings-for-clips 500, and clips 600; whereas, with overall-assembly 800, there instead may be two (2) each of the brackets-for-housings 311, the anchors-for-clips 411, housings-for-clips 500, and clips 600.

FIG. 8A shows a top perspective view of overall-assembly 800 comprising a downlight-assembly 901 and spackle-frame 801. Note, downlight-assembly 901 is also shown in FIG. 9B detached from its spackle-frame 801. Continuing discussing FIG. 8A, in some embodiments, downlight-assembly 901 is substantially similar to downlight-assembly 201, except in downlight-assembly 901 the flangeless trim member is trim 803 and not trim 400. In some embodiments, downlight-assembly 901 and downlight-assembly 201 may both utilize, include, and/or comprise some of the same components/parts, such as, but not limited to: housing-fortransformer/driver 111, cover 121, fastener 131, LED 221, reflector 211, and heat sink 700. In some embodiments, downlight-assembly 901 may comprise: housing-for-transformer/driver 111, cover 121, fastener 131, LED 221, reflector 211, heat sink 700, and flangeless trim 803. In some embodiments, overall-assembly 800 may at least comprise: one downlight-assembly 901 and one spackle-frame 801. In some embodiments, overall-assembly 800 may comprise: one downlight-assembly 901, one spackle-frame 801, two housings-for-clips 500, and two clips 600. In some embodiments, the housings-for-clips 500 and the clips 600 used in overall-assembly 800 may be of the same types of the housings-for-clips 500 and the clips 600 used in overall-assembly 100; but only the quantities of the housings-for-clips 500 and of the clips 600 may be different.

Figure 8B:
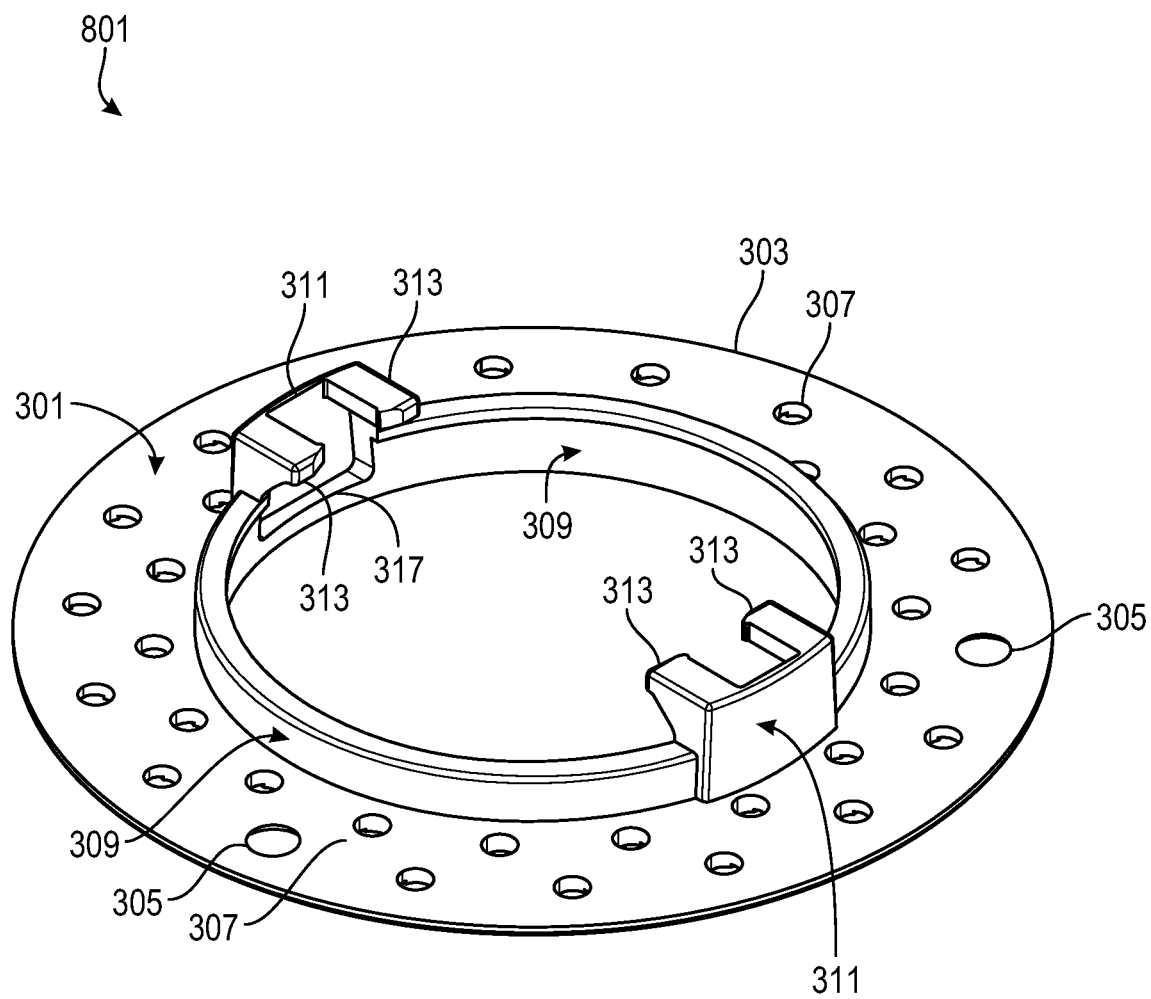
FIG. 8B shows a top perspective view of the spackle-frame from the overall-assembly of FIG. 8A.

FIG. 8B shows a top perspective view of spackle-frame 801. In some embodiments, spackle-frame 801 is substantially similar to spackle-frame 300, except spackle-frame 801 only has two brackets-for-housings 311 instead of the three brackets-for-housings 311 that spackle-frame 300 may have.

Figure 8C:
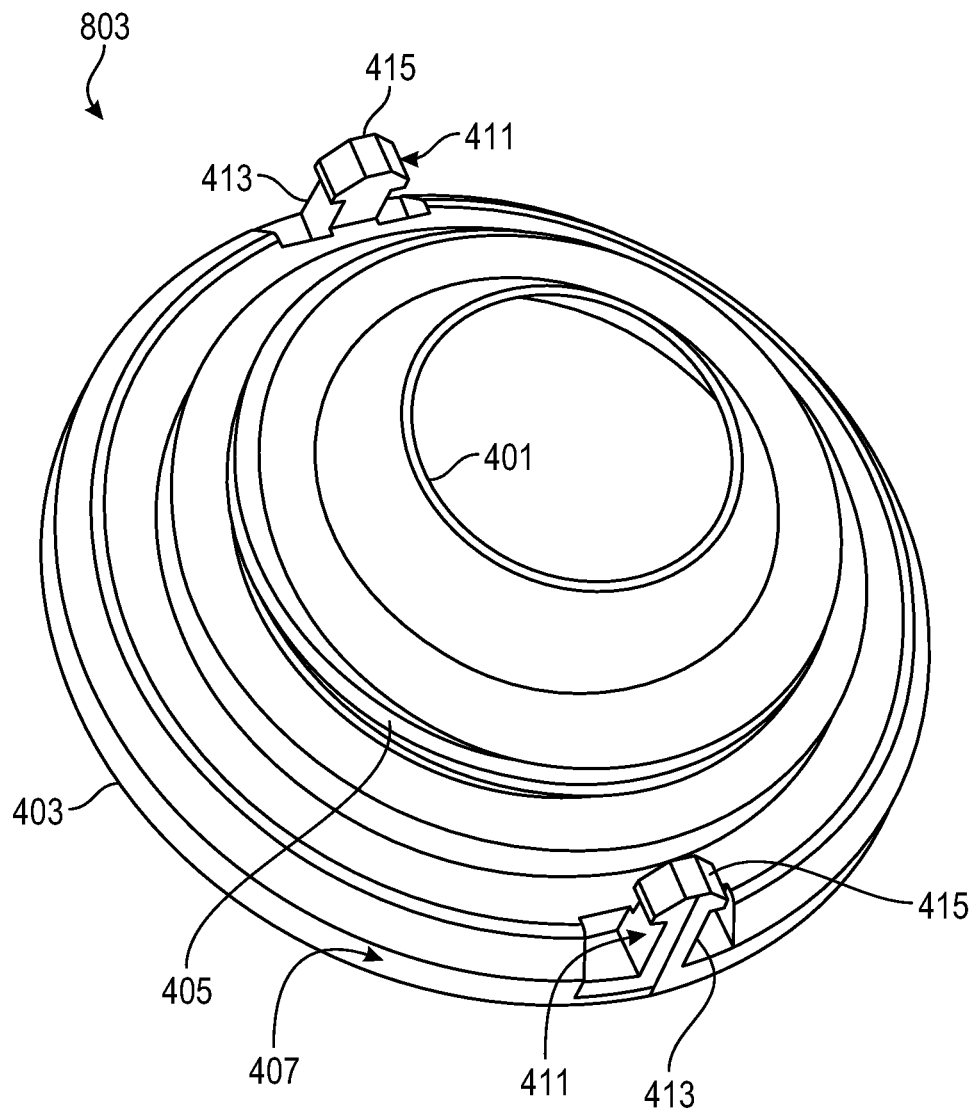
FIG. 8C shows a top perspective view of the flangeless trim (trim member) from the overall-assembly and/or from the downlight (downlight-assembly) of FIG. 8A.
Figure 8D:
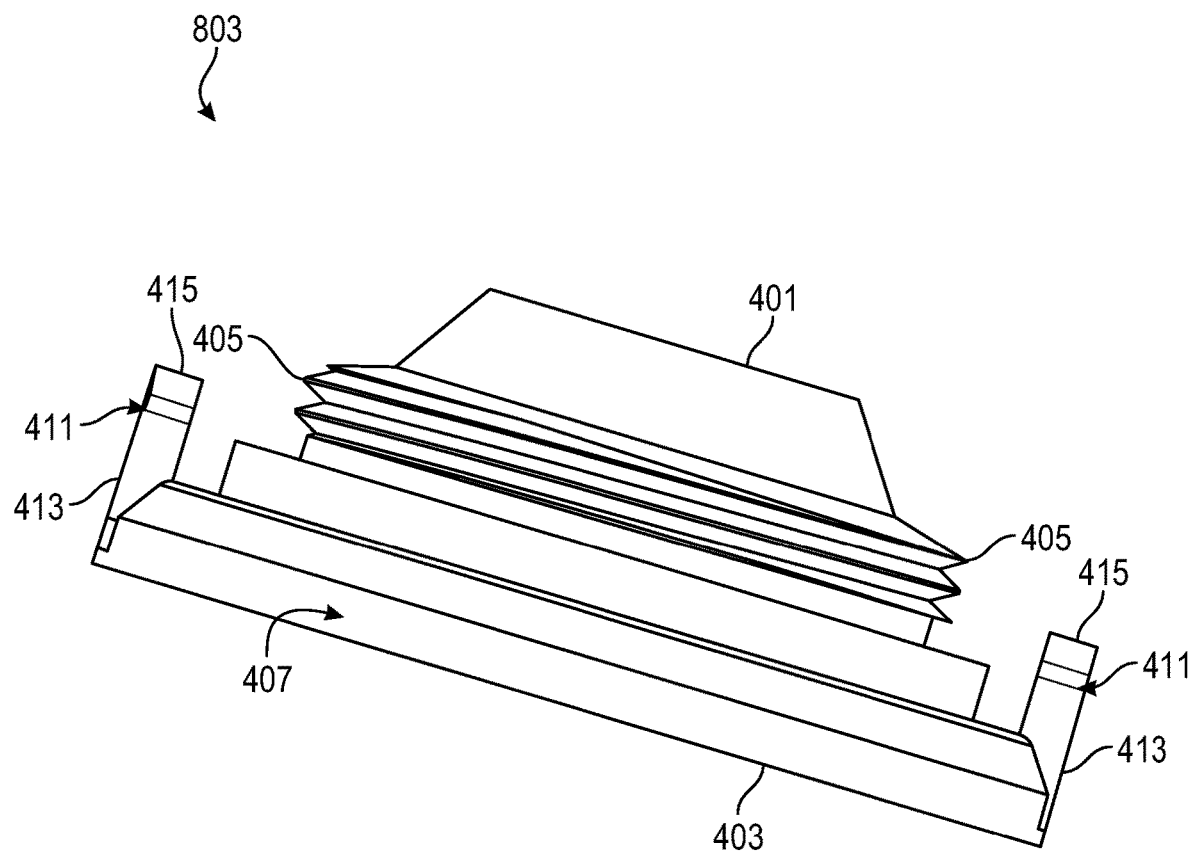
FIG. 8D shows a side view of the flangeless trim (trim member) from the overall-assembly and/or from the downlight (downlight-assembly) of FIG. 8A.

FIG. 8C shows a top perspective view of flangeless trim 803. In some embodiments, flangeless trim 803 is substantially similar to flangeless trim 400, except flangeless trim 803 only has two anchors-for-clips 411 instead of the three anchors-for-clips 411 that flangeless trim 400 may have.

Figure 9A:
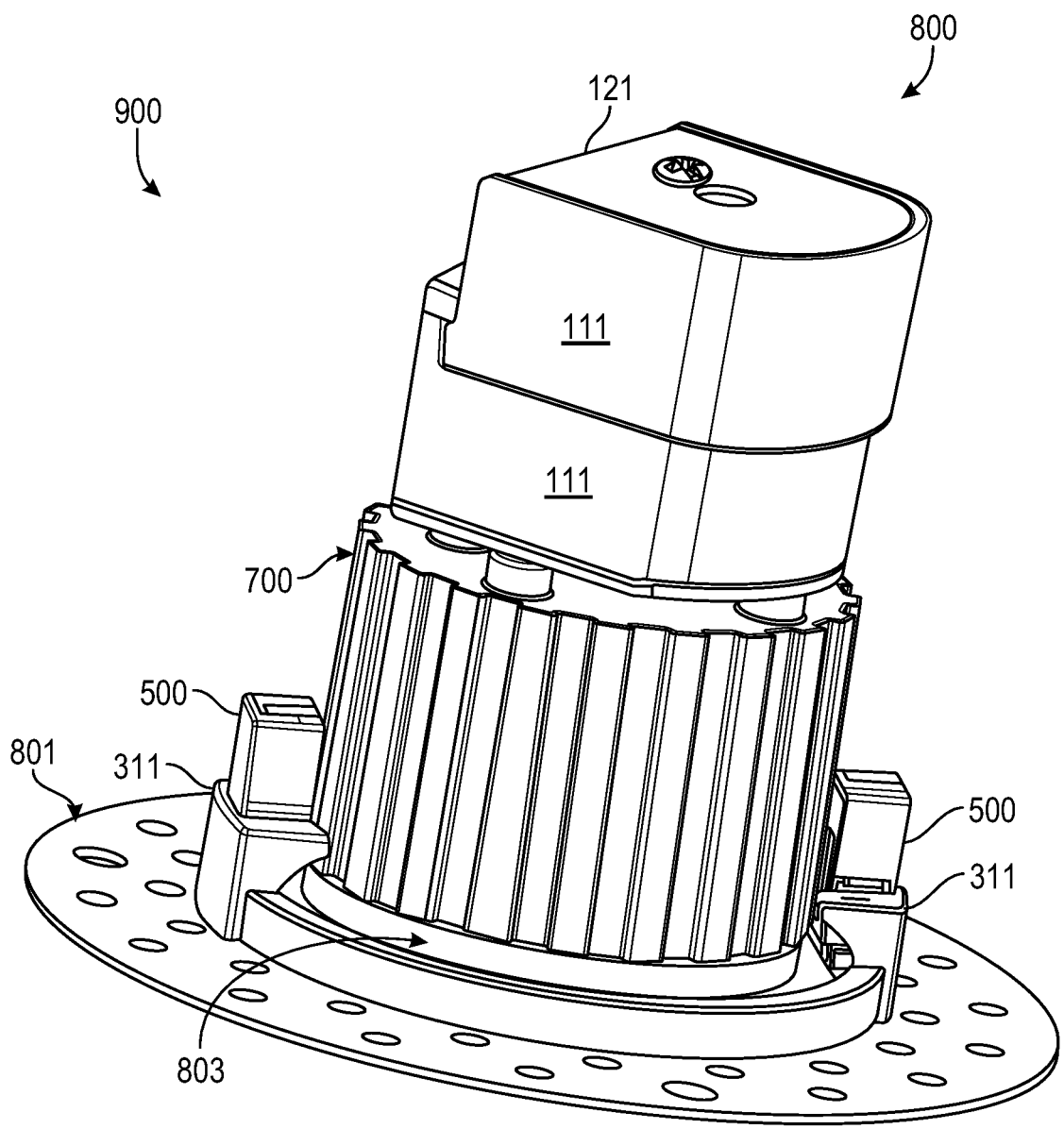
FIG. 9A shows a top perspective view of the downlight-assembly (from FIG. 8A) in a configuration of a mounted-click-in-configuration, wherein this downlight-assembly may be removably attached to its spackle-frame.
Figure 9B:
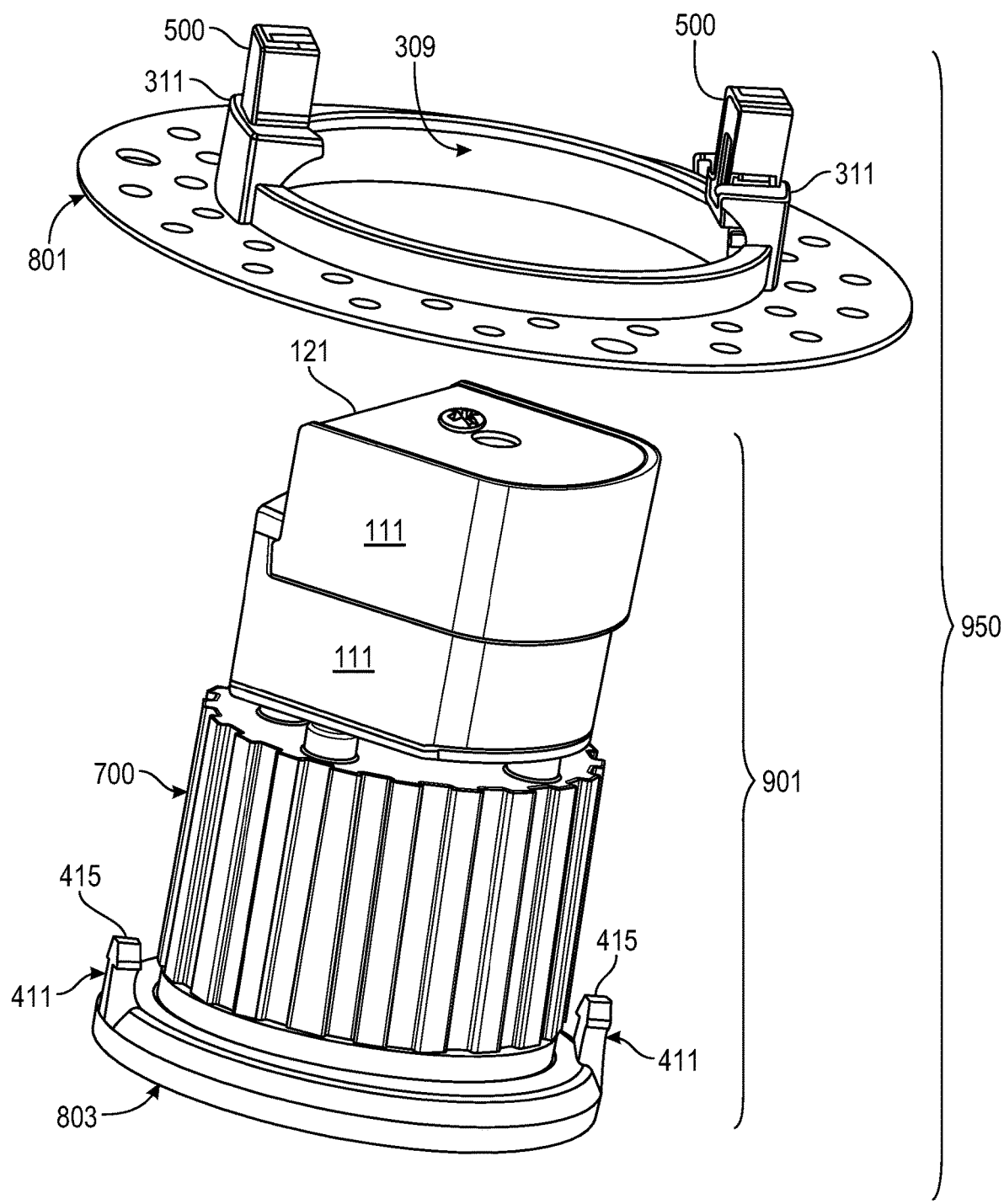
FIG. 9B shows a top perspective view of the downlight-assembly (from FIG. 8A) in a configuration of a removed-clicked-out-configuration, wherein this downlight-assembly may be removably detached from its spackle-frame.

FIG. 9A shows a top perspective view of downlight-assembly 901 in a configuration of mounted-click-in-configuration 900, wherein downlight-assembly 901 may be removably attached to spackle-frame 300. In some embodiments, mounted-click-in-configuration 900 may be the main and/or the default configuration for downlight-assembly 901, when downlight-assembly 901 may be regularly used as a downlight as intended. Compare FIG. 9A to FIG. 9B.

FIG. 9B shows a top perspective view of downlight-assembly 901 in a configuration of removed-clicked-out-configuration 950, wherein downlight-assembly 901 may be removably detached from spackle-frame 300. In some embodiments, removed-clicked-out-configuration 950 may present a situation just before mounted-click-in-configuration 900 or just after mounted-click-in-configuration 900. In some embodiments, downlight-assembly 901 may be transitioned back and forth between mounted-click-in-configuration 900 and removedclicked-out-configuration 950, by merely pushing downlight-assembly 901 upwards such the anchors-for-clips 411 (of trim 803) may removably engage with the clips 600 and the housings-for-clips 500, wherein the clips 600 and the housings-for-clips 500 may be retained within the brackets-for-housings 311 of spackle-frame 801. In some embodiments, downlight-assembly 901 may be transitioned back and forth between mounted-click-in-configuration 900 and removed-clicked-out-configuration 950, without use of any external tools, such as, but not limited to, screwdrivers, or the like.

Note, mounted-click-in-configuration 900 and removed-clicked-out-configuration 950 could have also been drawn using downlight-assembly 201 and spackle-frame 300 instead of downlight-assembly 901 and spackle-frame 803. That is, mounted-click-in-configuration 900 and removed-clicked-out-configuration 950 are applicable to overall-assembly 100 and downlight-assembly 201; as well as, overall-assembly 800, and downlight-assembly 901.

Figure 10A:
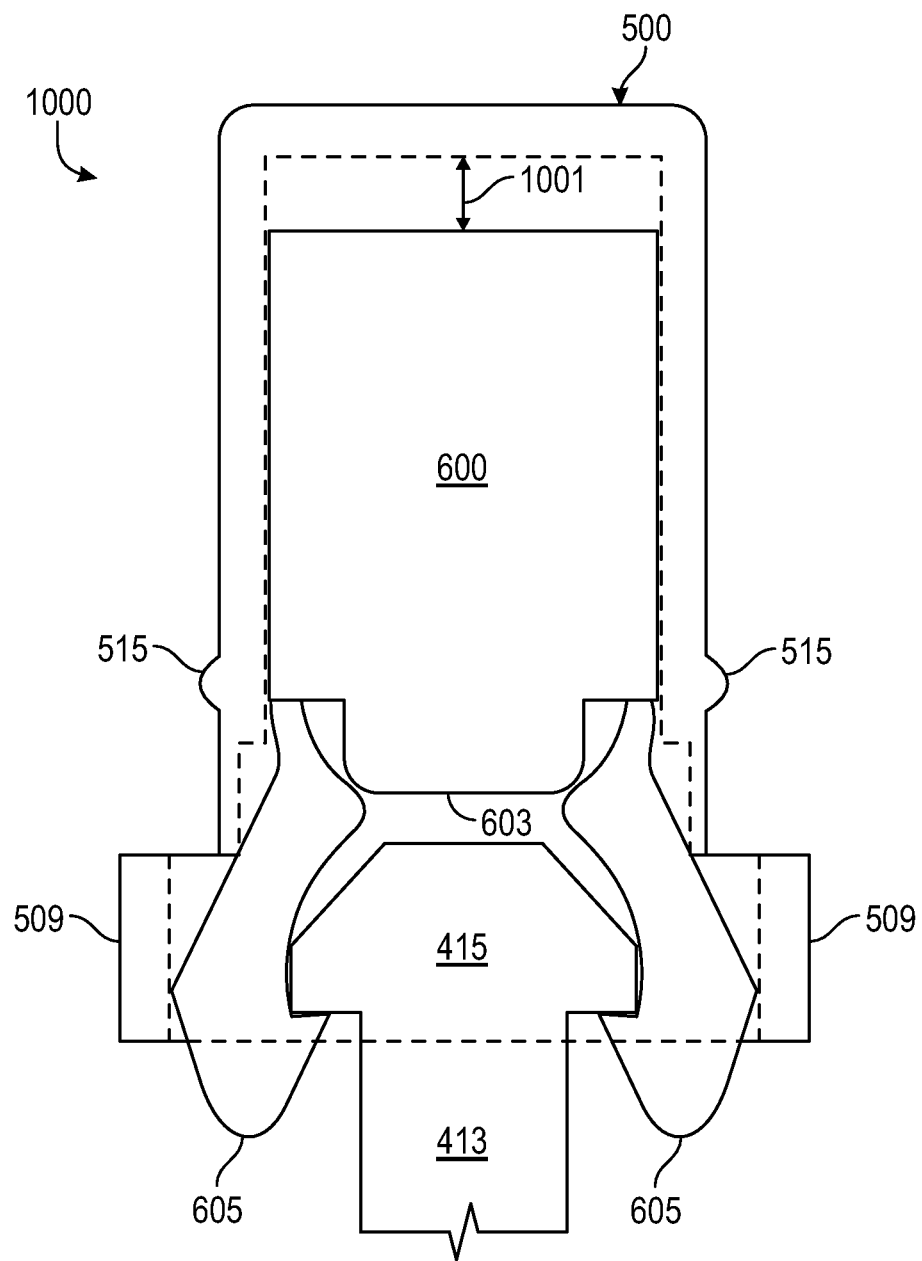
FIG. 10A shows a cross-sectional diagram, with internal portions of a housing shown in transparency (with broken lines), of an interaction between a head with prongs and a clip with the housing, in a mounted-click-in-configuration.

FIG. 10A shows a cross-sectional diagram, with internal portions of housing 500 shown in transparency (with broken lines), of the interaction between head 415 with prongs 605 and clip 600 with housing 500, in a mounted-click-in-configuration 1000. In some embodiments, mounted-click-in-configuration 1000 may be the interactions occurring with these components in mounted-click-in-configuration 900 of FIG. 9A. In other words, FIG. 10A shows the component relationships between anchor-for-clip 411, 500, and clip 600 in mounted-click-in-configuration 900/1000. In some embodiments, mounted-click-in-configuration 1000 may be the main and/or the default configuration for downlight-assembly 201/901, when downlight-assembly 201/901 may be regularly used as a downlight as intended, i.e., removably attached to spackle-frame 300/801. In some embodiments, in mounted-click-in-configuration 1000, the bottom edges of head 415 may rest upon ledges of prongs 605. In some embodiments, in mounted-click-in-configuration 1000, a top of head 415 may not be physically touching push-surface 603. In some embodiments, in mounted-click-in-configuration 1000, internal sidewalls of wider-side-wall 509 may press/squeeze prongs 605 towards elongate-portion 413. In some embodiments, in mounted-click-in-configuration

1000, gap 611 may be at about the same dimension (i.e., just slightly wider) than a width of head 415. In some embodiments, in mounted-click-in-configuration 1000, there may be a distance (gap) 1001 between a top of clip 600 and an inside top of top 501 of housing 500.

Figure 10B:
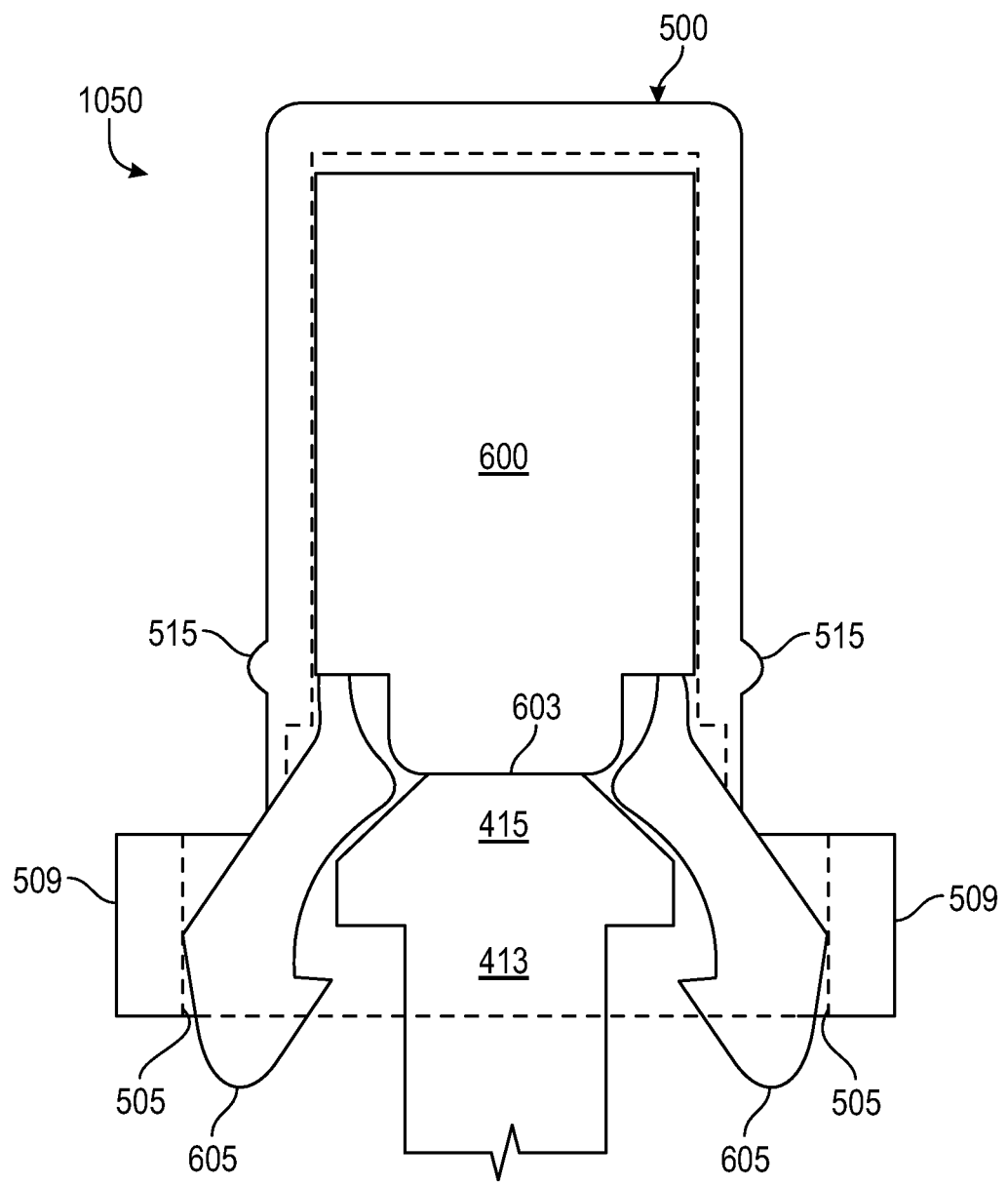
FIG. 10B shows a cross-sectional diagram, with internal portions of the housing shown in transparency (with broken lines), of the interaction between the head with the prongs and the clip with the housing, in a prong-disengagement-configuration.

FIG. 10B shows a cross-sectional diagram, with internal portions of housing 500 shown in transparency (with broken lines), of the interaction between head 415 with prongs 605 and clip 600 with housing 500, in a prong-disengagement-configuration 1050. In some embodiments, prong-disengagement-configuration 1050 may be used to disengage the ledges of prongs 605 from the bottom edges of head 415, so that trim 400/803 (and downlight 201/901) may be removed from housings 500, clips 600, and from spackle-frame 300/801. In some embodiments, prong-disengagement-configuration 1050 may be arrived from mountedclick-in-configuration 1000, by one pushing trim 400/803 (and downlight 201/901) upwards, such that distance (gap) 1001 gets smaller. In some embodiments, from mounted-clickin-configuration 1000, when trim 400/803 (and downlight 201/901) is pushed upwards, eventually the top of head 415 will press up against push-surface 603 (of clip 600), and then continued pushing upwards motion will further diminish distance (gap) 1001 as clip 600 travels further upwards mostly inside of housing 500, to a point where the ledges of prongs 605 rotate sufficiently to not be able to engage/interfere with the bottom edges of head 415; and at such point, then trim 400/803 (and downlight 201/901) may be removed downwards from housings 500, clips 600, and from spackle-frame 300/801.

Figure 10C:
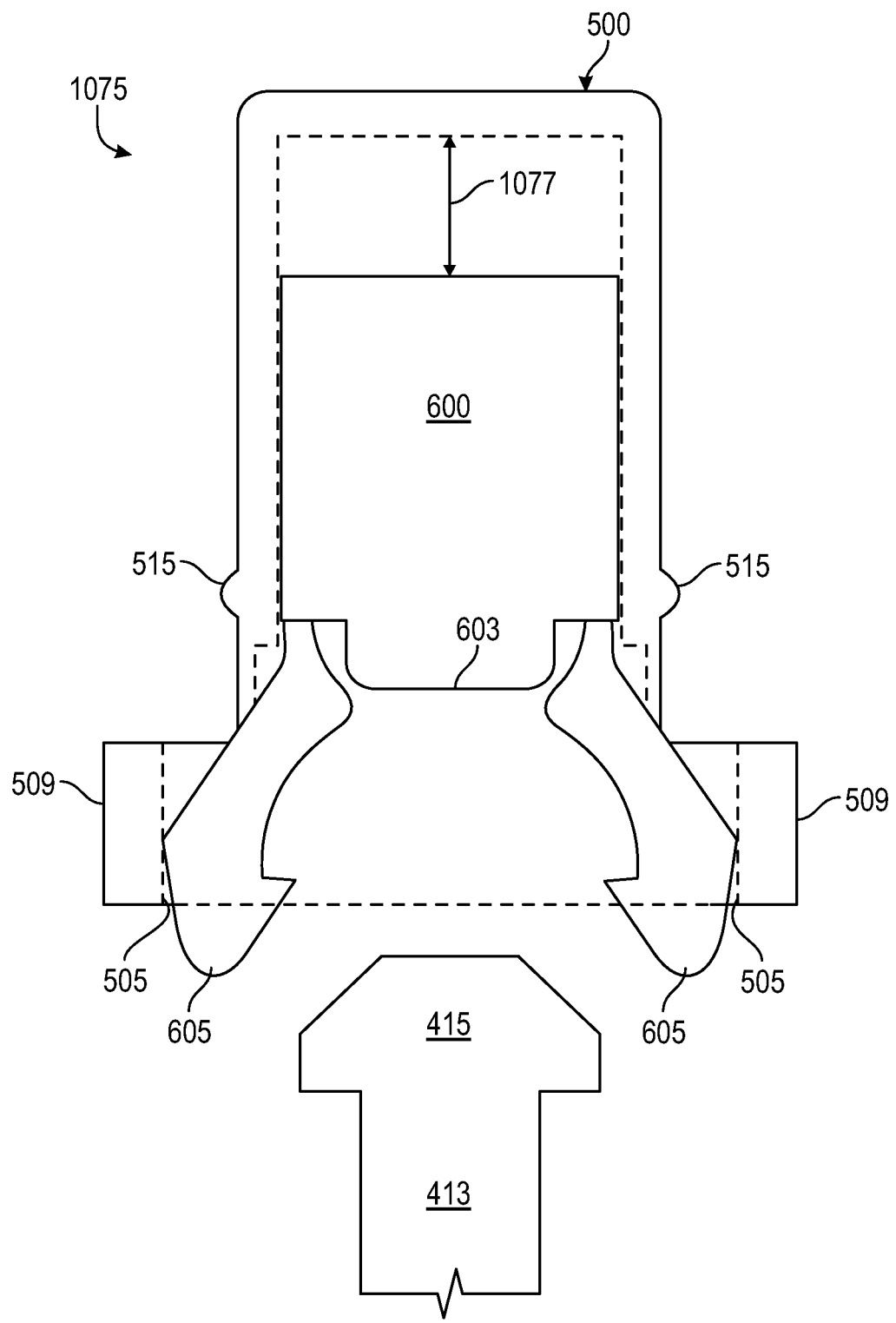
FIG. 10C shows a cross-sectional diagram, with internal portions of the housing shown in transparency (with broken lines), of the interaction between the head with prongs and the clip with the housing, in a removed-clicked-out-configuration.

FIG. 10C shows a cross-sectional diagram, with internal portions of housing 500 shown in transparency (with broken lines), of the interaction between head 415 with prongs 605 and clip 600 with housing 500, in a removed-clicked-out-configuration 1075. In some embodiments, removed-clicked-out-configuration 1075 may be the result after prongdisengagement-configuration 1050 and pulling now disengaged trim 400/803 (and downlight 201/901) downwards from housings 500, clips 600, and from spackle-frame 300/801. In some embodiments, removed-clicked-out-configuration 1075 may be the interactions occurring with these components shown in FIG. 10C in removed-clicked-out-configuration 950 of FIG. 9B. In other words, FIG. 10C shows the component relationships between anchor-for-clip 411, 500, and clip 600 in removed-clicked-out-configuration 950/1075. In some embodiments, in removed-clicked-out-configuration 1075, there may be a distance (gap) 1077 between a top of clip 600 and an inside top of top 501 of housing 500. In some embodiments, distance (gap) 1077 may be larger than distance (gap) 1001.

Note, from removed-clicked-out-configuration 1075, mounted-click-in-configuration 900/1000 may be arrived at by pushing trim 400/803 (and downlight 201/901) back into inside-diameter 321 (largest central hole) of spackle-frame 300/801, such that the top of head 415 pushes upwards against push-surface 603 of clip 600, such that the internal sidewalls of wider-side-wall 509 at bottom-opening 505, push prongs 605 towards anchor-for-clip 411; and once the widest portion across the prongs 605 are within wider-sidewall 509, then the ledges of prongs 605 will prevent the bottom edges of head 415 from slipping downwards and out of prongs 605, and mounted-click-in-configuration 900/1000 will result. Thus, the configurations may cycle from mounted-click-in-configuration 1000/900, to prong-disengagement-configuration 1050, to removed-clicked-out-configuration 1075, and back to mounted-click-in-configuration 1000/900. See e.g., FIG. 10A, FIG. 10B, and FIG. 10C.

In some embodiments, overall-assembly 100/800 may be configured for lighting. See FIG. 1A to FIG. 2B for overall-assembly 100; and see FIG. 8A, FIG. 9A, and FIG. 9B for overall-assembly 800. In some embodiments, overall-assembly 100/800 may comprise: spackle-frame 300/801, at least two housings 500, at least two clips 600, and a downlight 201/901 that is removably attachable to spackle-frame 300/801 without using tools that are separate from overall-assembly 100/800. In some embodiments, spackle-frame 300/801 may be configured to be mounted to a flat planar surface (such as, but not limited to, a section of drywall/sheetrock or the like). In some embodiments, spackle-frame 300/801 may also serve (function) as a point of removable anchor for downlight 201/901. In some embodiments, spackle-frame 300/801 may comprise flat annular disk member 301 and at least two brackets 311. In some embodiments, at least two brackets 311 may extend upwards from the flat annular disk member 301. In some embodiments, each of the at least two brackets 311 may be configured to attach to one of the at least two housings 500. In some embodiments, each of the at least two housings 500 may be configured to retain at least part of one clip 600 selected from the at least two clips 600 (within the housing 500 or at least mostly within that housing 500). In some embodiments, downlight 201/901 may comprise trim member 400/803. In some embodiments, trim member 400/803 may comprise at least two upward extending members 411. In some embodiments, each of the at least two upward extending member 411 is configured to removably attach to each clip 600 selected from the at least two clips 600, such that removable attachment between spackle-frame 300/801 and the downlight 201/901 is accomplished by the at least two upward extending members 411 removably engaging with the at least two clips 600. In some embodiments, the at least two housings 500 and the at least two clips 600 are retained with the spackle-frame 300/801 when downlight 201/901 is attached or detached from spackle-frame 300/801.

In some embodiments, downlight 201/901 may comprise at least one of: a housingfor-transformer/driver 111, a heat sink 700, a light source 221, and/or a reflector 211. In some embodiments, housing-for-transformer/driver 111 may be configured to house at least a portion of a transformer or at least a portion of a driver; wherein the transformer or the driver are configured to (electrically) power and/or control the light source 221. In some embodiments, heat sink 700 may be configured to facilitate removal of (at least some) heat from the light source 221. In some embodiments, light source 221 may be configured to emit light. In some embodiments, reflector 211 may be configured to reflect light emitted from light source 211.

In some embodiments, a quantity of the at least two clips 600 may exactly match a quantity of the at least two upward extending members 411, wherein a quantity of the at least two housings 500 may exactly match the quantity of the at least two clips 600.

Overall-assemblies of downlights and spackle-frames have been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A spackle-frame configured for removable attachment to a downlight, wherein the spackle-frame is configured to be mounted to a flat planar surface, wherein the spackle-frame comprises:
   a flat annular disk member;
   a raised-annular-ring, wherein the raised-annular-ring extends upwards from the flat annular disk member, wherein a height of the raised-annular-ring is fixed and non-variable; and
   at least two brackets, wherein the at least two brackets extend above the height of the raised-annular-ring; wherein each bracket, selected from the at least two brackets, comprises a pair of inward protruding prongs that extend away from an outer-edge of the flat-annular-disk-member and extend towards a center of the spackle-frame, wherein each bracket, selected from the at least two brackets, comprises a ledge that is disposed opposite from the pair of inward protruding prongs, wherein the at least two brackets are not cavities;
   wherein each of the at least two brackets is configured to retain one of at least two housings, wherein each ledge of the at least two brackets is configured to support a bottom portion of one of the at least two housings;
   wherein each of the at least two housings is configured to retain at least part of one clip selected from at least two clips, wherein the at least two clips are configured to removably attach to the downlight.

2. The spackle-frame according to claim 1, wherein the spackle-frame comprises a single largest hole surrounding the center, wherein the single largest hole is configured to permit passage of at least some portions of the downlight.

3. The spackle-frame according to claim 1, wherein the spackle-frame comprises at least one smaller hole that is smaller than a single largest hole surrounding the center, wherein the at least one smaller hole is located in the flat annular disk member.

4. The spackle-frame according to claim 3, wherein the at least one smaller hole is configured to receive at least a portion of a mechanical-fastener for attaching the spackle-frame to the flat planar surface.

5. The spackle-frame according to claim 1, wherein a bottom of the flat annular disk member comprises at least one channel, wherein the at least one channel is configured to receive plaster for a purpose of attaching the spackle-frame to the flat planar surface and for at least substantially concealing the flat annular disk member with respect to the flat planar surface.

6. The spackle-frame according to claim 1, wherein the flat planar surface is at least a section of drywall or at least a section of sheetrock.

7. The spackle-frame according to claim 1, wherein the at least two brackets are disposed around a single largest hole surrounding the center.

8. The spackle-frame according to claim 1, wherein the at least two brackets are exactly two oppositely disposed brackets from each other.

9. The spackle-frame according to claim 1, wherein the at least two brackets are three or more brackets that are equidistant from each other.

10. The spackle-frame according to claim 1, wherein with respect to each bracket, selected from the at least two brackets, the pair of inward protruding prongs extends from a top of the bracket and towards the center.

11. A trim member that is configured for use in a downlight wherein the trim member comprises:
   an interior surface with a conical frustum shape that is configured to permit passage of light; attachment-means that is configured for attachment to a heat sink of the downlight; at least two upward extending members that extend upwards and away from a circular base from a bottom of the trim member, wherein the at least two upward extending members extend alongside the heat sink when the attachment-means is attached to the heat sink, wherein each of the at least two upward extending members is configured to be removably retained within a clip, wherein the clip is retained within a spackle-frame, wherein the spackle-frame is configured for attachment to a flat planar surface; raised protrusions that flank both sides of each of the upward extending members selected from the at least two upward extending members, wherein the raised protrusions extend upwards and away from the circular base, wherein heights of the raised protrusions are taller than heights of the at least two upward extending members; wherein the interior surface, the attachment-means, the circular base, and the at least two upward extending members are all of a single article of manufacture; wherein the trim member is flangeless without a flange extending laterally away from the circular base.

12. The trim member according to claim 11, wherein the trim member comprises a circular top opening and a circular bottom opening, wherein at least some light emitted by the downlight enters the circular top opening and passes out of the circular bottom opening.

13. The trim member according to claim 11, wherein each of the at least two upward extending members comprises an elongate-portion and a head, wherein the elongate-portion extends out from the circular base, wherein the head extends from where the elongate-portion ends, wherein the head is a terminal end portion of the upward extending member; wherein the head is wider than the elongate-portion.

14. The trim member according to claim 11, wherein each of the at least two upward extending members has a blunted arrow shape.

15. The trim member according to claim 11, wherein the trim member is devoid of material around sides and tops of the at least two upward extending members.

16. The trim member according to claim 11, wherein the at least two upward extending members are exactly two upward extending members oppositely disposed from each other.

17. The trim member according to claim 11, wherein the at least two upward extending members are three or more upward extending members that are equidistant from each other.

18. An overall-assembly configured for lighting wherein the overall-assembly comprises:
   a spackle-frame, wherein the spackle-frame comprises:
      a flat annular disk member, wherein the flat annular disk member is configured to be mounted to a flat planar surface;
      a raised-annular-ring, wherein the raised-annular-ring extends upwards from the flat annular disk member, wherein a height of the raised-annular-ring is fixed and non-variable; and
      at least two brackets, wherein the at least two brackets extend above the height of the raised-annular-ring; wherein each bracket, selected from the at least two brackets, comprises a pair of inward protruding prongs that extend away from an outer-edge of the flat-annular-disk-member and extend towards a center of the spackle-frame;

at least two housings, wherein each of the at least two brackets is configured to attach to one of the at least two housings;

at least two clips, wherein each clip selected from the at least two clips comprises a base of a rectangular prism shape, wherein the base does not communicate with a spring, wherein each of the at least two housings is configured to retain at least part of one clip selected from the at least two clips; and a downlight that is removably attachable to the spackle-frame without using tools that are separate from the overall-assembly;

wherein the downlight comprises a trim member;

wherein the trim member comprises at least two upward extending members, wherein each of the at least two upward extending members is configured to removably attach to each clip selected from the at least two clips, such that removable attachment between the spackle-frame and the downlight is accomplished by the at least two upward extending members removably engaging with the at least two clips; and wherein the at least two housings and the at least two clips are retained by the at least two brackets of the spackle-frame when the downlight is attached or detached from the spackle-frame.

19. The overall-assembly according to claim 18, wherein the downlight comprises a housing-for-transformer/driver, a heat sink, a light source, and a reflector;

wherein the housing-for-transformer/driver is configured to house at least a portion of a transformer or at least a portion of a driver, wherein the transformer or the driver is configured to power and control the light source;

wherein the heat sink is configured to facilitate removal of heat from the light source;

wherein the light source is configured to emit light;

wherein the reflector is configured to reflect light emitted from the light source.

20. The overall-assembly according to claim 18, wherein a quantity of the at least two clips exactly matches a quantity of the at least two upward extending members, wherein a quantity of the at least two housings exactly matches the quantity of the at least two clips.

\* \* \* \* \*